(12) United States Patent
Jin et al.

(10) Patent No.: US 10,184,051 B2
(45) Date of Patent: Jan. 22, 2019

(54) SOLAR ENERGY ABSORBING COATINGS AND METHODS OF FABRICATION

(71) Applicant: THE REGENTS OF THE UNIVERSITY OF CALIFORNIA, Oakland, CA (US)

(72) Inventors: Sungho Jin, San Diego, CA (US); Renkun Chen, San Diego, CA (US); Zhaowei Liu, San Diego, CA (US); Jaeyun Moon, San Diego, CA (US); Tae Kyoung Kim, La Jolla, CA (US); Bryan Van Saders, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 15/125,348

(22) PCT Filed: Mar. 13, 2015

(86) PCT No.: PCT/US2015/020589
§ 371 (c)(1),
(2) Date: Sep. 12, 2016

(87) PCT Pub. No.: WO2015/138990
PCT Pub. Date: Sep. 17, 2015

(65) Prior Publication Data
US 2017/0073530 A1   Mar. 16, 2017

Related U.S. Application Data

(60) Provisional application No. 61/952,774, filed on Mar. 13, 2014, provisional application No. 62/093,296, filed on Dec. 17, 2014.

(51) Int. Cl.
C09D 5/32 (2006.01)
C01G 51/04 (2006.01)
(Continued)

(52) U.S. Cl.
CPC ............. *C09D 5/32* (2013.01); *C01G 3/02* (2013.01); *C01G 37/00* (2013.01);
(Continued)

(58) Field of Classification Search
None
See application file for complete search history.

(56) References Cited

U.S. PATENT DOCUMENTS 4,310,596 A * 1/1982 Van Buskirk ........ C09D 127/16
427/160
4,562,120 A * 12/1985 Axelrod .................. H01J 29/28
396/546

(Continued)

FOREIGN PATENT DOCUMENTS

CN       1730570 A    2/2006
WO  2013/166521 A1   11/2013

OTHER PUBLICATIONS

Abstract of CN 102925151 A (Year: 2013).*
(Continued)

*Primary Examiner* — Kevin M Bernatz
(74) *Attorney, Agent, or Firm* — Perkins Coie LLP

(57) ABSTRACT

Methods, systems, and devices are disclosed for fabricating and implementing optically absorbing coatings. In one aspect, an optically selective coating includes a substrate formed of a solar energy absorbing material, and a nanostructure material formed over the substrate as a coating capable of absorbing solar energy in a selected spectrum and reflecting the solar energy in another selected spectrum. A concentrating solar power (CSP) system includes heat transfer fluids (HTFs); thermal energy storage system (TES); and solar receivers in communication with HTFs and including a light absorbing coating layer based on cobalt oxide nanoparticles.

14 Claims, 42 Drawing Sheets

(51) Int. Cl.

| | | |
|---|---|---|
| *C01G 37/00* | (2006.01) | |
| *C01G 49/00* | (2006.01) | |
| *C01G 49/08* | (2006.01) | |
| *C01G 51/00* | (2006.01) | |
| *C01G 3/02* | (2006.01) | |
| *C09C 1/24* | (2006.01) | |
| *C09C 3/06* | (2006.01) | |
| *C09D 7/40* | (2018.01) | |
| *F24S 70/20* | (2018.01) | |
| *B82Y 30/00* | (2011.01) | |

(52) U.S. Cl.
CPC ..... *C01G 49/0063* (2013.01); *C01G 49/0072* (2013.01); *C01G 49/08* (2013.01); *C01G 51/00* (2013.01); *C01G 51/04* (2013.01); *C01G 51/40* (2013.01); *C09C 1/24* (2013.01); *C09C 3/063* (2013.01); *C09D 7/68* (2018.01); *F24S 70/20* (2018.05); *B82Y 30/00* (2013.01); *C01P 2002/01* (2013.01); *C01P 2002/85* (2013.01); *C01P 2002/88* (2013.01); *C01P 2004/03* (2013.01); *C01P 2004/04* (2013.01); *C01P 2004/16* (2013.01); *C01P 2004/54* (2013.01); *C01P 2004/62* (2013.01); *C01P 2004/64* (2013.01); *C01P 2004/84* (2013.01); *C01P 2006/60* (2013.01); *Y02E 10/40* (2013.01)

(56) References Cited

U.S. PATENT DOCUMENTS

| | | | |
|---|---|---|---|
| 8,202,407 B1 | 6/2012 | Harmala | |
| 2007/0065638 A1 | 3/2007 | Wang et al. | |
| 2008/0145513 A1 | 6/2008 | Li et al. | |
| 2010/0258111 A1* | 10/2010 | Shah | C23C 26/00 126/635 |
| 2011/0129537 A1* | 6/2011 | Vo-Dinh | A61K 41/0066 424/490 |
| 2011/0151356 A1 | 6/2011 | Adzic et al. | |
| 2011/0185728 A1 | 8/2011 | Meyers et al. | |
| 2012/0032113 A1* | 2/2012 | Buissette | C09K 11/7783 252/301.4 P |
| 2013/0168228 A1* | 7/2013 | Ozin | B01J 35/004 204/157.9 |
| 2015/0107582 A1* | 4/2015 | Jin | G02B 1/005 126/676 |
| 2015/0205326 A1* | 7/2015 | Lim | B32B 15/04 345/174 |

OTHER PUBLICATIONS

Image of dirt + snow covered Model T Ford (Year: 1942).*
Abstract of WO 2013/166521 A1 (Year: 2013).*
Atabaev, T.S., et al., "Facile synthesis of bifunctional silica-coated core-shell Y2O3:Eu3+,Co2+ composite particles for biomedical applications", Rsc Advances, 2012. 2(25): p. 9495-9501.
Cernik, R.J., et al., "Direct correlation between ferrite microstructure and electrical resistivity", Journal of Applied Physics, 2007. 101(10).
Dias, A. et al., Hydrothermal synthesis and sintering of nickel and manganese-zinc ferrites:, Journal of Materials Research, 1997. 12(12): p. 3278-3285.
He, C.X., et al., "Activity and Thermal Stability Improvements of Glucose Oxidase upon Adsorption on Core-Shell PMMA-BSA Nanoparticles", Langmuir, 2009. 25(23): p. 13456-13460.
Ho, C.K., et al., "Characterization of Pyromark 2500 Paint for High-Temperature Solar Receivers", Journal of Solar Energy Engineering-Transactions of the Asme, 2014. 136(1).
Jiang, et al., "CuO nanowires can be synthesized by heating copper substrates in air", Nano Letters, 2002. 2(12): p. 1333-1338.
Kar, S. et al., "Rapid Synthesis of Core/Shell ZnS:Mn/Si Nanotetrapods by a Catalyst-Free Thermal Evaporation Route", Acs Applied Materials & Interfaces, 2009. 1(7): p. 1420-1426.
Kim, H.W. et al., "Characteristics of GaN-core/Au-shell heterenanowires: Effects of thermal annealing on the structural and photoluminescence properties", Vacuum, 2009. 84(1): p. 254-257.
Kolb, G.J., et al., "Power Tower Technology Roadmap and Cost Reduction Plan", 2011, Sandia National Laboratories Report: SAND2011-2419.
Moon, et al., "Black oxide nanoparticles as durable solar absorbing material for high-temperature concentrating solar power", Solar Energy Materials & Solar Cells 134 (2015) 417-424.
Strehlow, W.H. et al., "Compilation of Energy Band Gaps in Elemental and Binary Compound Semiconductors and Insulators", J. Phys. Chem. Ref. Data, 1973. 2: p. 163.
Wang, G.X., et al., "Hydrothermal Synthesis and Optical, Magnetic, and Supercapacitance Properties of Nanoporous Cobalt Oxide Nanorods", Journal of Physical Chemistry C, 2009. 113(11): p. 4357-4361.
Wang, U., The Rise of Concentrating Solar Thermal Power Renewable Energy World: http://www.renewableenergyworld.com/rea/news/article/2011/06/the-rise-of-concentrating-solar-thermal-power.
International Search Report and Written Opinion of International Application No. PCT/US2015/020589; dated Jul. 31, 2015.

* cited by examiner

SOLAR ENERGY ABSORBING COATINGS AND METHODS OF FABRICATION

PRIORITY CLAIM AND RELATED PATENT APPLICATIONS

This patent document is a 35 USC § 371 National Stage application of International Application No. PCT/US2015/020589, entitled "SOLAR ENERGY ABSORBING COATINGS AND METHODS OF FABRICATION," filed Mar. 13, 2015, which claims priorities to and the benefits of (1) U.S. Provisional Application No. 61/952,774 entitled "SOLAR ENERGY ABSORBING COATINGS AND METHODS OF FABRICATION," and filed Mar. 13, 2014, and (2) U.S. Provisional Application No. 62/093,296 entitled "SOLAR ENERGY ABSORBING COATINGS AND METHODS OF FABRICATION," and filed Dec. 17, 2014. The entire contents of the aforementioned patent applications are incorporated by reference as part of the present document.

STATEMENT REGARDING FEDERALLY SPONSORED RESEARCH OR DEVELOPMENT

This invention was made with government support under grant DE-EE0005802 awarded by the Department of Energy (DOE). The government has certain rights in the invention.

TECHNICAL FIELD

This patent document relates to systems, devices, and processes that use optical to electrical energy conversion based on nanoscale material designs.

BACKGROUND

Nanotechnology provides techniques or processes for fabricating structures, devices, and systems with features at a molecular or atomic scale, e.g., structures in a range of one to hundreds of nanometers in some applications. For example, nano-scale devices can be configured to sizes similar to some large molecules, e.g., biomolecules such as enzymes. Nano-sized materials used to create a nanostructure, nanodevice, or a nanosystem can exhibit various unique properties, e.g., including optical properties, that are not present in the same materials at larger dimensions and such unique properties can be exploited for a wide range of applications.

SUMMARY

Techniques, systems, devices and materials are disclosed for solar-absorbing coatings with ultra-high optical performance, including highly-scalable, low-cost fabrication processes to manufacture the solar energy-absorbing coatings of the disclosed technology. In some implementations, the coatings include nanoparticles (NPs) of black oxides deposited on high-temperature metal alloy surfaces, e.g., which can be in the form of standalone NPs or NPs embedded in a dielectric ceramic matrix.

The systems, devices and techniques disclosed in this patent document provide for synthesized $Co_3O_4$ black oxide nanoparticles using a facile hydrothermal process and novel designs and fabrication processes of light-absorbing coating structure for high-temperature CSP systems. By introducing sacrificial polymer fillers into the nanopowder-based coating slurry, the surface texturing can be successfully obtained and the optical performance can be enhanced, as measured by a high figure of merit of 88.2%. For high temperature durability, a long-term aging test can be performed to show that the light-trapping structure remains intact after 750° C. exposure in air for 1,000 hours. Consequently, the FOM shows negligible change after the 1,000-hour exposure. The textured $Co_3O_4$ coating is a promising candidate for solar absorbing in next-generation high-temperature CSP systems. The $Co_3O_4$ layer can easily be spray-coated in a manner suitable for large-scale CSP receiver applications.

In one aspect, an optically selective coating includes a substrate including a solar energy absorbing material; and a nanostructure material formed over the substrate to absorb solar energy in a selected spectrum and reflect the solar energy in another selected spectrum.

The coating can be implemented to include one or more of the following features. The nanostructure material can include metal oxide nanoparticles embedded in a dielectric matrix material. The metal oxide nanoparticles can include black oxide nanoparticles and the dielectric matrix material can include ceramic, glass, or silica. The metal oxide nanoparticles can include Mn—Zn ferrites, Co ferrites, Co oxides, or Cu oxides. The metal oxide nanoparticles can include black oxides having an average nanoparticle size of 900 nm or less. The average nanoparticle size can be less than 500 nm. The average nanoparticle size can be less than 300 nm. The metal oxide nanoparticles can include Cu—Cr—O oxides. The Cu/Cr ratio can be substantially ½. The Cu/Cr ratio being substantially ½ can include 1±0.3/2±0.3. The Cu/Cr ratio being substantially ½ can include 1±0.15/2±0.15. The metal oxide nanoparticles can include Cu—Fe—Mn—O oxides. The Cu/Fe/Mn ratio can be substantially 1/1/1. The Cu/Fe/Mn ratio being substantially 1/1/1 can include 1±0.3/1±0.3/1±0.3. The Cu/Fe/Mn ratio being substantially 1/1/1 can include 1±0.3/1±0.3/1±0.3.

The coating can be implemented to include one or more of the following features. The nanostructure material can include nanorods. The nanostructure material can include a core-shell structure coated with nanoparticles. The core-shell structure can include yttrium oxide ($Y_2O_3$) nano-shell. The nanostructure material can include thermally resistant core-shell particles having semiconductor, metal and metal oxide as cores. The thermally resistant core-shell particles can include $Fe_3O_4$-Yttria, SiGe-Yttria, or Metal-Yttria core-shell nanoparticles. The coating can include an antireflection layer disposed over the nanostructure material. The nanostructure material can include Co Oxide and the antireflection layer can include $MgF_2$. The nanostructure material can include embedded hole patterns. The nanostructure material can include polymer beads. The nanostructure material can include a double layer coating structure. Both layers of the double layer coating structure can be nonporous. Top layer of the double layer coating structure can be porous and bottom layer can be nonporous. The top layer can include $CuFeMnO_4$ and the bottom layer include $CuCr_2O_4$.

In another aspect, a method of fabricating an optically selective coating includes providing a substrate that includes a solar energy absorbing material. The method includes forming a coat of nanostructure material over the substrate with the nanostructure material configured to absorb solar energy in a selected spectrum and reflect the solar energy in another selected spectrum. The forming includes performing one or more of hydrothermal, spark erosion, mechanical pulverization, or atomization.

The method can be implemented in various ways to include one or more of the following features. The nanostructure material can include at least one of semiconductor material including at least one of silicon (Si), germanium (Ge), SiGe, silicon boride, metal silicides, PbTe, PbSe, or PbS. The method can include creating a roughened surface on the coat of nanostructure material formed over the substrate. Creating the roughened surface can include incorporating and subsequently removing micron-sized sacrificial polymeric beads within the coat of nanostructure material. Creating the roughened surface can include introducing microfabricated patterns on the coat of nanostructure material. Forming the coat of nanostructure material over the substrate can include forming a double layer coating structure. Forming the double layer coating structure can include forming two nonporous layers. Forming the double layer coating structure can include forming a porous layer over a nonporous layer.

In another aspect, a concentrating solar power (CSP) system includes heat transfer fluids (HTFs); thermal energy storage system (TES); and a solar receiver in communication with HTFs, the solar receiver including a light absorbing coating layer based on cobalt oxide nanoparticles.

The CSP system can be implemented in various ways to include one or more of the following features. The solar receiver including the light absorbing coating layer based on cobalt oxide nanoparticles can be configured to raise the temperature to above 700° C. The cobalt oxide nanoparticles have a diameter in 100s of nanometers. The light absorbing coating layer can include cobalt oxide nanopowders dispersed in silica matrix, and depositing on metal substrates via a spray coating process. The solar receiver can include black oxide coated alloy tubes. The light absorbing coating layer can include Cu—Cr—O or Cu—Fe—Mn—O oxides.

In another aspect, a hydrothermal method of synthesizing cobalt oxide nanoparticles includes introducing a solution of sodium hydroxide (NaOH) with a solution of cobalt chloride salt to induce precipitation of cobalt hydroxide. The hydrothermal method includes performing hydrothermal process to transform the precipitated cobalt hydroxide into cobalt oxide particles. The hydrothermal method includes washing the cobalt oxide particles. The hydrothermal method includes annealing the washed cobalt oxide particles for phase separation.

The hydrothermal method can include mixing annealed cobalt oxide particles with a $SiO_2$ matrix.

DETAILED DESCRIPTION

Figure 1:
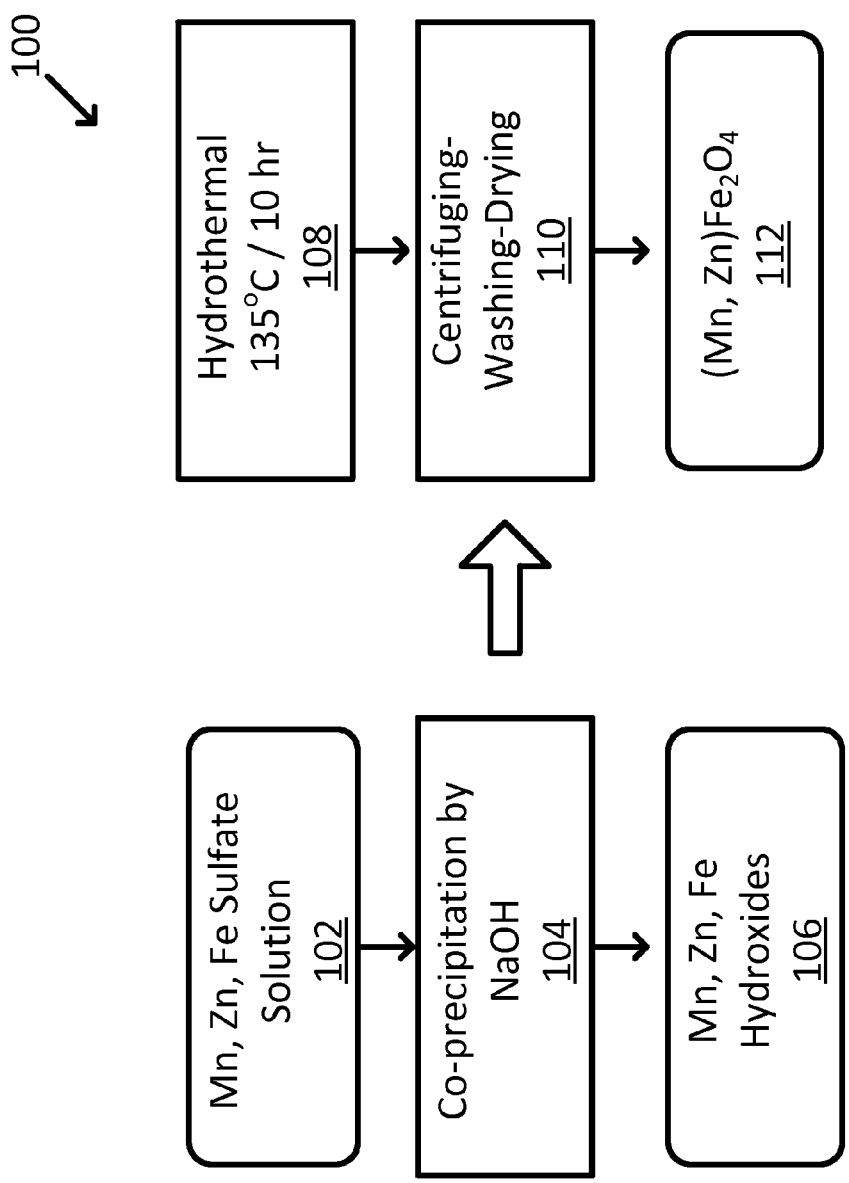
FIG. 1 shows an exemplary two-step hydrothermal synthesis of Mn—Zn ferrites particles, with the first step for metal hydroxides and the second step for converting the hydroxides to metal oxide.

Concentrated solar power (CSP) systems can convert concentrated sunlight into thermal energy (e.g., heat) by using solar absorbers. For higher Carnot efficiency of the power generation system, the desirable temperature of the HTF (heat transfer fluid) is 600° C. or higher, e.g., as the solar absorber temperature is higher than the HTF temperature.

For efficient operation, the solar absorber has to effectively absorb the solar energy in the solar wavelength spectrum (e.g., 0.4-2.5 μm range). In particular, for example, for solar thermal systems operating at high temperature, which is envisioned for future CSP systems such as solar towers, the solar absorbing coating also need to possess excellent durability at high temperature (e.g., above 600° C.) and oxidation resistance in air. It is desirable that the performance of the coating layer should not degrade significantly during the lifetime of the CSP systems, which is greater than 30 years. Even for absorbers placed inside evacuated enclosure, high temperature stability in air is still a very important metric because degradation of the absorbing coating could occur when the vacuum fails. In addition, it is expected that coating and its adhesion to the substrate must withstand more than 10,000 thermal calycles (e.g., from ~200° C. to >600° C.) due to the intermittent nature of solar irradiation. Finally, it is desirable to make the coating with inexpensive starting materials and low-cost and scalable processes.

An ideal solar absorbing coating that possesses all the aforementioned metrics would not only directly reduce the initial and O&M cost of solar receivers, but also enable higher operating temperature of the power cycles, which means higher thermal-electricity conversion efficiency and lower overall system cost. Therefore, solar absorbing coatings have a significant impact on the performance/cost of the CSP technology, and are recognized as one of the potential opportunities for levelized cost of energy (LCOE) cost reduction in the roadmap for CSP power tower technology.

The figure of merit (FOM) of a solar absorbing coating can be defined as, $$FOM = \frac{\int_0^\infty (1-R(\lambda))I(\lambda)d\lambda - \frac{1}{C}\left[\int_0^\infty (1-R(\lambda))B(\lambda,T)d\lambda\right]}{\int_0^\infty I(\lambda)d\lambda} \quad (1)$$

where $R(\lambda)$ is the measured spectral selectivity, $I(\lambda)$ is the spectral solar radiance per square meter as defined by ASTM G173, $B(\lambda,T)$ is the spectral thermal emission of a black body, and C is the concentration ratio (e.g., number of suns, or ratio of reflector area to absorber area). The temperature of the receiver (and therefore black body) is assumed to be 750° C. In practice, for example, all integrals are evaluated in the range of 300 nm-20 μm, as only negligible quantities of solar power are present outside this range. Eq. (1) shows that the FOM depends on the concentration ratio (C) and the temperature of the absorber (T).

Conventional state-of-the-art solar absorbing materials for high concentration ratio and high-temperature operation can include Pyromark 2500. For example, Pyromark 2500 is a silicone-based high-temperature paint that has been used on central receivers to increase solar absorptance. In the past, Pyromark 2500 high-temperature paint has been used on central receivers, including the Solar One Central Receiver Pilot Plant. The manufacturer of Pyromark 2500, Tempil, states that Pyromark 2500 resists temperatures up to 1093° C. (2000° F.) and can be applied on steel, aluminum, alloys, and ceramics. Pyromark 2500 has a very high solar absorptance (~0.96), but it also has a very high thermal emittance (>0.8) at the temperatures of interest (>600° C.).

Table 1 shows the FOM of Pyromark 2500 under different irradiance (Irradiance=C.I) and receiver temperature (T). It can be seen that the FOM of Pyromark is quite high. For example, at 700° C. receiver temperature with $10^6$ W/m$^2$ irradiance (or 1000 sun), the FOM is 0.91. The FOM is considerably lower than the solar absorptance (0.95) because of the high thermal emittance (>0.80).

TABLE 1

| T (° C.) | Irradiance (W/m$^2$) | | |
|---|---|---|---|
| | $2 \times 10^5$ | $6 \times 10^5$ | $1 \times 10^6$ |
| 100 | 0.95 | 0.95 | 0.95 |
| 700 | 0.73 | 0.88 | 0.91 |
| 1000 | 0.29 | 0.73 | 0.82 |

Despite its high FOM, Pyromark tends to degrade at high temperature. For example, it was reported that the solar absorptance decreased 3% from an initial value of 0.97 after 300 h of aging at 750° C. and after 20 h of aging at 850° C. Therefore, during CSP operation, the receiver coating has to be repaired after every 1-3 years, which represent a significant O&M cost. It is thus apparent that solar absorbing materials with high FOM and excellent durability at high temperature are needed to reduce the LCOE of CSP systems.

Techniques, systems, devices and materials are disclosed for solar-absorbing coatings with ultra-high optical performance, including highly-scalable, low-cost fabrication processes to manufacture the solar energy-absorbing coatings of the disclosed technology. In some implementations, the coatings include nanoparticles (NPs) of black oxides deposited on high-temperature metal alloy surfaces, e.g., which can be in the form of standalone NPs or NPs embedded in a dielectric ceramic matrix. The nanoparticles can include at least one of silicon (Si), germanium (Ge), SiGe, silicon boride, PbTe, PbSe, PbS, silicon boride, or metal silicides.

The disclosed technology employs a highly scalable, low cost process to make the solar absorbing coating with ultra-high optical performance. The solar absorbing coating is based on nanoparticles (NPs) of black oxides deposited on high-temperature metal alloy surfaces, e.g., either in the form of standalone NPs or embedded in a dielectric ceramic matrix. The exemplary NPs can be fabricated by a variety of processes, including 'spark erosion' or 'hydrothermal'. The solar absorbing coating material can be applied onto solar receivers by low cost coating processes such as spray coating.

In some implementations, for example, first, black oxide particles with appropriate size (~100 nm) are fabricated by hydrothermal. The use of other nanoparticle synthesis methods such as spark erosion, mechanical pulverization, atomization, etc. to provide the desired nanoparticle size and shape are not excluded for this method. Exemplary materials include black oxides, e.g., including Mn—Zn ferrites, Co ferrites, and Co oxides. Other forms of oxides, e.g., including $CrO_2$, $MnO_2$, CuO can be used. Table 2 shows a list of possible candidates of black oxides suitable for this application, along with their optical bandgap and melting points.

TABLE 2

| Semiconductors | Bandgap (eV, 300 K) | Bandgap (μm) | Particles Color |
|---|---|---|---|
| $CrO_2$ | 0.23 | 5.395 | Black, Tm 375° C. |
| $MnO_2$ | 0.26 | 4.772 | Black, Tm 535° C. |
| $Fe_3O_4$ | 0.1 | 12.408 | Black |
| $CoFe_2O_4$ | 1.2 | 1.34 | Black |
| $MnFe_2O_4$ | 0.3 | 4.136 | Black |
| $ZnFe_2O_4$ | 2.04 | 0.608 | Orange |
| $(Mn_{0.8},Zn_{0.2})Fe_2O_4$ | 0.85 (Simulated Eg) | 1.4 | Black, $\sigma = 5.04 \times 10^{-6}$ $\Omega^{-1}$ cm$^{-1}$ |
| $(Mn_{0.5},Zn_{0.5})Fe_2O_4$ | — | — | Black, $\sigma = 1.06 \times 10^{-6}$ $\Omega^{-1}$ cm$^{-1}$ |
| $(Mn_{0.2},Zn_{0.8})Fe_2O_4$ | — | — | Brown, $\sigma = 2.05 \times 10^{-8}$ $\Omega^{-1}$ cm$^{-1}$ |
| CoO | 0.47 (at 250 K) | 2.640 | Black |
| $Co_3O_4$ | 1.28 | 0.969 | Black |
| NiO | 0.92, 3.7 | 1.349, 0.335 | Green |
| CuO | 1.2 | 1.034 | Black |

Second, for example, these exemplary NPs are then coated onto solar receiver surface. The coating can be accompanied with water or organic solvent that is eventually dried, or with dielectric materials such as $SiO_2$ or other types of oxides. The coating can be done with spin coating, drop casting, spray coating, inkjet printing, and other forms of coating processes.

Followed by the coating process, for example, a curing process can be used to dry the water or organic solvents and harden the matrix material.

Exemplary implementations of the methods were performed to produce exemplary solar absorbing coatings. In the exemplary implementations, for properly chosen materials and morphology, the exemplary measurement and simulation results showed that such a nanoparticle based solar absorbing coating structure can achieve a high FOM of 0.88 or higher. Moreover, solar absorbing coatings made from some of the black oxide NPs were shown to be durable at temperature (e.g., up to 750° C.), stable after thermal cycling, and resistance to oxidation at high temperature.

Table 2 shows some exemplary materials based on desirable optical properties and bandgaps. For example, metal oxides with low band gap is necessary to achieve higher absorption of sun light from UV to NIR spectrum range because the solar spectrum with higher energy than the bandgap can be absorbed into the metal oxides to be used for exciting electron from valence band to conduction band. And metal oxide type of semiconductor is more recommended for CSP application rather than metalloid semiconductors because those metalloid semiconductors such as silicon proved to be thermally unstable at high temperature operation which is from 400° C. ° to 750° C. used in CSP power plant. For example, some metal oxides were reviewed to apply for the light receiver materials with higher absorption, as shown in Table 2.

As exemplary candidates for higher absorption materials, $CrO_2$ and $MnO_2$ are appropriate based on their very low band-gap energies. But their melting temperature may be too low to be applied for high temperature operation. $Fe_3O_4$ also has high solar absorption, but it can be easily converted to $Fe_2O_3$ by thermal oxidation at target temperature (750° C.) in air atmosphere. NiO looks black at room temperature which means the high absorption of visible light, but it also changes the color from black to green when heated up to 750° C. in air atmosphere.

Therefore, in the disclosed methods, spinel structured ferrites were focused on, e.g., including, but not limited to, $MFe_2O_4$ (where M=Mn, Co, MnZn), cobalt oxide (CoO), and copper oxide (CuO), all of which possess both low bandgaps and good stability at high temperature.

Mn—Zn Ferrites

The optical properties of Mn—Zn ferrites is expected to change with the content ratio of Mn vs. Zn elements in the ferrite composition, which may result from the different values oxygen deficiency, which in turn affects the electrical conductivity, dielectric constant, or refractive index depending on the compositions.

A facile hydrothermal process was employed to synthesize the Mn—Zn ferrites. For example, hydrothermal was employed because of it is scalable to industrial application. Also, hydrothermal yields nano-sized powders. An exemplary synthesis procedure 100 is shown in FIG. 1 for Mn—Zn ferrites. First, the co-precipitation of $Mn(OH)_2$, $Zn(OH)_2$, and $Fe(OH)_2$ is made from metal salts such as $MnSO_4.H_2O$, $ZnSO_4.7H_2O$ and $FeSO_4.7H_2O$ according to the stoichiometric contents of Mn—Zn ferrites (see 102, 104, and 106). The hydrothermal synthesis is made at 135° C. for 10 hours in order to transform the precipitated metal hydroxides into an alloy-type metal oxide (see 108, 110 and 112).

Figure 2:
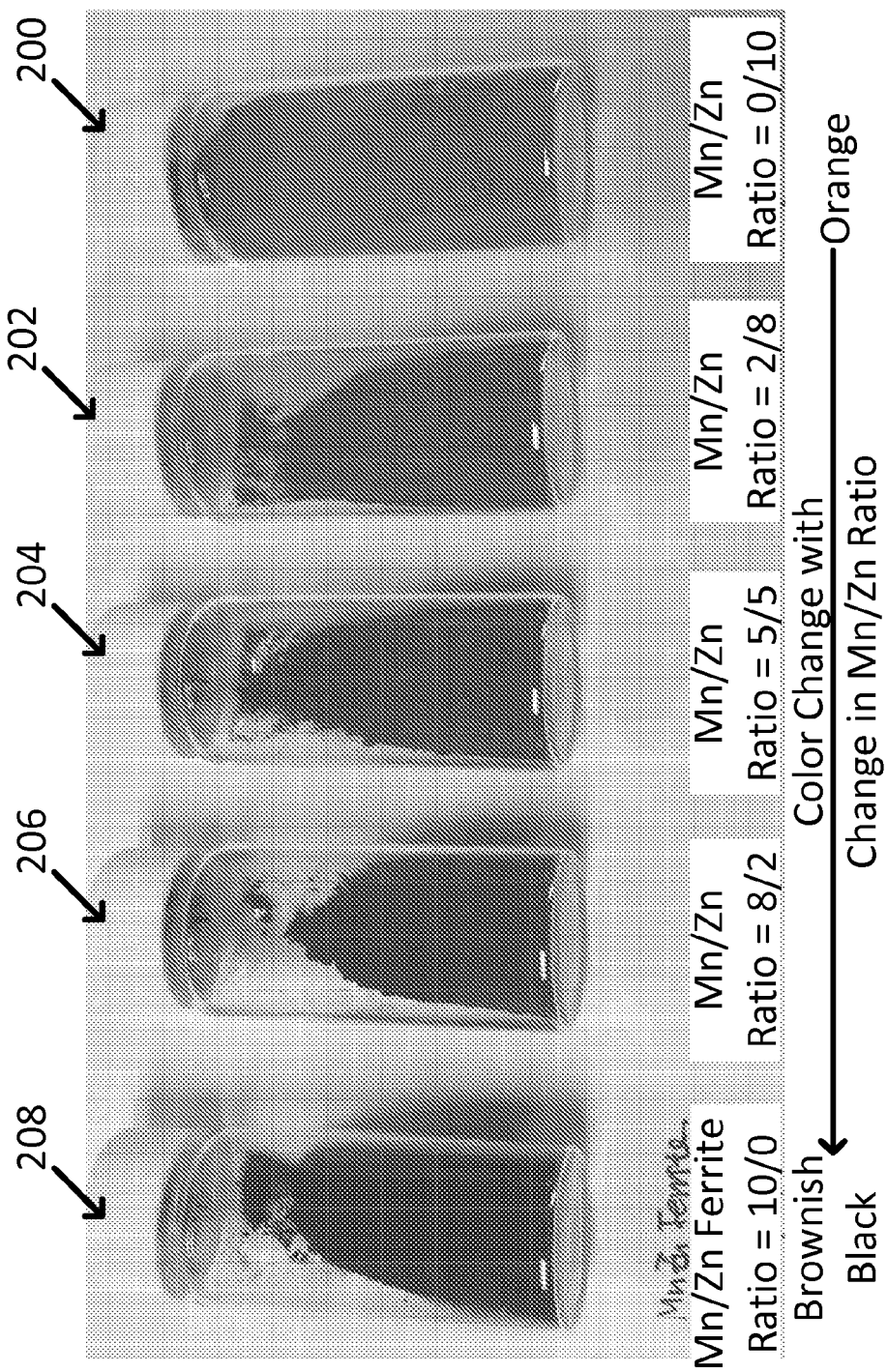
FIG. 2 shows exemplary synthesized ferrite nanoparticles showing the different colors with different Mn:Zn ratio (e.g., from left to right: Mn:Zn ratio=10:0; 8:2; 5:5; 2:8; 0:10).

The methods of the disclosed technology can control the composition of ferrites nanoparticles with a spinel structure ($AB_2O_4$) and evaluate the optimal Mn/Zn ratio of the ferrites. As shown in FIG. 2, the color of Mn—Zn ferrites is observed to change from orange to brownish black by a simple visual inspection, as the ratio of Mn/Zn increases from 0/1 to I/O. Five samples of Mn—Zn ferrites are shown in FIG. 2 including sample 200 (Mn/Zn ratio=0/10), sample 202 (Mn/Zn ratio=2/8), sample 204 (Mn/Zn ratio=5/5), sample 206 (Mn/Zn ratio=8/2), and sample 208 (Mn/Zn ratio=10/0). The color of the Mn—Zn ferrites changes from orange in sample 200 to brownish black in sample 208 according to the Mn/Zn ratio.

Figure 3:
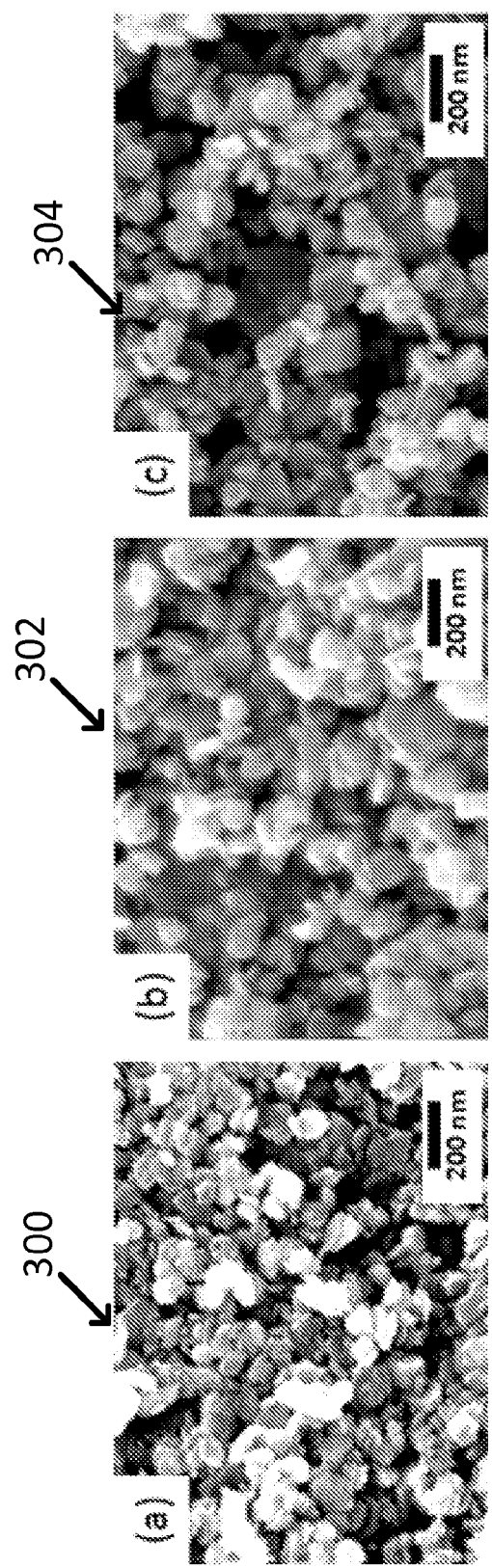
FIG. 3 shows scanning electron microscopy (SEM) images of exemplary as-synthesized Mn—Zn ferrite particles: (a) $MnFe_2O_4$, (b) $(Mn_{0.8}, Zn_{0.2})Fe_2O_4$, and (c) $(Mn_{0.5}, Zn_{0.5})Fe_2O_4$.

For example, the typical size of as-synthesized Mn—Zn ferrites was found to be nano size (e.g., 50-100 nm average diameter) which was obtained from SEM images 300, 302, and 304 especially for $MnFe_2O_4$, $(Mn_{0.8}, Zn_{0.2})Fe_2O_4$ and $(Mn_{0.5}, Zn_{0.5})Fe_2O_4$ respectively showing a dark color, as shown in FIG. 3. The tendency of particles color may result from the bandgap change which ranges from 0.3 eV (e.g., 4.136 μm) of $MnFe_2O_4$ to 2.04 eV (e.g., 0.608 μm) of $ZnFe_2O_4$ as listed in Table 2.

Information of Mn—Zn ferrites is summarized on Table 3, e.g., including the exact compositions, hydrothermal conditions, particle size, and color of the resultant powders.

TABLE 3

|  | Hydrothermal Condition | Size | Color |
| --- | --- | --- | --- |
| $MnFe_2O_4$ | 135° C., 10 hr | 50-100 nm | Brownish Black |
| $(Mn_{0.8},Zn_{0.2})Fe_2O_4$ | 135° C., 10 hr | 50-100 nm | Brownish Black |
| $(Mn_{0.5},Zn_{0.5})Fe_2O_4$ | 135° C., 10 hr | 50-100 nm | Brown |
| $(Mn_{0.2},Zn_{0.8})Fe_2O_4$ | 135° C., 10 hr | 50-100 nm | Yellowish Brown |
| $ZnFe_2O_4$ | 135° C., 10 hr | 50-100 nm | Orange |

The synthesized Mn—Zn ferrites particles with different compositions were then made to be of black color by annealing (e.g., at 850° C. for 2 hr in air atmosphere) in order to stabilize the crystal structure of Mn—Zn ferrites at a high temperature like 750° C. which is the targeted operation temperature of the CSP system.

Figure 4:
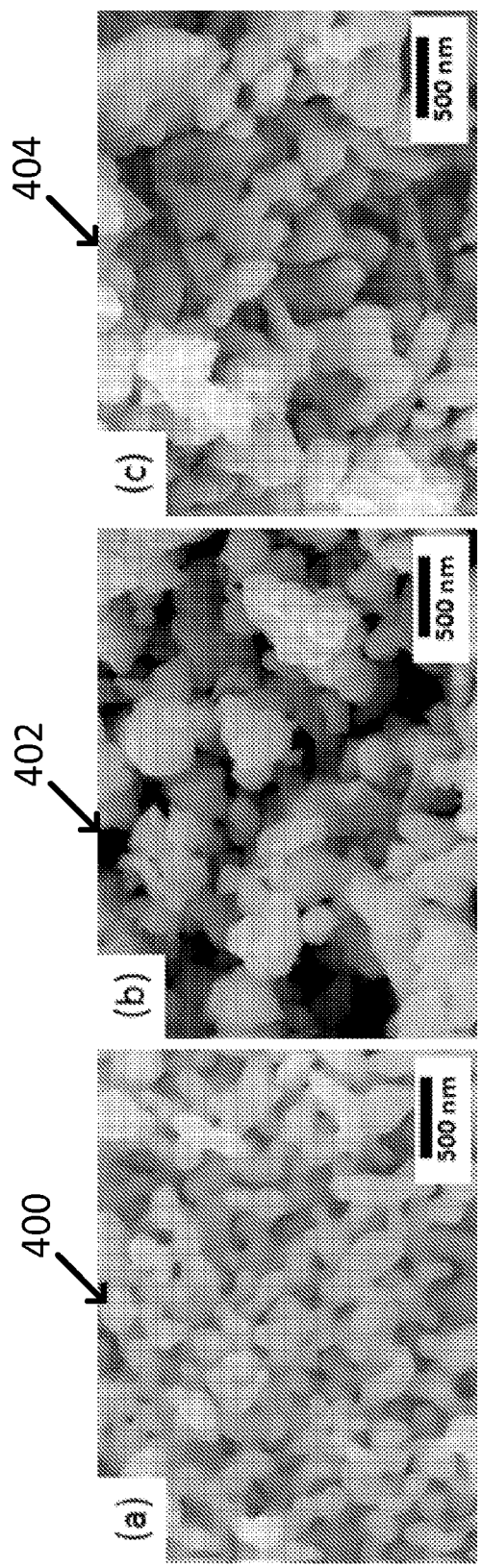
FIG. 4 shows SEM images of exemplary annealed Mn—Zn ferrites: (a) $MnFe_2O_4$, (b) $(Mn_{0.8}, Zn_{0.2})Fe_2O_4$, and (c) $(Mn_{0.5}, Zn_{0.5})Fe_2O_4$.

When the particles were annealed, some particle size growth appeared so that they have the size of 100-500 nm, as shown in FIG. 4. See images 400, 402, and 404. The color of annealed Mn—Zn ferrites particles changed to be more black after annealing as listed in Table 4, for example, even if the average size was somewhat increased due to the sintering effect.

TABLE 4

|  | As-Synthesized Particles | | Annealed Particles | |
| --- | --- | --- | --- | --- |
|  | Size | Color | Size | Color |
| $MnFe_2O_4$ | 50-100 nm | Brownish Black | 100-500 nm | Black |
| $(Mn_{0.8},Zn_{0.2})Fe_2O_4$ | 50-100 nm | Brownish Black | 100-500 nm | Black |
| $(Mn_{0.5},Zn_{0.5})Fe_2O_4$ | 50-100 nm | Brown | 100-500 nm | Black |

Co Ferrites

Figure 5:
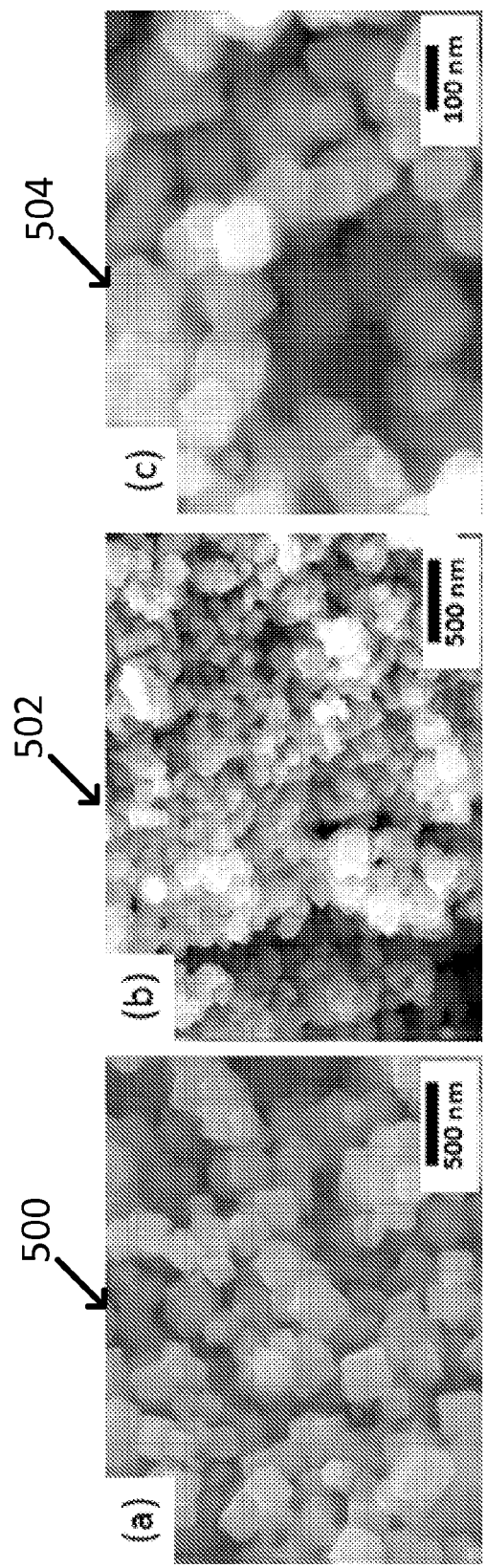
FIG. 5 shows SEM images showing exemplary $CoFe_2O_4$ nanoparticles with different size, which are produced by pH control, e.g., (a) pH <11, (b) pH >11, and (c) a magnified image of (b).

Co-ferrite ($CoFe_2O_4$) also shows the black color which is expected to have a high absorption of a visible light because this material has low bandgap of 1.2 eV (e.g., 1.034 μm). This type of nanoparticle can be synthesized through 2-step synthesis method which is similar to one of Mn—Zn ferrites. Especially, for example, chloride salt of cobalt and iron was useful for producing black-colored Co-ferrite nanoparticles which has a nano-sized cubic structure, as shown in FIG. 5. See images 500, 502, and 504 respectively. In the hydrothermal synthesis, a 2-step temperature control was used which is different from the Mn—Zn ferrites synthesis. And the size of nanoparticles can be controlled by means of pH value of the co-precipitated solution. Finally, the particle size could successfully be reduced from 100-300 nm to 50-100 nm by controlling pH above 11, as shown in FIG. 5 and Table 5.

TABLE 5

|  | Hydrothermal Condition | Size/Shape | Color (As-Synthesized) |
| --- | --- | --- | --- |
| (a) | pH <11, 100 C./5 hr-150 C./15 hr | 100-300 nm/Cube | black |
| (b) | pH <11, 100 C./5 hr-150 C./15 hr | 50-100 nm/Cube | black |

Cobalt Oxide Nanoparticles and Nanorods

Figure 6:
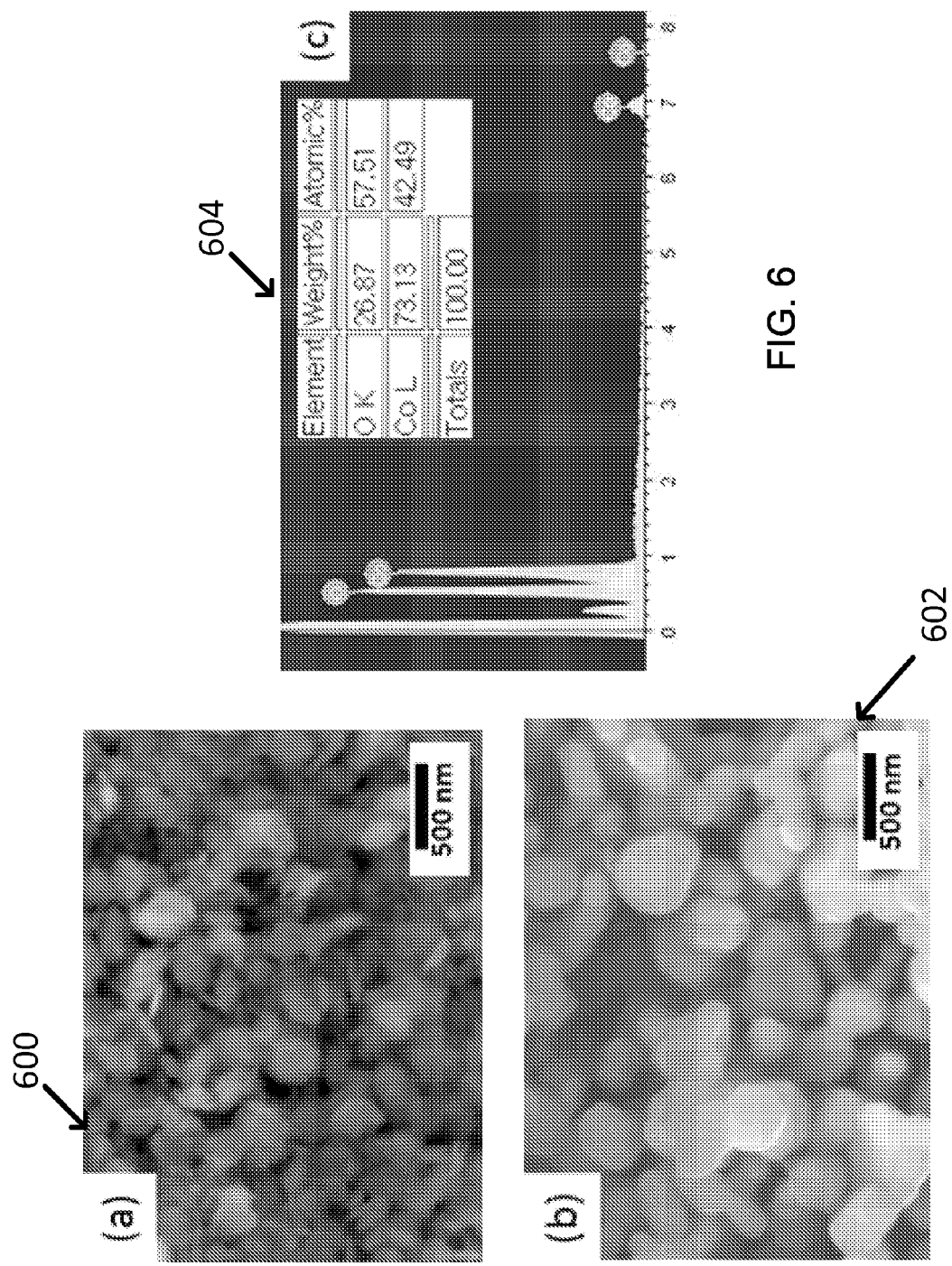
FIG. 6 shows SEM images showing exemplary cobalt oxide nanoparticles (a) as-synthesized and (b) after annealing at 750° C. for 2 hr, and (c) exemplary EDX analysis results.

Cobalt oxide (CoO) has a relatively low bandgap which is 0.47 eV (e.g., 2.64 μm, at the temperature of 250 K) so that the high absorption effect is expected to obtain. These exemplary cobalt oxide NPs were also made by the hydrothermal synthesis, which was similar to the exemplary MnZn-ferrites method. For example, cobalt chloride salt was used as a precursor material and the temperature of hydrothermal synthesis was 150° C. for 20 hr, for example. The synthesized CoO NPs and annealed NPs were observed with SEM images 600 and 602, as shown in FIG. 6.

In order to increase the crystallization and the thermal stability, the synthesized cobalt oxide particles were annealed (e.g., at 750° C. for 2 hr in air atmosphere) after which particle size increased to 100-300 nm and the color was black. By means of EDX composition analysis, the annealed particles proved to be cobalt oxide as shown in FIG. 6(c) (graph 604). The solar absorbing coating layer was fabricated with the annealed cobalt oxide particles, and the optical properties are shown later in this patent document.

Figure 7:
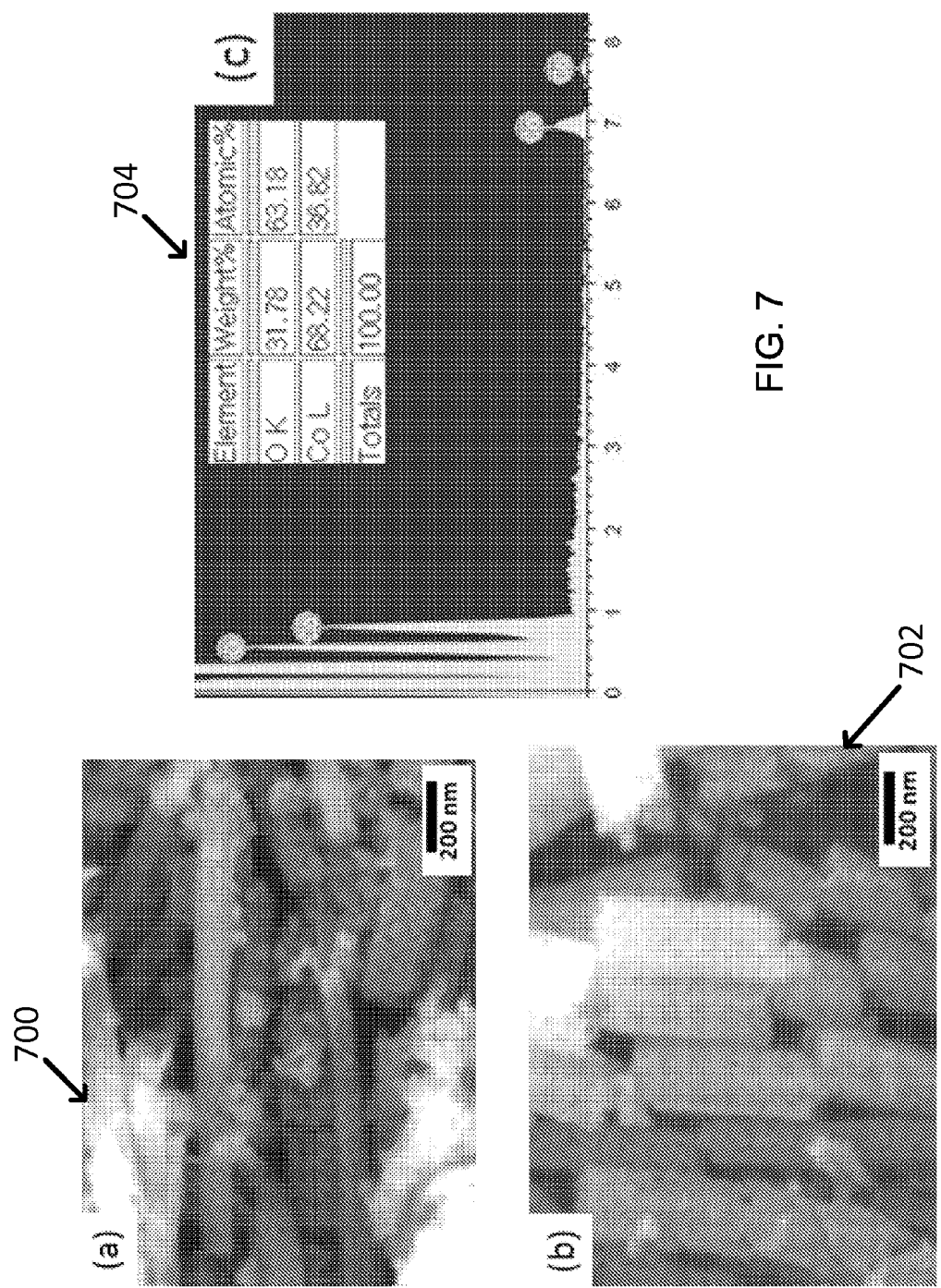
FIG. 7 shows SEM images showing exemplary cobalt oxide ($Co_3O_4$) nanorods, e.g., including (a) long nanorods with high aspect ratio and (b) short nanorods with low aspect ratio, and (c) exemplary EDX analysis result.

Secondly, nanorods (NRs) of cobalt oxide were synthesized by hydrothermal method using cobalt chloride salt and urea($CO(NH_2)_2$) at 105° C. for 10 hour. After drying precipitates in a vacuum oven, the annealing process was made at 300° C. for 3 hour in air. For example, cobalt oxide made by this method can be $Co_3O_4$ which has a bandgap of 1.28 eV (e.g., 0.969 μm). The synthesized nanorods of $Co_3O_4$ have black color which is caused by the bandgap as low as Co-ferrite. The exemplary images and size information 700 and 702 are summarized in FIG. 7 and Table 6. As shown in FIG. 7(c) (graph 704), obtained was EDX analysis result which shows that Co content ratio of nanorods are smaller than that of cobalt oxide particles. Therefore, cobalt oxide particles can be estimated to be CoO by EDX comparison between particles and nanorods and cobalt oxide nanorods are expected to be $Co_3O_4$. Two types of cobalt oxide nanorods were formed including long rods with high aspect ratio and short rods with low aspect ratio as summarized in Table 6. These various cobalt oxide NRs can be highly expected to increase the solar absorption when applied for CSP light receiver materials.

TABLE 6

| | Synthesis Condition | Size | Color |
|---|---|---|---|
| Cobalt Oxide Particles | Hydrothermal: ph <11, 150° C., 20 hr | As-synthesized 50-300 nm → Annealed 100-300 nm Annealed at 300° C. | Black (Annealed) |
| Cobalt oxide Nanorods | Hydrothermal: 105° C., 10 hr → Anneal: 300° C., 3 hr | Long rod: L1 μm, D 100 nm Short rod: L 200-500 nm, D 150 nm | Black |

Copper Oxide Nanoparticles and Nanorods

Figure 8:
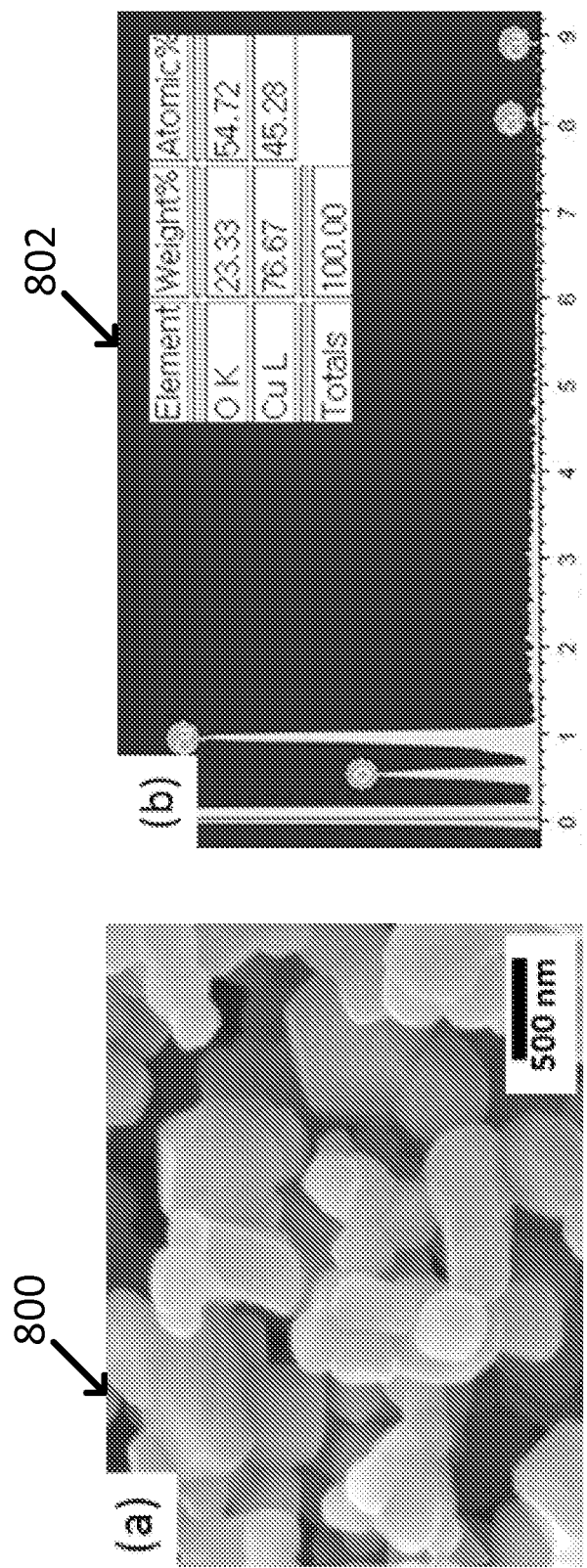
FIG. 8 shows (a) SEM images showing exemplary CuO particles annealed at 750° C. for 2 hr in air, and (b) the composition analysis result by EDX.

The bandgap of copper oxide (CuO) is as low as 1.2 eV (e.g., 1.034 μm) which can be applicable for CSP light receiver material. At first, copper oxide particles were synthesized with hydrothermal method using copper chloride salt and annealed (e.g., at 750° C. for 2 hr in air). The image and particle size measured by SEM 800 are shown in FIG. 8(a). In addition, EDX analysis confirms the composition of this material is approximately CuO (FIG. 8(b)) (Graph 802).

Figure 9:
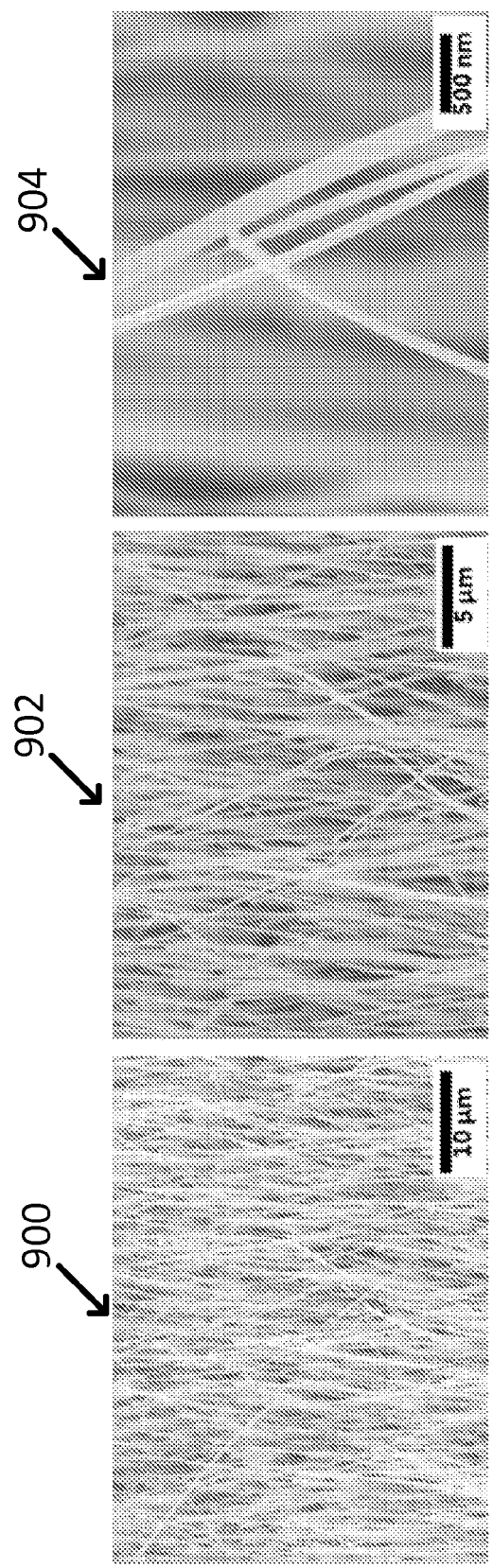
FIG. 9 shows SEM images of exemplary CuO nanowires which were thermally grown on Cu foil.

In addition to copper oxide particles, CuO nanowires were also thermally grown on Cu foil by heat treatment at 500° C. for 5 hr in air atmosphere. The images and size of this CuO nanowires were observed with SEM (800, 902 and 904), as shown in FIG. 9. The color of CuO nanowires looks much blacker than CuO particles, which may result from nanowires structure effect enabling the visible light to be trapped in the forest structure.

Ceramic Nano-Shell Coating

Figure 10:
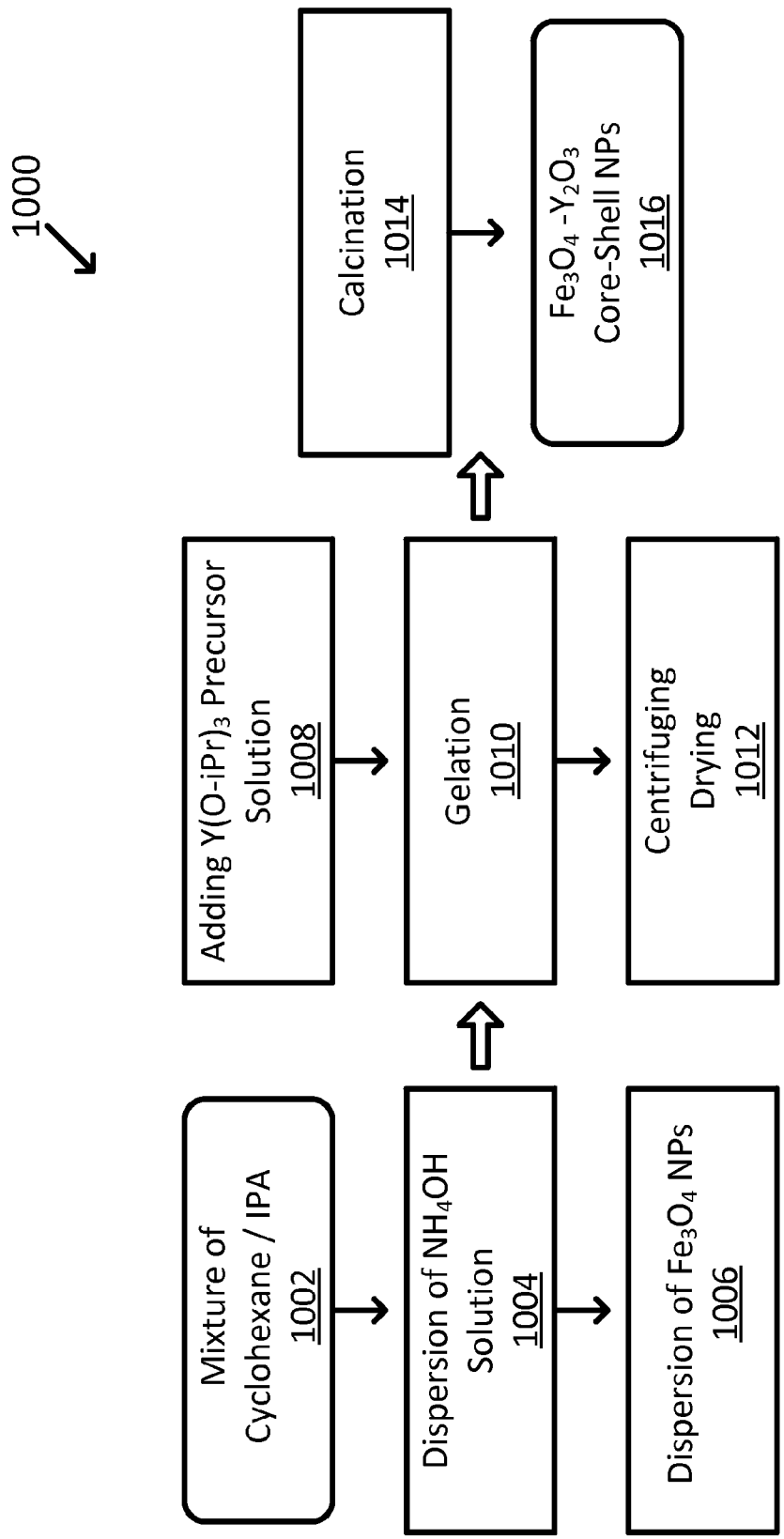
FIG. 10 shows the nano-shell synthesis procedure to make $Fe_3O_4$—$Y_2O_3$ core-shell NPs.

The refractory yttrium oxide ($Y_2O_3$) nano-shell was introduced as a new core-shell type structure. Such a structure coated with tight shell of very stable oxide like $Y_2O_3$ is expected to prevent nanoparticles from sintering-induced coarsening during high temperature service. Also, the presence of stable oxide shell could beneficially stabilize the oxidation state (oxygen deficiency or oxygen stoichiometry) of metal oxides much more than the oxide without an yttria shell. In order to confirm these effects of yttria shell, $Fe_3O_4$—$Y_2O_3$ core-shell nanoparticles were synthesized utilizing the concept of a reverse emulsion method which was previously applied for $SiO_2$ shell, with 20-30 nm $Fe_3O_4$ particles and $Y(O-iPr)_3$ (yttrium iso-propoxide) precursor, as the procedure 1000 described in FIG. 10. See 1002, 1004, 1006, 1008, 1010, 1012, 1014, and 1016.

Figure 11:
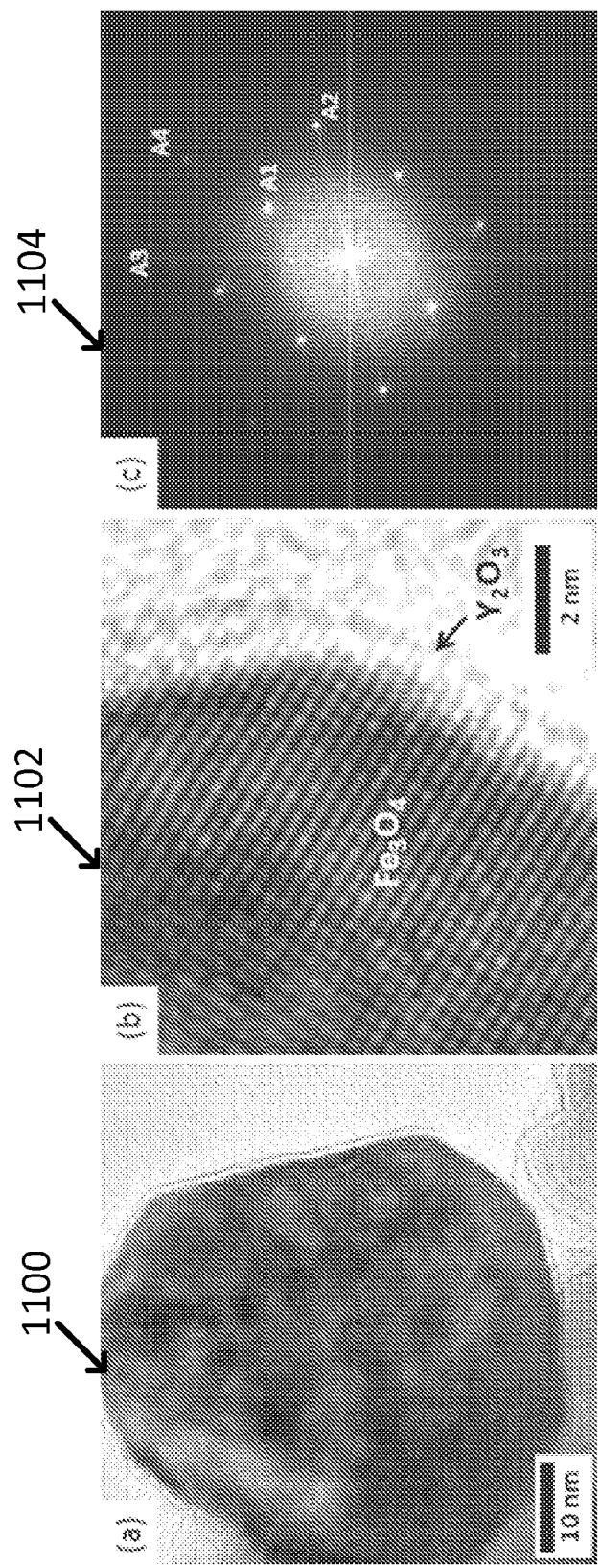
FIG. 11 shows (a) TEM images of exemplary $Fe_3O_4$—$Y_2O_3$ core-shell nanoparticles, (b) its magnified lattice image, and (c) its FFT patterns for the image (b).

For example, when the exemplary core-shell nanoparticle was observed with TEM, the core was $Fe_3O_4$ having (220) and (400) plane as a main crystal structure and the shell could be estimated to be $Y_2O_3$ which had (026), (541), (046), or (543), as shown in FIG. 11(c) (image 1104) and Table 8. The yttria shell is approximately 1-2 nm thick, as shown in FIG. 11(a) (image 1100) and (b) (image 1102).

TABLE 8

| | d-spacing (Å) | $Fe_3O_4$ (Core) | $Y_2O_3$ (Shell) |
|---|---|---|---|
| A1 | 2.978 | (220) | — |
| A2 | 2.099 | (400) | — |
| A3 | 1.616 | (511) | (026), (541) |
| A4 | 1.488 | (440) | (046), (543) |

Figure 12:
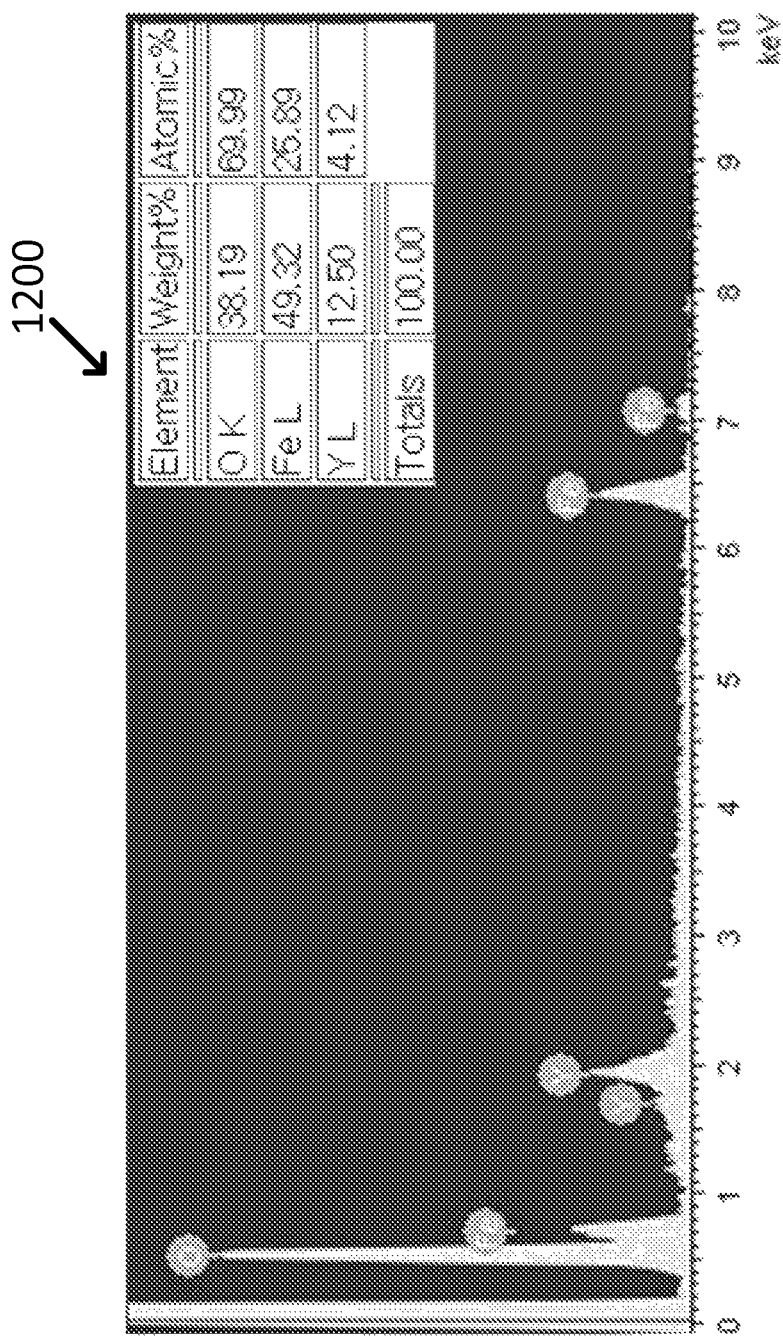
FIG. 12 shows the EDX analysis result of exemplary $Fe_3O_4$—$Y_2O_3$ core-shell nanoparticles.

The formation of yttria shell could be also confirmed by EDX analysis (Graph 1200) from which Y element occupied around 4 at % and Fe element was approximately 26 at %, as shown in FIG. 12.

Figure 13:
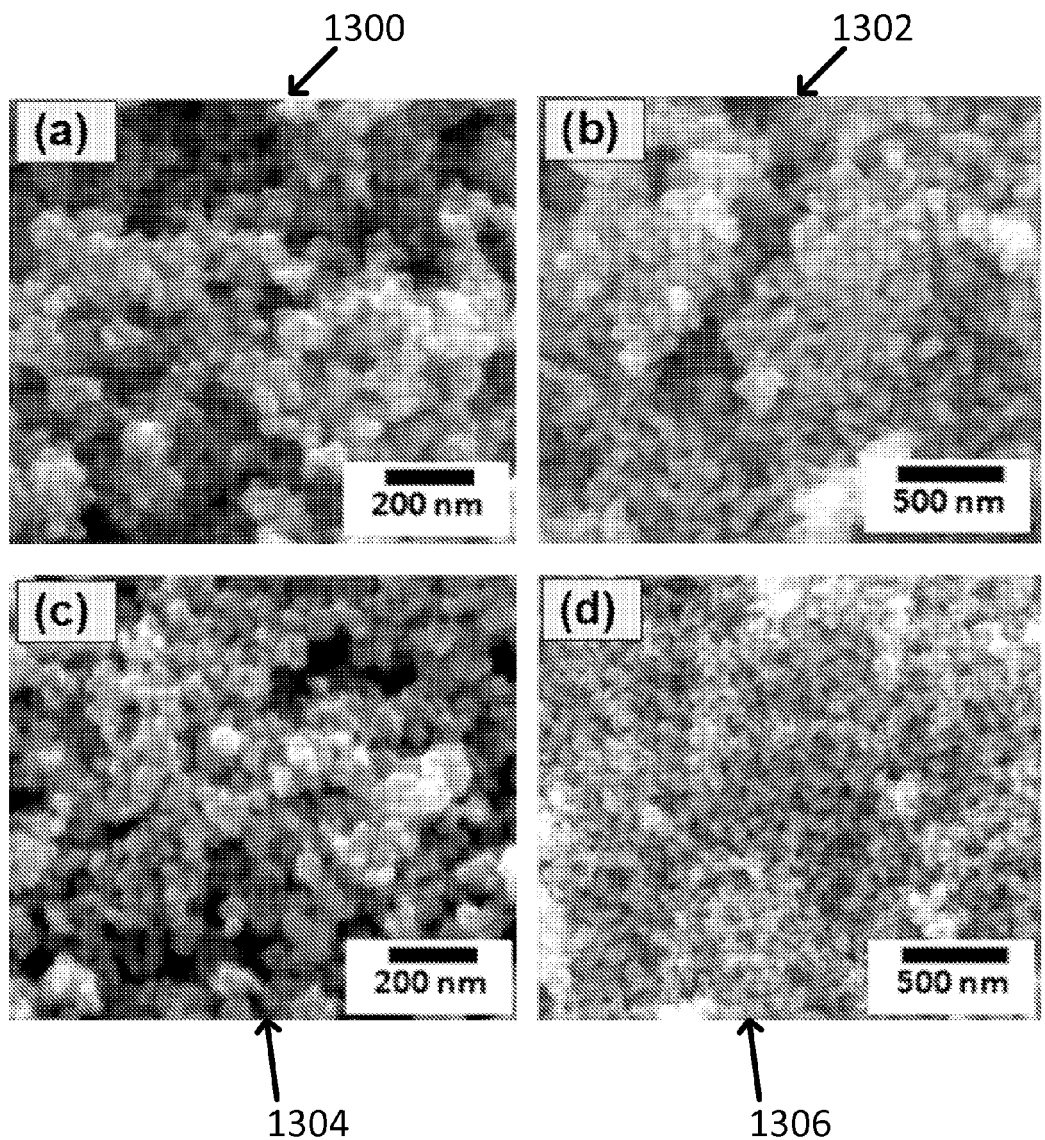
FIG. 13 shows SEM images showing the size change of exemplary bare $Fe_3O_4$ and $Y_2O_3$-coated $Fe_3O_4$ NPs depending on the annealing temperature, e.g., (a)~(b): $Fe_3O_4$, and (c)~(d): $Y_2O_3$-coated $Fe_3O_4$; (a) and (c): as-made, (b) and (d): annealed at 750° C. for 2 hr.

Yttria shell effect can be evaluated by comparing the sintered size between bare $Fe_3O_4$ NPs and $Y_2O_3$-coated $Fe_3O_4$ NPs, as shown in images 1300, 1302, 1304 and 1406 of FIG. 13. From the result of annealing test, it was shown that yttria shell played a role of making the sintering of iron oxide core nanoparticles more difficult up to a temperature of 750° C. The exemplary nanoparticle sintering rate at 950° C. was also reduced, as listed in Table 9.

TABLE 9

| | As-made | 750° C. 2 h Air |
|---|---|---|
| $Fe_3O_4$ NPs | 20-30 nm | 50-100 nm |
| $Fe_3O_4$—$Y_2O_3$ | 20-30 nm | 30-50 nm |

This type of ceramic nanoshell can be applied for other metal oxide particles such as metal-ferrites, cobalt oxide, and copper oxide to keep particles from sintering and growing at high temperature. In addition to yttria shell, for example, silica ($SiO_2$) shell can be considered to reduce the sintering phenomena and to increase the thermal stability of oxygen stoichiometry of metal oxides.

Coating Procedure and Surface Enhancement—Coating Procedure

Figure 14:
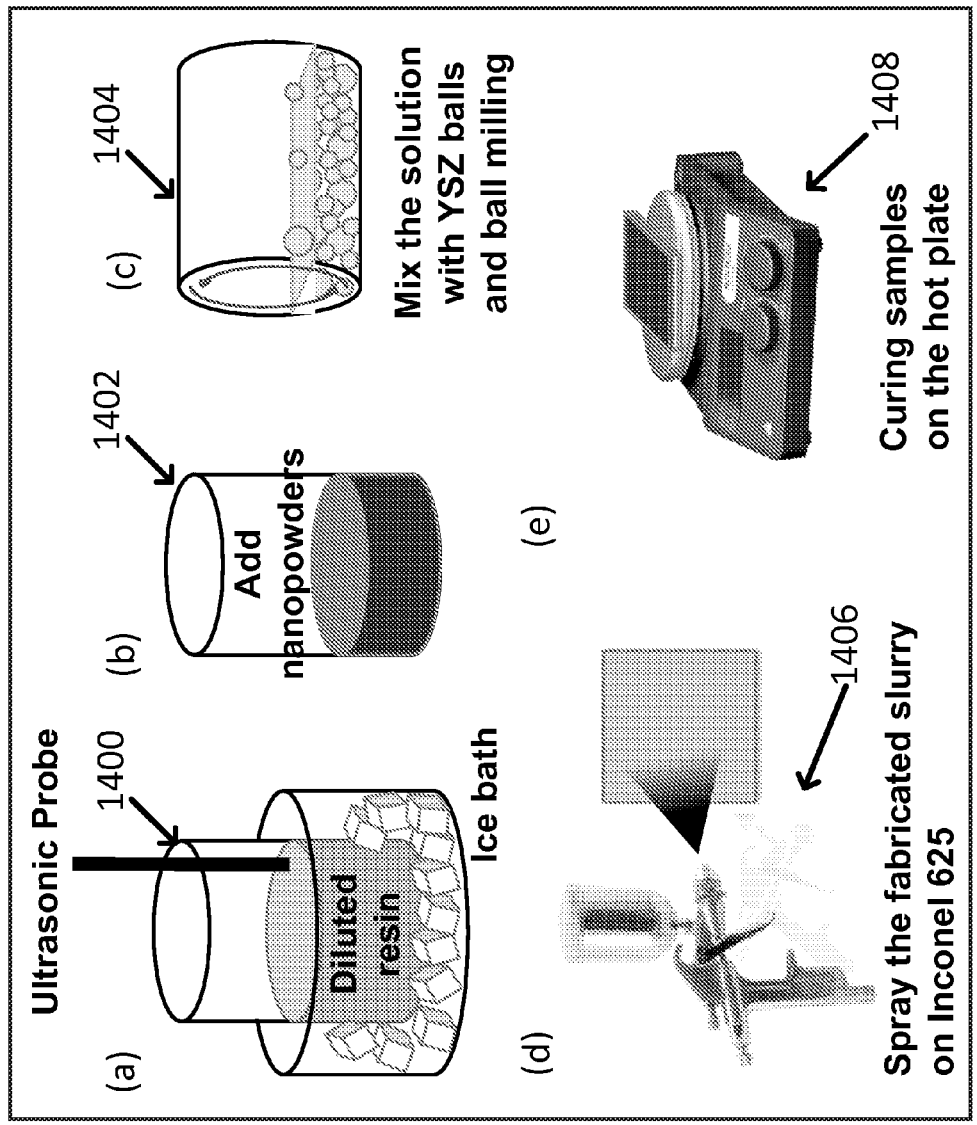
FIG. 14 shows an exemplary fabrication procedure of light absorbing coating layers: (a) diluted resin with toluene (or xylene) and isobutanol (volume 3:1) thoroughly using an ultra-sonic probe, (b) added the synthesized nanopowders into the diluted resin, (c) ball milled the slurry with zirconia grinding balls for 24 hr, (d) sprayed the slurry on Inconel metal substrates and (e) cured the samples at 250° C. for 1 hr.

An illustrative process diagram of an exemplary coating procedure of the sunlight absorbing coating layers is shown in FIG. 14. The exemplary coating procedure of FIG. 14 was implemented in the following manner in an exemplary implementation of the coating procedure. At first, for example, silicone resin was diluted with toluene(or xylene) and isobutanol (3:1) mixture in accordance with a designed recipe and homogenized thoroughly by using an ultrasonic probe for 30 mins (1400). During sonication process, a container of the mixture was immersed in an ice bath, e.g., to avoid the concentration change due to solvent evaporation. Then, synthesized nano-sized powders were added into the diluted resin (1402). In order to fabricate uniform slurries, a ball milling process was carried out (1404). Yttria stabilized zirconia grinding balls with two different sizes (¼" and ⅛" diameters, were mixed into the blend of powders and diluted resin by volume ratio 1:1. The ball milling process was performed for 24 hours. The slurry was obtained after sieving out YSZ balls using a poly mesh sheet. The Inconel substrates were prepared in advance with the following procedures. The surface of metal substrates was roughened by sand blasting and the Inconel coupons were cleaned by using ultra-sonication in acetone and IPA for 30 mins. A gravity-feed air brush was used for spraying the slurry on Inconel substrates (1406). The spray conditions were optimized and the optima values are as follow, for example: pressure: 40 psi, distance between the spray gun and the sample: 10 cm, and scan speed: 10 cm/sec. Finally, in order to convert the methyphenyl polysiloxane resin to $SiO_2$ dielectric matrix, the samples were cured at 250° C. in open air for 1 hour on a hot plate (1408).

Coating Procedure and Surface Enhancement—Surface Enhancement

A surface with proper roughness can possess enhanced solar absorption. The length scale most relevant to optical performance lies in the 100's of nanometers to a few microns. For example, in order to enhance the roughness of otherwise flat surfaces made from the spray coating process, two different techniques were employed that are both effective and scalable. Combing these two exemplary techniques result in a greater FOM.

Coating Procedure and Surface Enhancement—Polymer Beads

In some exemplary implementations, for example, porous coating structures were first made by using sacrificial organic additives, e.g., such as polymer beads, which were initially mixed with the coating materials and subsequently removed upon high-temperature annealing, leaving behind voids that give rise to porous structures and rough surfaces. For example, polystyrene beads were applied with controllable size distribution (other type of polymer beads should also be feasible). For example, in order to make porous coating layers and enhance the surface roughness on black oxide coating samples, the volumetric concentration of the polymer beads, the black oxide powders, and $SiO_2$ matrix was optimized.

The detailed processes of making the porous and rough structures using the polymeric beads are as follows: (a) mixing silicon resin and xylene and isobutanol (3:1) mixture by using probe-sonication for 30 mins, (b) adding the polymer beads and the homogenization by using probe-sonication for 30 min, (c) adding the black oxide powders into the solution, (d) ball milling with YSZ grinding balls for 24 hours, (e) spraying the slurry on Inconel substrate, and (f) removing the polymer beads by heating the samples at 750° C. for 30 min.

Figure 15:
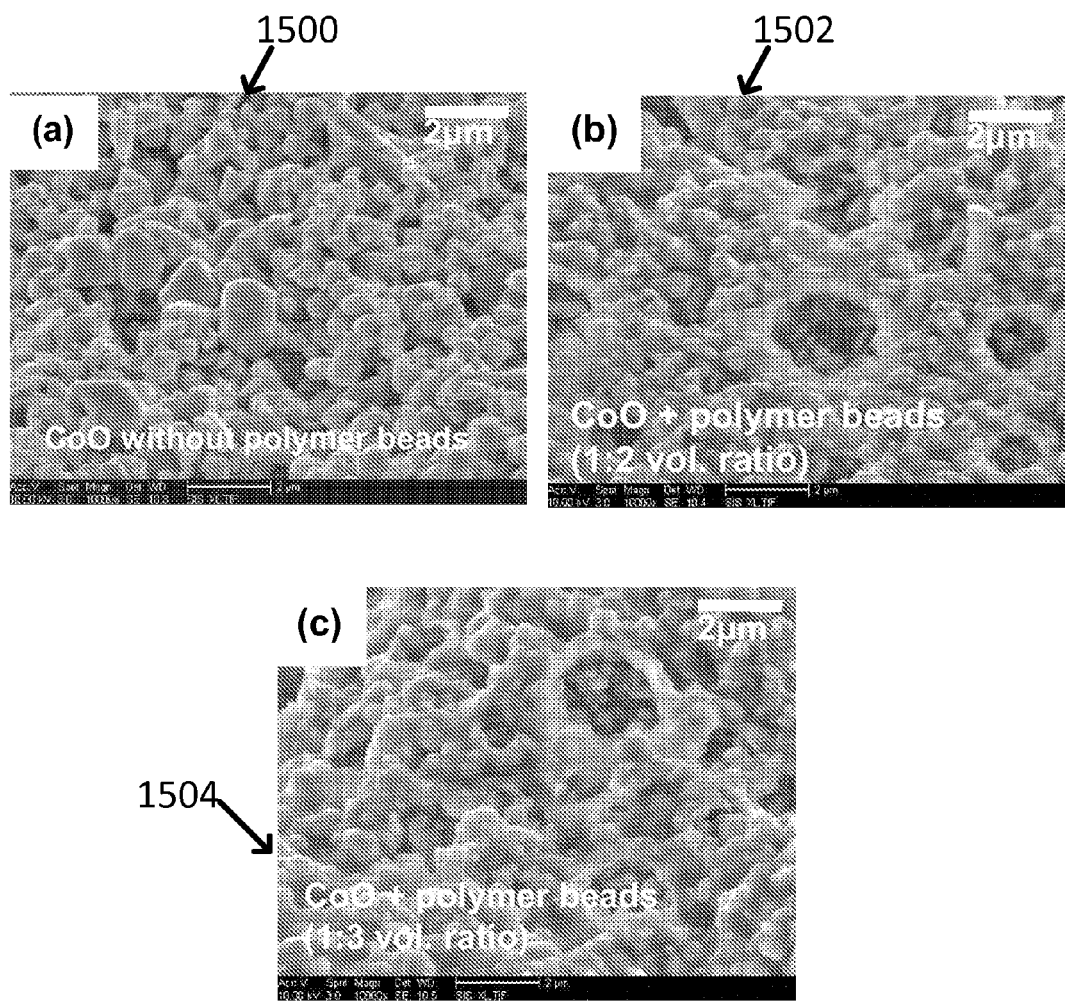
FIG. 15 shows SEM images of the exemplary porous CoO layers employing the polymer with the polymer beads of volume ratio.

The enhanced surface roughness was observed in SEM images 1500, 1502 and 1504 (FIG. 15(a)-(c)). As the volume of polymer beads increases, the surface gets roughened which leads light absorptivity.

Coating Procedure and Surface Enhancement—Polymer Stamps

Figure 16:
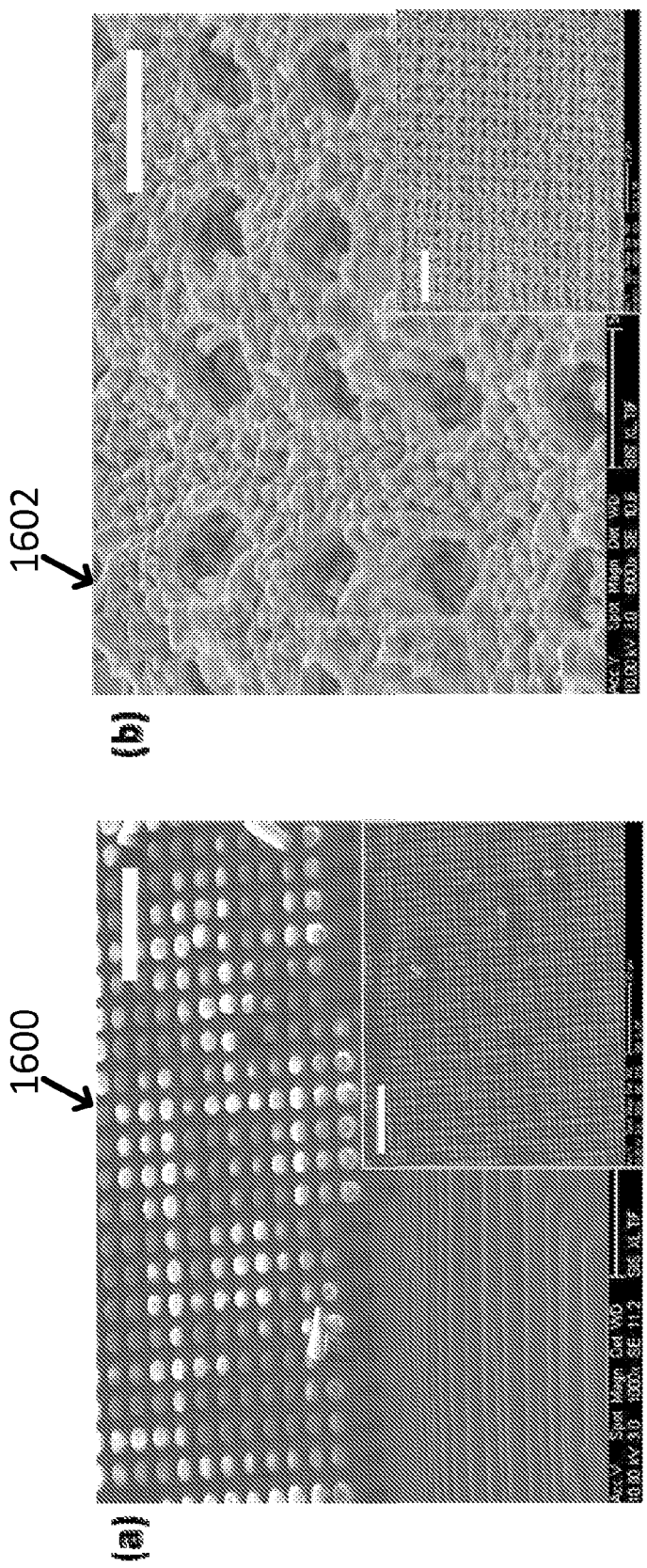
FIG. 16 shows SEM images of (a) exemplary SU-8 stamp (e.g., scale bar: 20 μm, inset, 50 μm) and (b) exemplary CoO solar absorbing coating layer after applying a SU-8 stamp (e.g., scale bar: 5 μm, inset, 20 μm).

An exemplary approach was employed to achieve larger surface roughness based on microfabricated stamps. Since micro-sized patterning is relatively easy to fabricate, a photolithography technique was employed to introduce micro-sized patterns on solar absorbing coating layer. One attempt included making a SU-8 stamp of 10 μm-tall and 3 μm(diameter)-3 μm(distance between next pillars) sized pillars to make hole patterns on solar absorbing coating layer as shown in image 1600 of FIG. 16(a). The stamp was applied on the CoO solar absorbing coating layer right after spraying before curing on the hot plate. Then, the sample was annealed at 750° C. for 30 min to remove SU-8 photo resist. The final structure was shown in image 1602 of FIG. 16(b).

Figure 17:
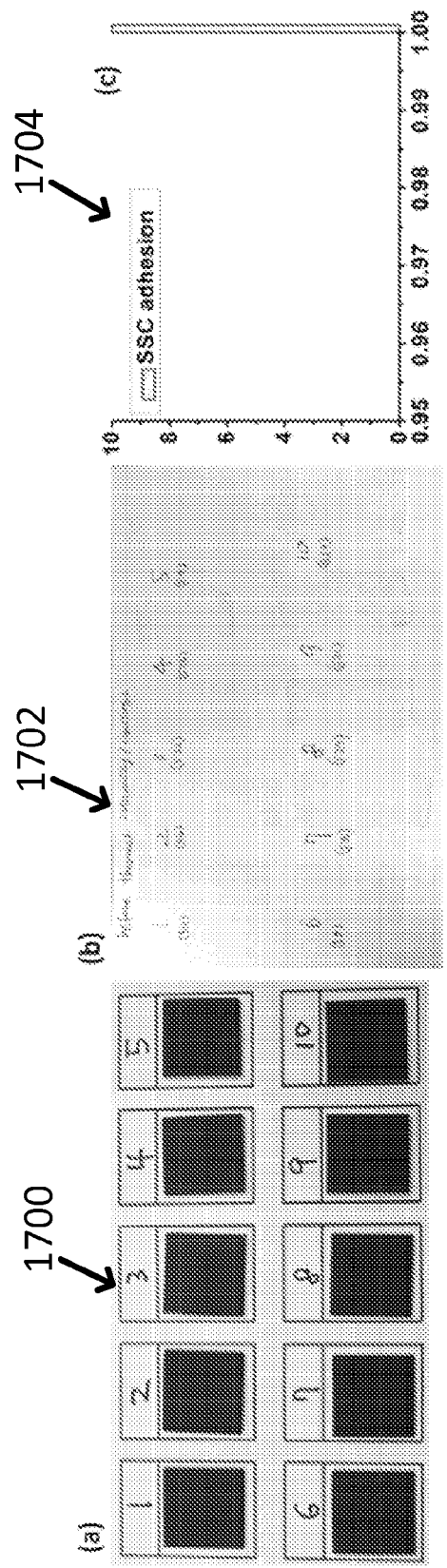
FIG. 17 shows the tape testing results of exemplary MnZn ferrite coatings: photograph of (a) the samples and (b) the tapes which were used for tape testing; and (c) shows a histogram of a ratio between total test area and lost area of 10 samples. For example, all the 10 exemplary samples were 100% retention area (M=1.0, SD=0).

Exemplary Performance of Solar Absorbing Coating Made of Black Oxide Nanoparticles Coating Procedure and Surface Enhancement—Adhesion to the Substrate In some implementations, for example, the tape test was used to evaluate the adhesion of the coating layers. FIG. 17(a) shows a photograph 1700 of 10 samples of MnZn ferrite solar absorbing coating after tape testing and FIG. 17(b) shows a photograph 1702 of the tapes which were used for tape testing. Both the sample and the tapes are very clean and there is not de-laminated area from the coating layers. For example, all of area lost of 10 samples are 0. FIG. 17(c) displays a histogram 1704 of (total test area-area lost)/total test area of 10 samples. This exemplary result suggests that the intact area of the 10 samples after tape testing is 100%, which indicates that the coating adhesion is excellent.

Mn—Zn Ferrites

Figure 18:
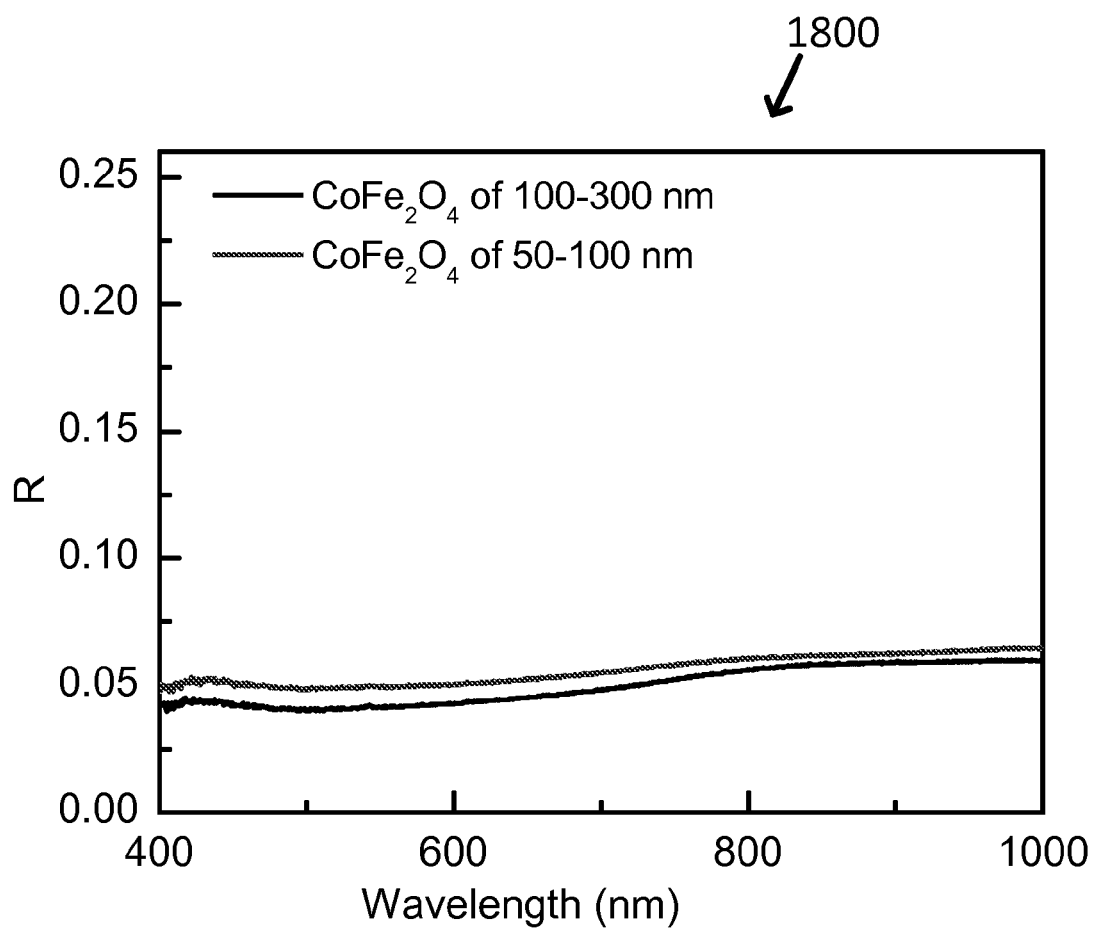
FIG. 18 shows the reflection curves for solar absorbing coating layers of exemplary Co-ferrites with different size, which were measured at room temperature before annealing of solar absorbing coating layers.

As shown in Graph 1800 of FIG. 18 and Table 10, the overall absorption of visible light increases when Mn/Zn ratio increases from 0/1 to 0.8/0.2. But what is particular thing is that $MnFe_2O_4$ with no Zn element had lower absorption than $(Mn0.8, Zn0.2)Fe_2O_4$ ferrite, which means the optimal atomic ratio of Mn/Zn to make a highest absorption is 0.8/0.2 based on this synthesized particle and measurement. Therefore, a broad recommended ratio of Mn/Zn can include the range from 0.5/0.5 to 1.0/0.0.

TABLE 10

|  | Particle Size | SSC Layer Color | FOM |
| --- | --- | --- | --- |
| $MnFe_2O_4$ | 100-500 nm | Black | 0.8418 |
| $(Mn_{0.8},Zn_{0.2})Fe_2O_4$ | 100-500 nm | Black | 0.8482 |
| $(Mn_{0.5},Zn_{0.5})Fe_2O_4$ | 100-500 nm | Black | 0.8489 |
| $(Mn_{0.2},Zn_{0.8})Fe_2O_4$ | 100-500 nm | Brown | 0.7812 |
| $ZnFe_2O_4$ | 100-500 nm | Orange | 0.6861 |

Co Ferrites

Solar absorbing coating layers were fabricated with the synthesized $CoFe_2O_4$ nanoparticles having two kinds of different size including 50-100 nm and 100-300 nm. In this exemplary case, the Co-ferrites nanoparticles were applied for solar absorbing coating layer in an as-synthesized state without an additional annealing treatment. The reflection measurement was made at room temperature before annealing solar absorbing coating layers.

As shown in FIG. 18 and Table 11, solar absorbing coating layers have the overall reflection below 0.05 in the visible spectrum range as well as FOM value of 0.88 and 0.89, which is very close to SOPO target value of 0.90. It is notable that solar absorbing coating layer of Co-ferrite with larger size shows a higher FOM value rather than one with smaller size.

TABLE 11

|  | Particle Size | SSC Layer Color | FOM |
| --- | --- | --- | --- |
| SSC with $CoFe_2O_4$ | 50-100 nm | Black | 0.8802 |
| SSC with $CoFe_2O_4$ | 100-300 nm | Black | 0.8901 |

Cobalt Oxides: As-Coated CoO

Figure 19:
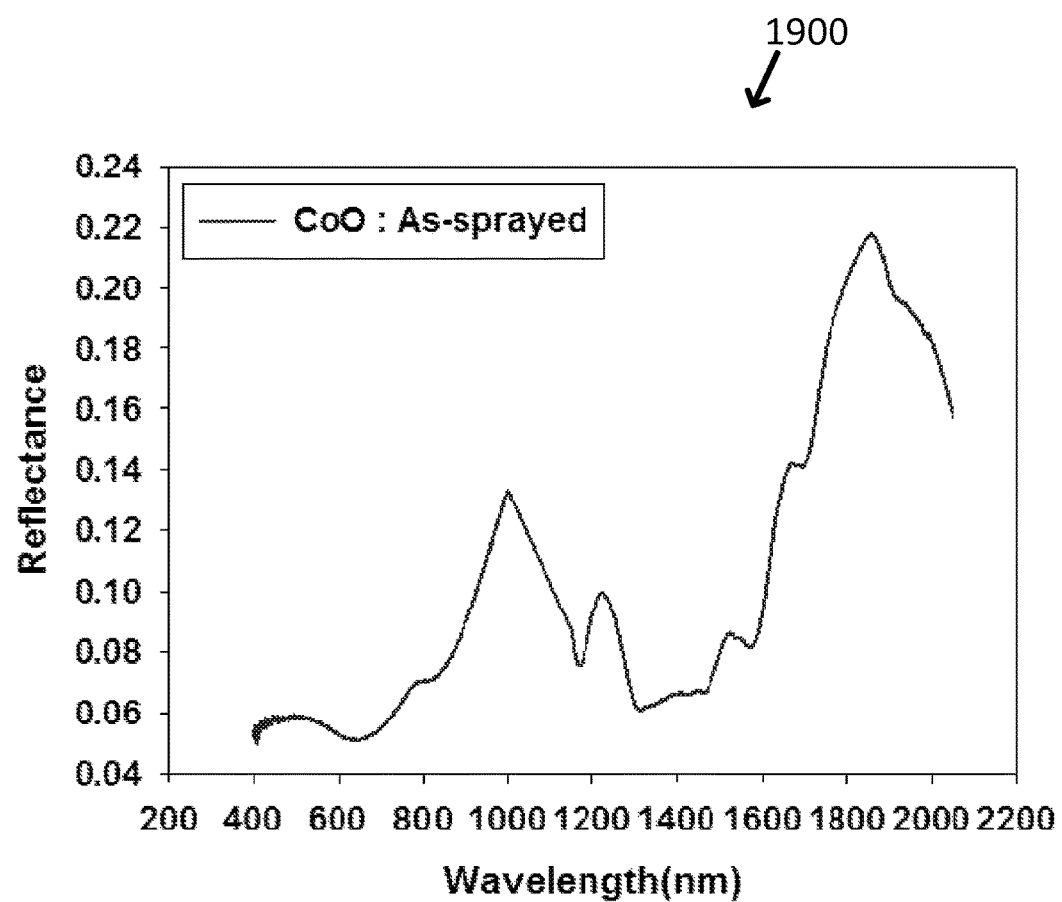
FIG. 19 shows the reflectance of exemplary solar absorbing coating layers made of as-coated CoO.

Solar absorbing coating samples were made using synthesized nano-sized CoO powders and evaluated by the optical measurement. FIG. 19, Graph 1900 shows the reflectance result of the as-coated CoO sample.

Effect of Roughness Created Using Polymer Beads

Figure 20:
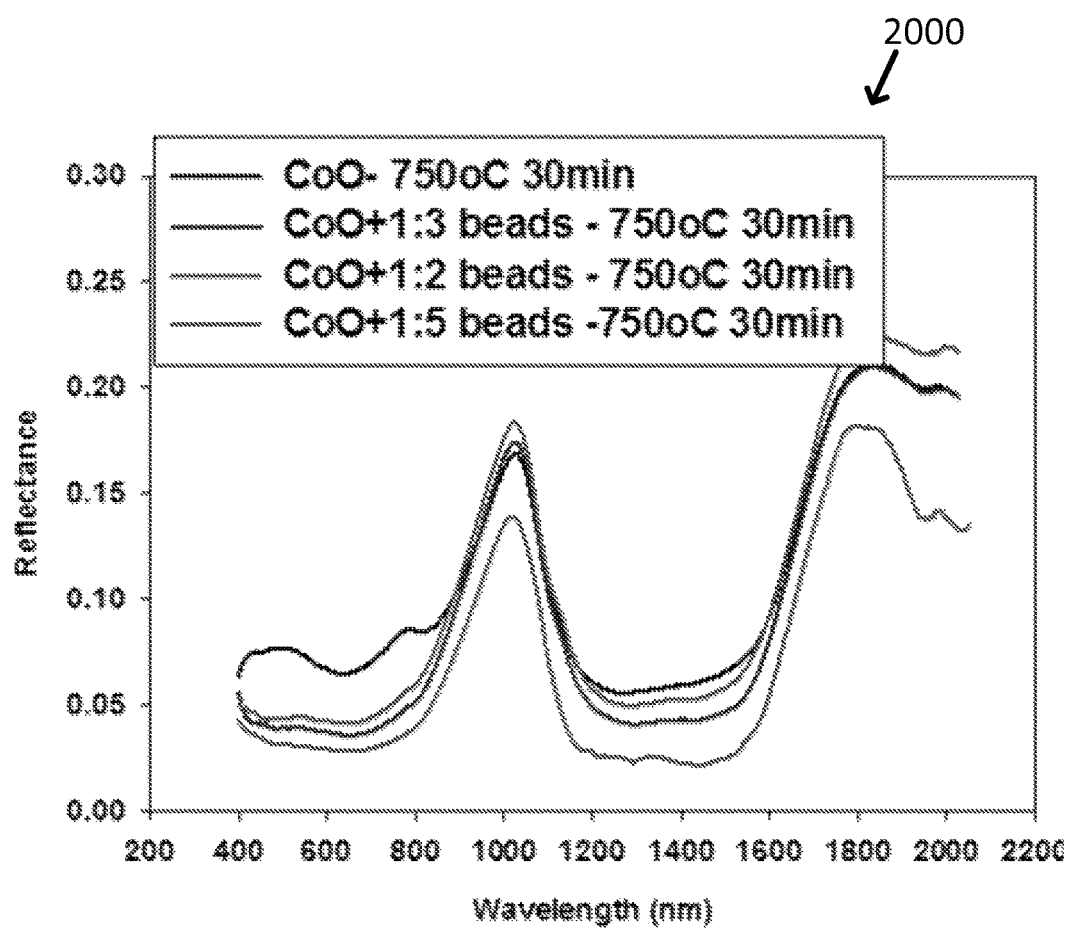
FIG. 20 shows the reflectance of exemplary CoO solar absorbing coating layers and exemplary modified CoO layers with polymer beads with beads volume ratio 1:2 and 1:3 respectively.

FIG. 20 shows the reflectance results of three exemplary samples, a regular CoO solar absorbing coating sample which is made using only CoO and modified CoO solar absorbing coating samples with polymer beads of 1:2 volume ratio to 1:5 volume ratio. See Graph 2000 in FIG. 20. Table 12 shows FOM comparison among five samples after annealing at 750° C. for 10 hr. The CoO solar absorbing coating layer with polymer beads of 1:3 volume ratio increases FOM to 0.888, higher than the regular CoO solar absorbing coating samples. As one can see photographs, the samples of enhanced surface roughness look darker than a regular sample.

TABLE 12

| Samples | FOM |
|---|---|
| As-coated | 0.852 |
| Polymer beads (1:2) | 0.87 |
| Polymer beads (1:3) | 0.877 |
| Polymer beads (1:5) | 0.885 |
| Stamps | 0.873 |
| Beads (1:5) + stamps | 0.888 |

Effect of Antireflection Coating

Figure 21:
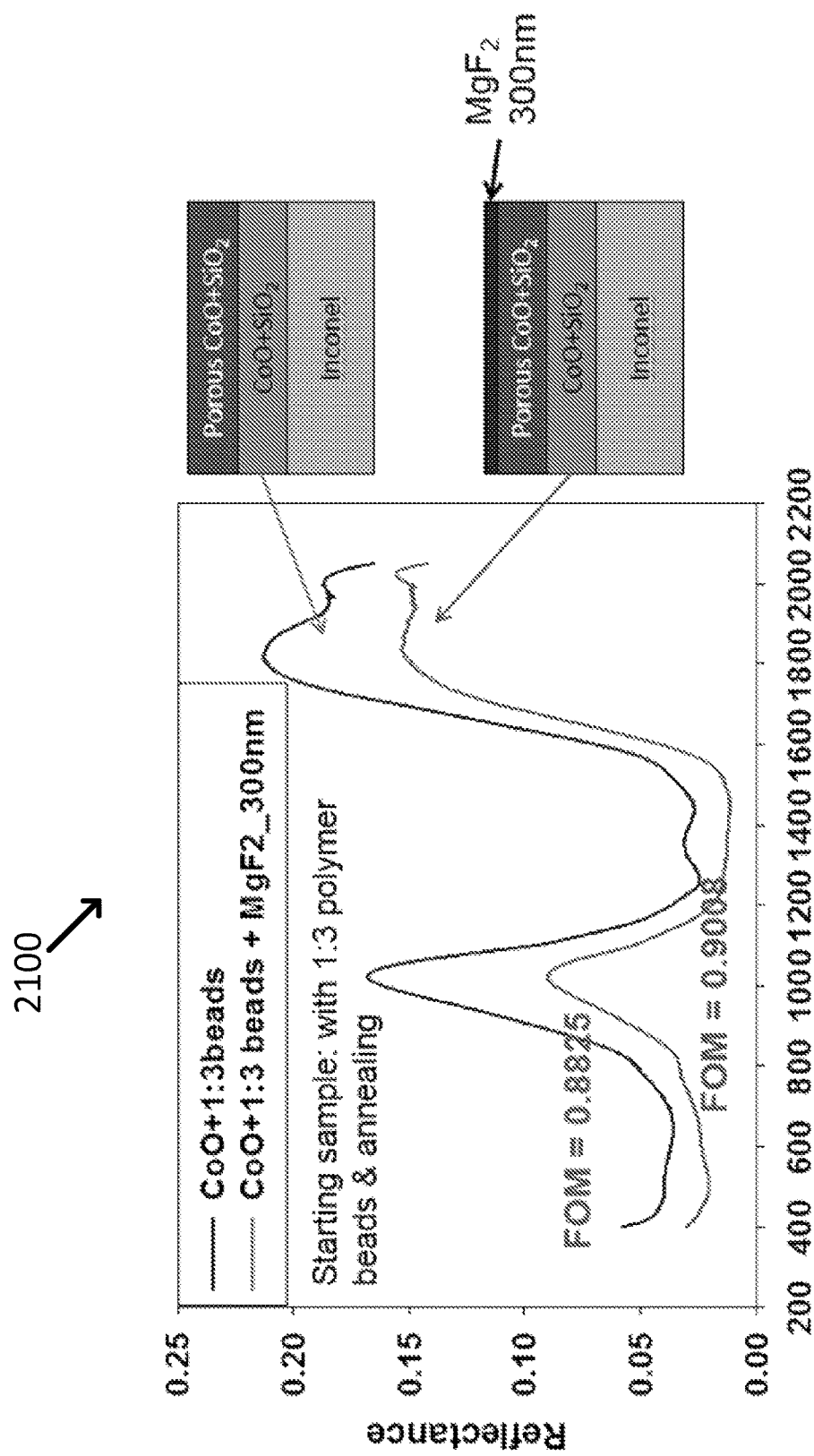
FIG. 21 shows exemplary data of the antireflection of $MgF_2$ further reduce the reflectance, leading to a high FOM of 0.9.

Antireflection coating has also been applied to further enhance the absorption. As an example, $MgF_2$ was applied of approximately 300 nm thick on top of the CoO layer. $MgF_2$ has a refractive index of about 1.35, which is between that of air (1.0) and $SiO_2$ (1.5). Therefore, an $MgF_2$ layer reduces the light reflection and improves the absorption. As shown in Graph 2100 of FIG. 21, the FOM on the sample with the $MgF_2$ coating is increased to 0.90, showing the effectiveness of the antireflection coating. For more scalable manufacturing, $MgF_2$ nanoparticles can be utilized as a part of the surface coating, instead of vacuum deposited thin films.

High-Temperature Durability and Oxidation Resistance

Solar absorbing coating layers with Mn—Zn ferrites and Co-ferrites were annealed at 750° C. for 10 hr in air, for example, in order to evaluate the thermal performance of solar absorbing coating layers at high temperature (750° C.) which is the target operation temperature of CSP system.

Figure 22:
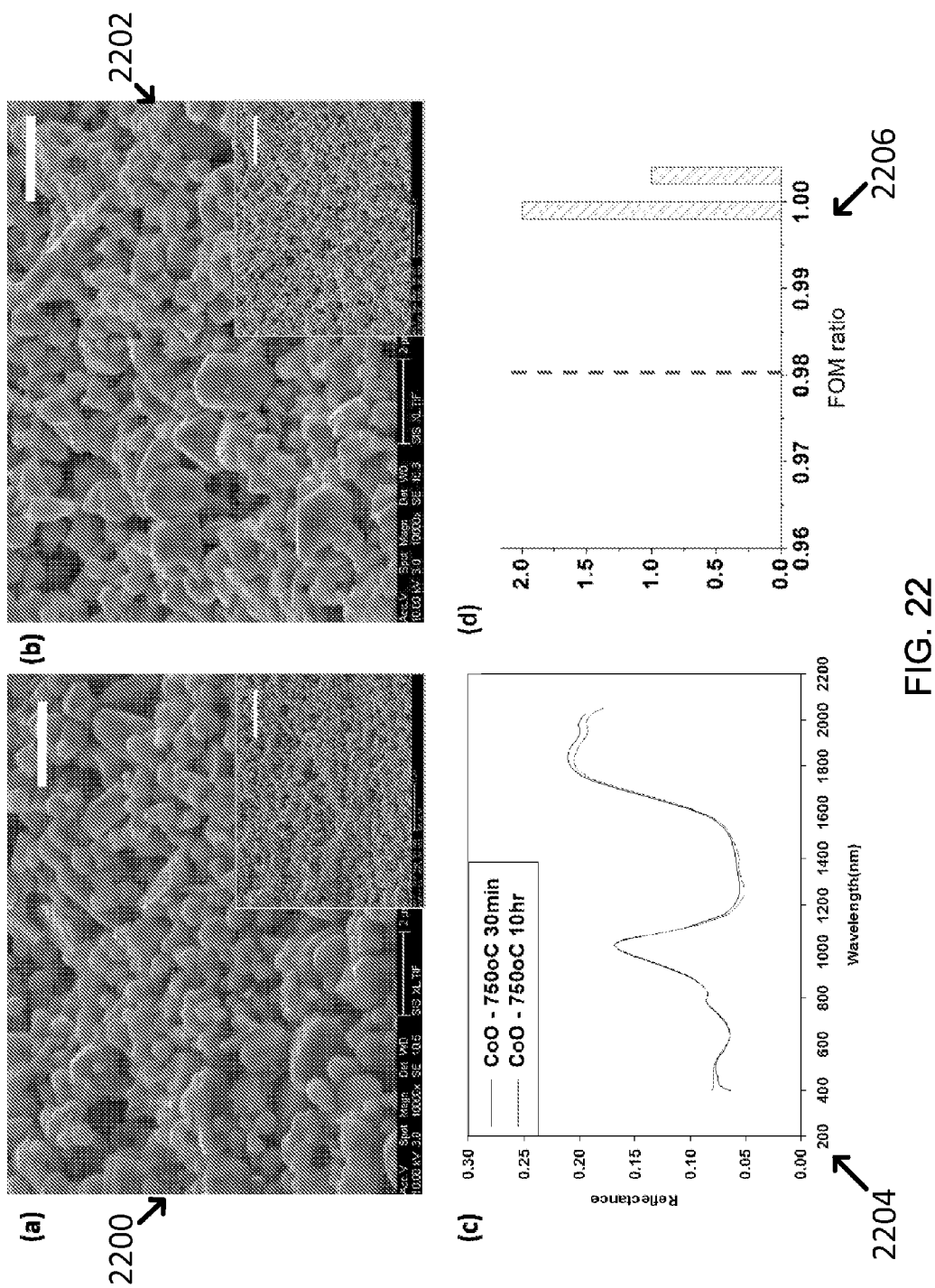
FIG. 22 shows SEM images of an exemplary regular CoO solar absorbing coating sample (a) before and (b) after isothermal endurance test. The exemplary scale bar is 2 μm, and the inset scale bar is 5 μm).

As shown in FIG. 22 (see 2200, 2202, 2204 and 2206) and Table 13, after the isothermal annealing, the reflection in a visible spectrum kept similar to the as-prepared solar absorbing coating layers, while the reflection in near-IR spectrum increased much which was the main factor to decrease FOM values after isothermal tests.

TABLE 13

| # | FOM (t = 0, 750° C.) | FOM (t-10, 750° C.) | FOM (t = 10 hr; 750° C.) / FOM (t = 0; 750° C.) |
|---|---|---|---|
| 1 | 0.8862 | 0.8893 | 1.003498 |
| 2 | 0.8843 | 0.8878 | 1.003958 |
| 3 | 0.8881 | 0.891 | 1.003265 |
| 4 | 0.8846 | 0.8882 | 1.00407 |
| 5 | 0.8838 | 0.8874 | 1.004073 |
| Avg. | 0.8854 | 0.8887 | 1.0038 |
| STD | 0.0017564 | 0.001448447 | 0.000369 |

For the solar absorbing coating layers made from the CoO powders, three different samples were fabricated and evaluated for the isothermal endurance. Based on SEM images of a regular CoO sample before(FIG. 22(a), image 2200) and after (FIG. 22(b), image 2202) annealing, a powder morphology does not change after annealing, which indicate the high temperature stability of CoO nanopowders. FIG. 22(c) displays a comparison 2204 of reflectance (e.g., a regular CoO solar absorbing coating) before and after annealing at 750° C. for 10 hr. The reflectance is not changed or degraded after high temperature exposure. Table 13 is FOM change of 3 different CoO samples (e.g., a regular CoO solar absorbing coating, two surface roughened CoO samples). The FOM is not degraded after annealing at 750° C. for 10 hr. Similar results were observed for CoO samples after thermal cycling tests (e.g., 10 cycles, from room temperature to 750° C.).

In addition, concentrating solar power is becoming an increasingly important part of the renewable energy portfolio. However, further cost reduction is desired to make CSP competitive with traditional energy technologies. Higher operating temperature is considered an attractive avenue leading to higher power conversion efficiency and lower cost, but tremendous technical challenges exist with higher temperature operation of CSP, with one of the main issues being the lack of a high-performance solar absorbing material that is durable at 750° C. or above. In another aspect of this patent document, described is a black oxide material, made of cobalt oxide nanoparticles, that is synthesized and utilized as a high-temperature solar absorbing material. The nanoparticles are embedded in a dielectric matrix through a scalable spray coating process. The top layer of the coating is further improved with light-trapping structures using sacrificial fillers introduced from the same coating process. After the surface modification of cobalt oxide coating, a high thermal efficiency of 88.2% can be achieved using the disclosed technology. More importantly, the coating shows no degradation after 1,000-hour annealing at 750° C. in air, while the existing commercial light absorbing coating was reported to degrade by long-term exposure at high temperature. The materials and processes described in this patent document are promising for solar absorbing coating for future high-temperature CSP systems.

Introduction

The development and deployment of renewable energy sources is becoming an increasingly urgent need for human society. Concentrating solar power (CSP) systems (or solar thermal systems) are becoming an important part of the major portfolio of renewable energy generation. One of the key potential advantages of CSP over many other forms of the renewables is the possibility of inexpensive energy storage using thermal energy storage systems (TES), which is useful for grid-level power management. The TES can extend the electricity generation capability to periods with no sunlight available, thereby significantly expanding the value and usage of solar energy. CSP systems can also be hybridized with other alternative energy systems, such as solar photovoltaic, thermoelectric, or thermophotovoltaic systems, to increase the penetration of renewable energy power. Despite these perceived benefits, the levelized cost of energy (LCOE) of CSP, however, is still too high to compete with traditional thermal power plants and some other alternative energy technologies (such as photovoltaics).

In order to develop a cost-competitive CSP technology, it is imperative to increase the system power conversion efficiency. To maximize the efficiency of CSP, it is desirable to raise the operating temperature for higher Carnot efficiency. As a result, the temperature of heat transfer fluids (HTFs) needs to be 700° C. or higher. Toward this aim, all of the components of CSP systems, such as solar field, HTFs, power block, TESs, and solar receivers need to be made compatible with the higher-temperature operation.

As far as the solar receiver is concerned, the light-absorbing coatings on the receiver play an important role by absorbing solar thermal energy and raising the temperature of the HTFs to above 700° C. Although spectrally selective coatings (SSCs) with multilayers/graded cermets or tandem structures have been developed and stably operated in vacuum in parabolic trough CSP systems, none of these SSC structures can operate at high temperatures in air, which is needed in future solar-tower based CSP systems. The state-of-the-art solar absorbing material used in solar towers is based on a commercially available black paint called Pyromark 2500®. Pyromark 2500® is known to have high thermal efficiency above 600° C. and has been used for central solar receivers of CSP plants. However, according to prior studies, the absorptivity degraded after high temperature (>700° C.) exposure due to crystal structure changes and phase instability. Therefore it is clear that a new light absorbing coating material with high absorption efficiency and excellent durability at elevated temperature in air environment needs to be developed for the next generation CSP systems.

Since the light absorption is directly related to solar energy generation efficiency, a large number of studies about optical absorption enhancement have been actively pursued. Several light trapping approaches were studied, such as texturing, metallic nanostructures, and photonic and plasmonic structures. However, most of these studies about light trapping have been applied on photovoltaic applications using vacuum deposition methods. As the result, these processes are not necessarily compatible with CSP applications, where spray coating is generally employed to coat the light absorbing layers onto solar tower receivers, for example, Pyromark 2500® in Solar One and Solar Two central towers.

Here, we report a highly efficient and high-temperature durable light absorbing coatings based on cobalt oxide nanoparticles for CSP receivers. Cobalt oxide materials have been studied as selective absorbing layers and fabricated using spray pyrolysis method, chemical vapor deposition and electrodeposition. Although several previous studies showed the applicability as solar collectors within the temperature range of 300° C.~650° C., there is no existing light absorbing coating suitable for CSP operating at higher temperature (~750° C.) without performance degradation. In some implementations of the disclosed technology, the cobalt oxide nanoparticles can be synthesized via a facile hydrothermal process and utilized as the light-absorbing material in the coating layers. The coating layers consist of or includes cobalt oxide nanopowders dispersed in silica matrix, and can be deposited on metal substrates via a simple and scalable spray coating process, which is compatible with CSP applications. The disclosed technology includes using novel and yet simple surface texturing techniques based on sacrificial polymer beads that can be easily integrated with the spray coating process, to improve the light absorption. Finally, the developed coating layer exhibited unprecedented high-temperature durability, showing no degradation in structural or optical properties after annealing at 750° C. in air for 1,000 hours.

Cobalt Oxide Nanoparticle Synthesis and Sample Preparation

Cobalt oxide nanoparticles of right sizes can be synthesized for high light absorption. For nanoparticles (aspect ratio ~1), the optimal size for absorbing visible and near infrared light is probably around 200~400 nm. If the particle size was too small, the resultant coating film would have small surface roughness, which is not effective for light trapping. In addition, for high temperature application, very small nanoparticles (<100 nm) would agglomerate and become larger size particles. Therefore, techniques employed can produce nanoparticles with 100s of nanometers in diameter. Metal oxide nanoparticles can be prepared by a number of different methods, such as sol-gel technique, mechanical grinding (ball milling), mechanochemical synthesis, and hydrothermal synthesis, etc. The hydrothermal method can be used to synthesize $Co_3O_4$ nanoparticles for convenience. However, it should be noted that other inexpensive nanoparticle synthesis techniques mentioned above may also be used for producing metal oxides for SSC applications.

Cobalt oxide nanoparticles can be synthesized via a hydrothermal process using cobalt chloride salt ($CoCl_2.6H_2O$) as the precursor. 10 M solution of sodium hydroxide (NaOH) can be gradually dropped into 1 M solution of cobalt chloride to induce precipitation of cobalt hydroxide until pH value of the reacted solution reached 11. The hydrothermal synthesis can be performed at 150° C. for 20 hours in order to transform the precipitated cobalt hydroxide into cobalt oxide. The cobalt oxide particles can be washed with de-ionized water using a centrifuge and dried using a freeze-dryer. The as-synthesized nanoparticles can be annealed at 750° C. for 2 hours for phase stabilization.

For the fabrication of $Co_3O_4$ slurry, methyl phenyl polysiloxane resin (SILIKOPHEN® P 80/X) can be utilized as precursor of $SiO_2$ matrix. The volume ratio between the active material (cobalt oxide nanopowders) and the $SiO_2$ matrix can be systematically varied and optimized. The required amount of resin can be diluted with an organic solvent mixture consisting of or including two miscible solvents, xylene and isobutanol (volume ratio 3:1). The optimum dilution was important to ensure good quality of the coating layers, because too viscous slurry could not make a smooth spray stream while very dilute slurry could not make a stable spray-coating onto substrates. In order to dissolve the resin in the solvent, the mixture can be sonicated for 30 minutes with a probe type sonicator. During sonication, the solution container can be cooled in an ice-bath to avoid concentration change due to the evaporation of organic solvents. $Co_3O_4$ powders can be mixed with the prepared solution and yttria stabilized zirconia (YSZ) grinding balls can be added into the blend. The ball milling can be conducted for 24 hours in order to make the mixture homogeneous.

The black oxide spray coating can be performed using a spray gun on a high temperature Ni alloy (Inconel 625) sheet coupons (½"×½" in size). The spray pressure can be set at 40 psi and the distance between the spray gun and the Inconel substrate is about 10 cm, which has been optimized for the best coating quality. After spray coating, the samples can be heated at 250° C. for 1 hour for curing of $SiO_2$ resin. All of the coating samples consist of or include two layers: the base layer of approximately 30 μm thick and a top layer with surface-topography-modified structure described in the next paragraph.

Cobalt Oxide Surface Texturing

The first method to alter the surface texturing and topography of the top layer to improve optical absorption includes employing imprinting stamps with SU-8 polymer pillars which are prepared by using standard microfabrication processes. In one example, the polymer pillars can be 3 μm in both diameter and spacing and 10 μm in height. The stamps are then pressed onto coated $Co_3O_4$ coating surface and left as imprinted prior to the resin curing step. Then, the sample can be annealed at 750° C. for 1 hour to burn away the remaining polymer pillars.

The second method can be used to create roughened surface and includes incorporating and subsequently removing micron-sized sacrificial polymeric beads within the $Co_3O_4$ coating layer. The volumetric concentration of $Co_3O_4$, polymer beads and silicone resin can be optimized to yield the best optical performance (as shown in Table 14), and the mixtures can be sonicated with a probe type sonicator for proper mixing.

TABLE 14

| Sample Name | Volume ratio | | | FOM (Figure of merits) |
| --- | --- | --- | --- | --- |
| | $Co_3O_4$ nanopowders | $SiO_2$ dielectric matrix | Polystyrene polymer beads | |
| $Co_3O_4$-1 | 1 | 1.5 | 0 | 0.854 |
| $Co_3O_4$-2 | 1 | 4.5 | 3 | 0.877 |
| $Co_3O_4$-3 | 1 | 6.5 | 5 | 0.882 |

Then, a desired amount of silicone resin can be added, followed by the same ball milling and spray coating processes described in the prior paragraphs. Finally, the coated layers can be annealed at 750° C. for 1 hour to remove the polymeric beads and leave behind the porous and topographically rough top surface of $Co_3O_4$ layer.

Optical Performance and High Temperature Endurance Evaluation

The thermal efficiency of a solar receiver, which measures the ratio of the energy absorbed relative to the incident solar energy, and FOMs can be calculated from Eq. 1.

$$F = \frac{\int_0^\infty (1 - R(\lambda))I(\lambda)d\lambda - \frac{1}{C}\left[\int_0^\infty (1 - R(\lambda))B(\lambda, T)d\lambda\right]}{\int_0^\infty I(\lambda)d\lambda} \quad (1)$$

where $R(\lambda)$ is the spectral reflectivity, $I(\lambda)$ is the spectral solar radiance per square meter as defined by the reference solar spectral irradiation(ASTM G173), $B(2,7)$ is the spectral thermal emission of a black body at temperature T, and C is the concentration ratio. In the calculations of equation 1, the black body temperature T of the solar receiver is assumed to be 750° C. and C is assumed to be 1,000 (1,000 sun), which are the target temperature and concentration ratio, respectively, for enhanced efficiency of CSP systems. All of the integrals to calculate FOMs are evaluated in the range from 300 nm to 20 μm, as only negligible quantities of solar power are present outside this range. Reflection data can be measured at room temperature using a Labsphere® 4" integration sphere to collect all angles of reflection from samples and Andor® 303i spectrometer equipped with a Si based (spectral range 300-1100 nm) and InGaAs based (spectral range 900 nm-2500 nm) detector. Reflection behavior of samples outside of the measured spectral range of 400 nm-2.5 μm can be extrapolated for use in Eq. 1. While the reflection data can be measured at room temperature, it is highly desirable to obtain the reflection spectra at the actual operating temperature of ~750° C. High temperature optical measurement in non-vacuum environment is highly challenging due to the heat conduction and possible damage to lenses, integration sphere, and other optical system parts. Such measurements can be obtained with improved design of the optical measurement system.

To characterize the durability of the coating at elevated temperature, the long-time annealing tests at 750° C. in air can be carried out on the coated samples as well as the $Co_3O_4$ nanopowders with the annealing time up to 1,000 hours. The composition of the material before vs after the annealing can be analyzed using XRD (Bruker D8 Discover) using a scan speed of $0.037°s^{-1}$ in the 20 range of 20–80°; the structural integrity can be examined using optical microscope and SEM (Phillips XL30 FEG); the thermal stability of $Co_3O_4$ phase at high temperature (750° C.) in air can be also evaluated using thermogravimetric analysis (TGA, TA Instruments SDT Q600) with air of 20 ml/min flow rate; finally, the optical properties of the samples can be measured with the same procedure as above.

Cobalt Oxide Nanopowders Synthesis and Coating Process

Figure 23:
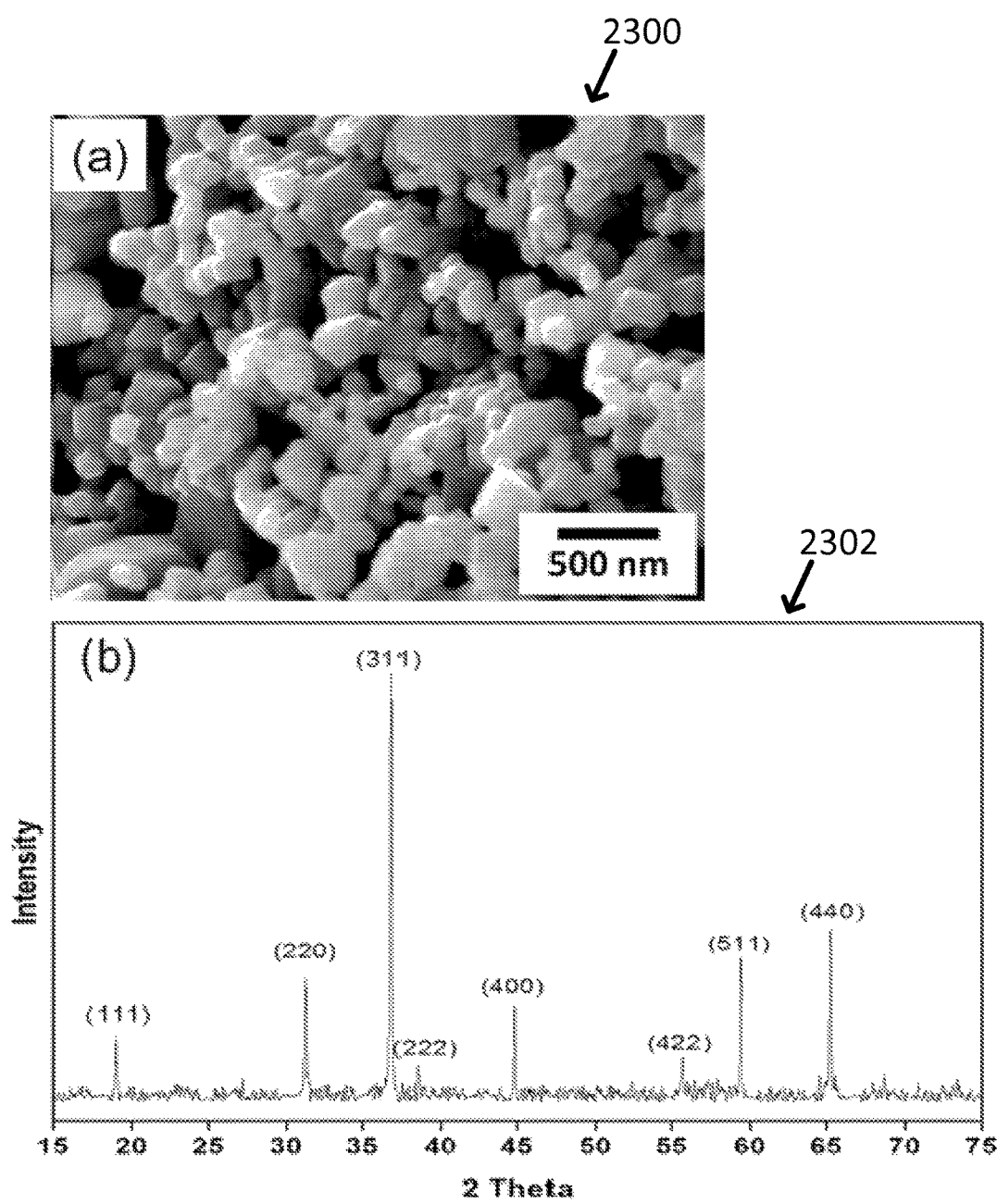
FIG. 23 shows exemplary cobalt oxide nanopowders characterization: (a) SEM image of as-synthesized powders and (b) X-ray diffraction pattern of Co oxide powders after stabilizing at 750° C. for 2 hours, showing the $Co_3O_4$ phase.
Figure 24:
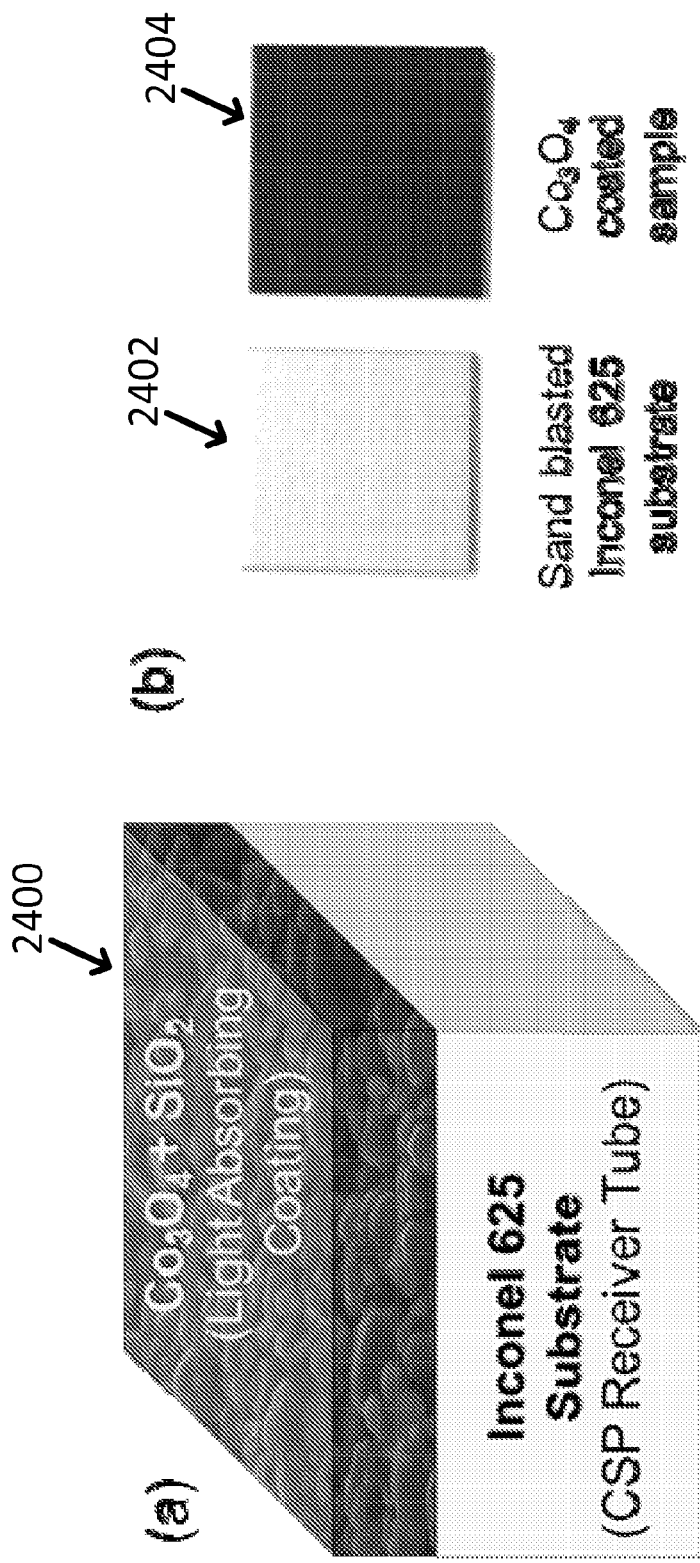
FIG. 24 shows (a) an exemplary schematic diagram of $Co_3O_4$ light absorbing coating structure and (b) exemplary photographs of a sand blasted Inconel-625 substrate and a $Co_3O_4$ coated sample (designated as $Co_3O_4$-1 sample).

Cobalt oxide nanoparticles can be synthesized by the hydrothermal process. Both the as-synthesized and annealed cobalt oxide nanoparticles can be examined with scanning electron microscopy (SEM). The diameter of the as-synthesized powders ranges from 100 to 300 nm after stabilizing heat treatment, as shown in FIG. 23(a). See image 2300. According to X-ray diffraction (XRD) analysis 2302 shown in FIG. 23(b), the synthesized chemical compound is confirmed as $Co_3O_4$, which is one of the polymorphs of cobalt oxide. Pure CoO is difficult to synthesize, because CoO can easily acquire oxygen and convert to a higher level oxide. While $Co_2O_3$ can be created when the cobalt compounds are annealed at a low temperature, it can easily be converted to $Co_3O_4$ when heated above 538K in oxygen-containing environment. Therefore, the most stable form of cobalt oxide, i.e., $Co_3O_4$ can be the ideal material. The coating process can be carried out using a gravity-feed spray gun. All of the coating layers can be deposited onto high-temperature Inconel substrate (type 625) coupons (½ "x½" in area) pre-treated with sand blasting. Inconel can be chosen because it is currently used for high-temperature CSP due to its high-temperature durability. The schematic diagram 2400 of the coated structure is shown in FIG. 24(a), and the photographs 2402 and 2404 of a bare Inconel substrate and a sample coated with a $Co_3O_4$ layer are shown in FIG. 24(b).

Light Absorbing Coating Structure Modification

Figure 25:
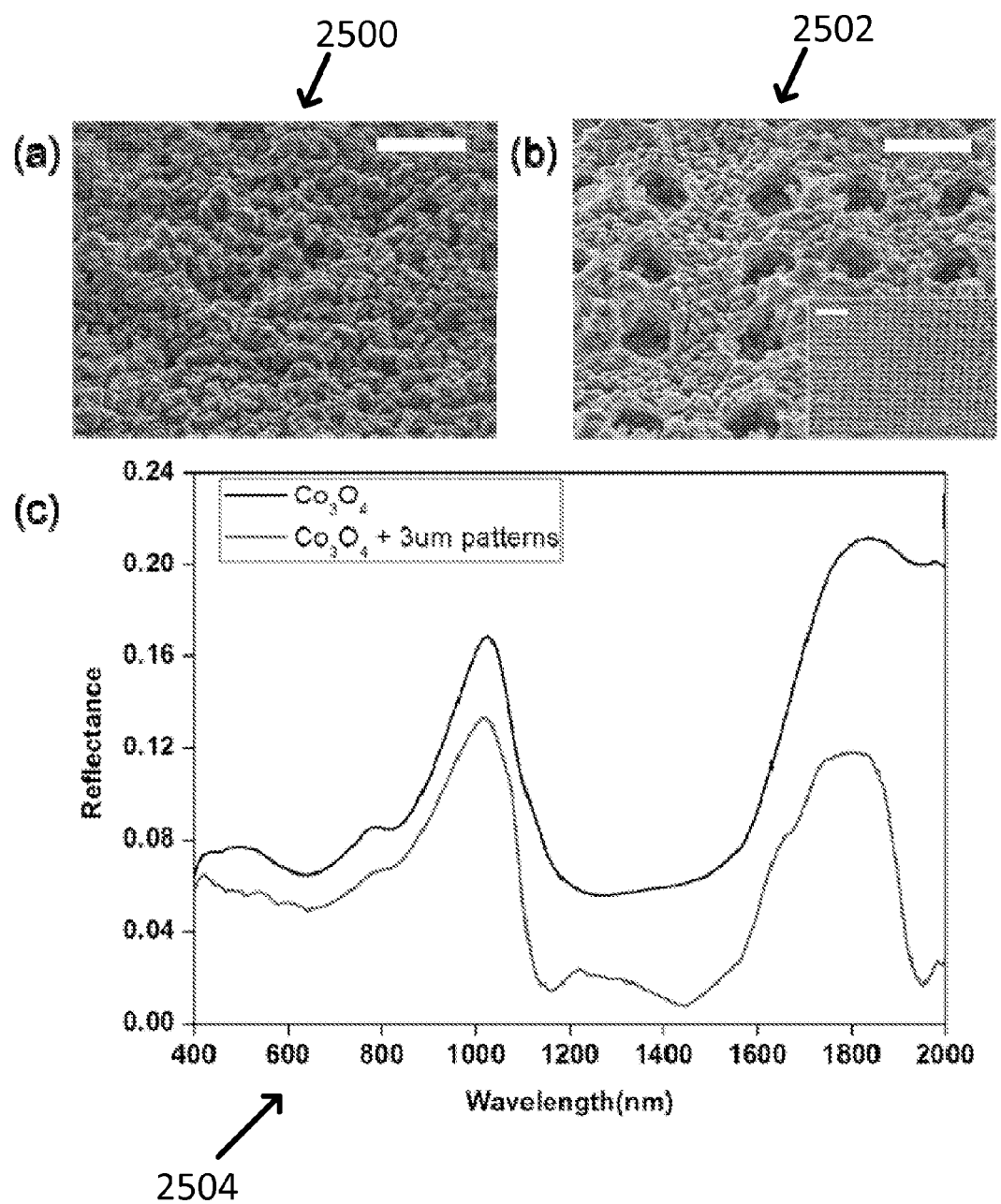
FIG. 25 shows exemplary SEM images of (a) $Co_3O_4$ coating (scale bar: 5 μm) and (b) $Co_3O_4$ coating layer with 3 μm hole patterns (scale bar: 5 μm, inset, 20 μm) and the reflectance in the visible and NIR range of the two samples.

FIG. 25 shows in parts (a) and (b) SEM images 2500 and 2502 of $Co_3O_4$ coating layer without and with embedded hole patterns (pores), respectively. The measured specular reflectance of the coating within the spectral range of 400 nm to 2 μm was shown in FIG. 25 part (c) 2504 and the FOM was calculated according to Eq. 1. The FOMs of the non-patterned and patterned coatings are 0.8542 and 0.8730, respectively. The suppressed reflectance due to the patterned sample led to ~2.2% increase in FOM, which is substantial and can be attributed to enhanced light trapping in the patterned holes. The incident light goes into the holes and diffracts at oblique angles within the $Co_3O_4$ absorbing coating, thus the light absorption is improved. Previously, computational and experimental studies have shown similar optical light-trapping phenomena with various surface patterns, mostly with microscale pillars. Even though hole patterns may not be as efficient for scattering light in comparison to dense vertical pillar array structures due to the smaller surface area that an oblique light can reach, the process of making hole patterns is easier to implement with the spray coating process.

Figure 26:
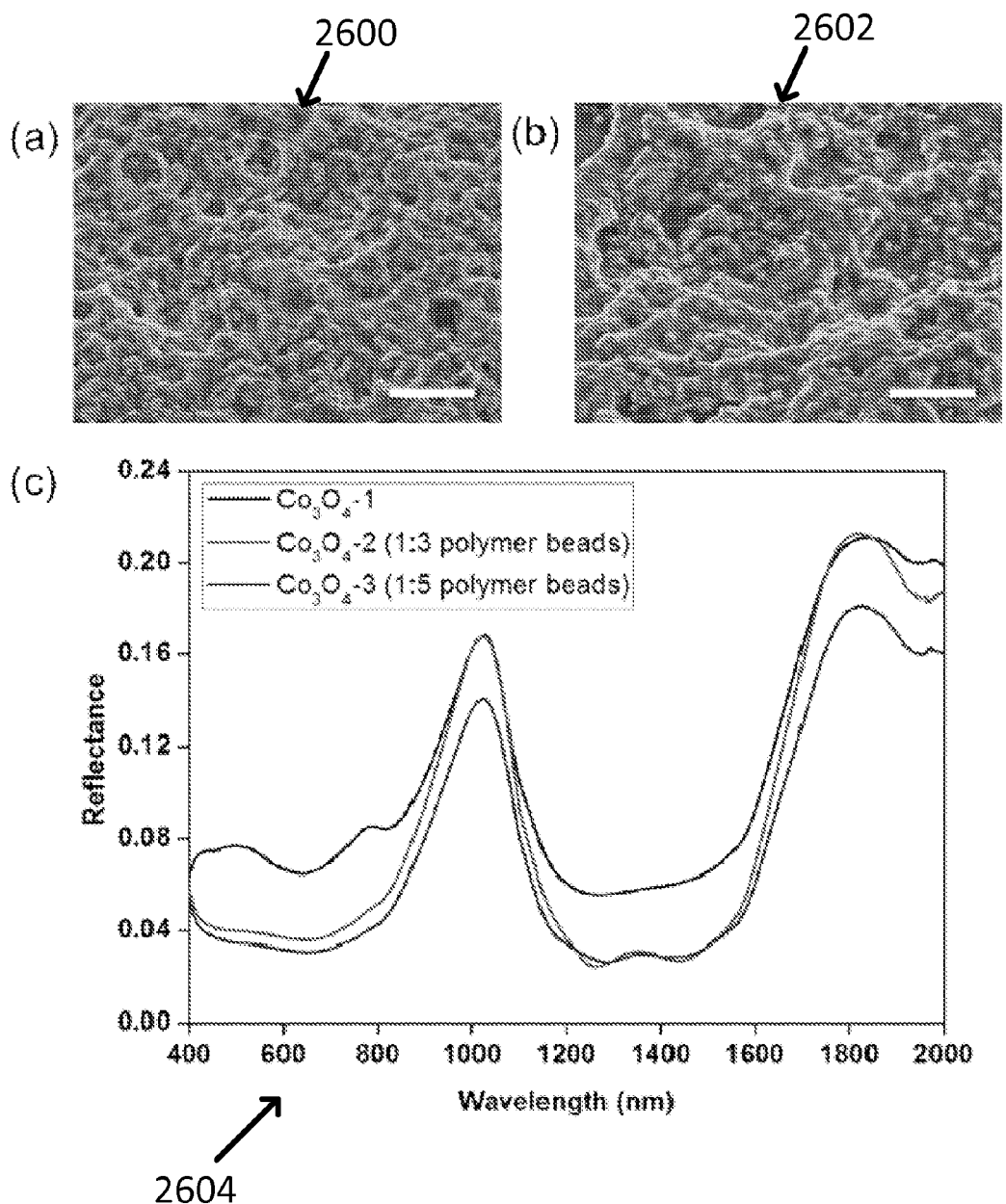
FIG. 26 shows exemplary SEM images of (a) $Co_3O_4$-2 (vol. ratio=1($Co_3O_4$):3 (polymer beads), see Table 14) coating (scale bar: 5μm) and (b) $Co_3O_4$-3(vol. ratio=1($Co_3O_4$):5 (polymer beads)) coating layer (scale bar=5 μm) and the reflectance in the visible and NIR range of $Co_3O_4$-1, $Co_3O_4$-2 and $Co_3O_4$-3 samples.

After establishing the principle of enhanced light absorption with surface hole patterning, a more scalable process based on sacrificial polymer beads can be developed, as described in section 2.2. The details of the samples are provided in Table 14. From the SEM images 2600 and 2602 shown in FIG. 26 parts (a) and (b), the surface roughness of the coating layer was increased after introducing the polymer beads in $Co_3O_4$ coating layer, compared to the original coating (FIG. 25, part (a)). The increased roughness results in reduced reflectance (FIG. 26, part (c) 2604) and enhanced FOMs (Table 14). The FOM of the $Co_3O_4$-2 and $Co_3O_4$-3 samples are increased by 2.7% and 3.3%, respectively, compared to the initial $Co_3O_4$ sample. The roughened surfaces can be regarded as being close to Lambertian surface, which is defined as a surface reflecting light with equal intensity in all directions, namely diffusely reflecting surface. Similar mechanism has been utilized for enhanced absorption in solar cells, for example, by creating 'black Si' using anisotropic etching of surface, hydrogen etching, or mechanical grinding. Furthermore, random roughness helps scatter light more efficiently than periodic structure due to a break in mirror symmetries (i.e. suppressed diffractive effects), as the prior simulation studies demonstrated the random or skewed pyramid structures outperformed regular pyramidal texturing. Compared to these reported processes (etching or mechanical grinding), the disclosed process of using sacrificial polymer beads can be easily integrated with the spray coating process without any additional micromachining steps, with the polymer particles automatically burned away to create pores during the subsequent heating to the CSP operating temperature. Therefore, the process developed here is cost-effective and scalable to meet the needs of CSP applications. It is noted from FIGS. 25 and 26 that there are reflectance peaks at about 1 μm and 1.8 μm wavelengths. These peaks are due to inherent optical properties of $Co_3O_4$. There are four absorption bands for $Co_3O_4$ in the visible to near-IR range: 0.83 eV (1.497 μm), 0.94 eV(1.322 μm), 1.7 eV(731 nm) and 2.9 eV (428 nm). These absorption peaks are associated with different charge transfer processes. Because there is no absorption band immediately close to the 1 μm wavelength or above the 1.7 μm wavelength, the extinction coefficients are very small around 1 μm and beyond 1.7 μm. As a result, these reflectance peaks at 1 μm and 1.8 μm are difficult to eliminate via surface patterning (FIGS. 25 & 26). However, it is possible to remove these peaks by adding other compositions of metal oxide materials having absorption bands near 1 μm and 1.8 μm.

High Temperature Stability of $Co_3O_4$ Light Absorbing Coating

The receiver coating in the next generation CSP systems should possess not only high thermal efficiency but also high temperature stability because of the anticipated trend of higher operating temperature (above 700-750° C.). The high-temperature stability of the coating depends on both the intrinsic material properties (e.g., phase transformation at high temperature) and structural integrity of the porous coating, as well as its adhesion to the substrate. The high-temperature annealing test can be performed in air as described in Section 2 for both the coating sample and the nanopowders. For the coated sample, the one with 1:5 volume ratio of cobalt oxide powders to polymer beads ($Co_3O_4$-3) can be used because it showed the best FOM.

Figure 27:
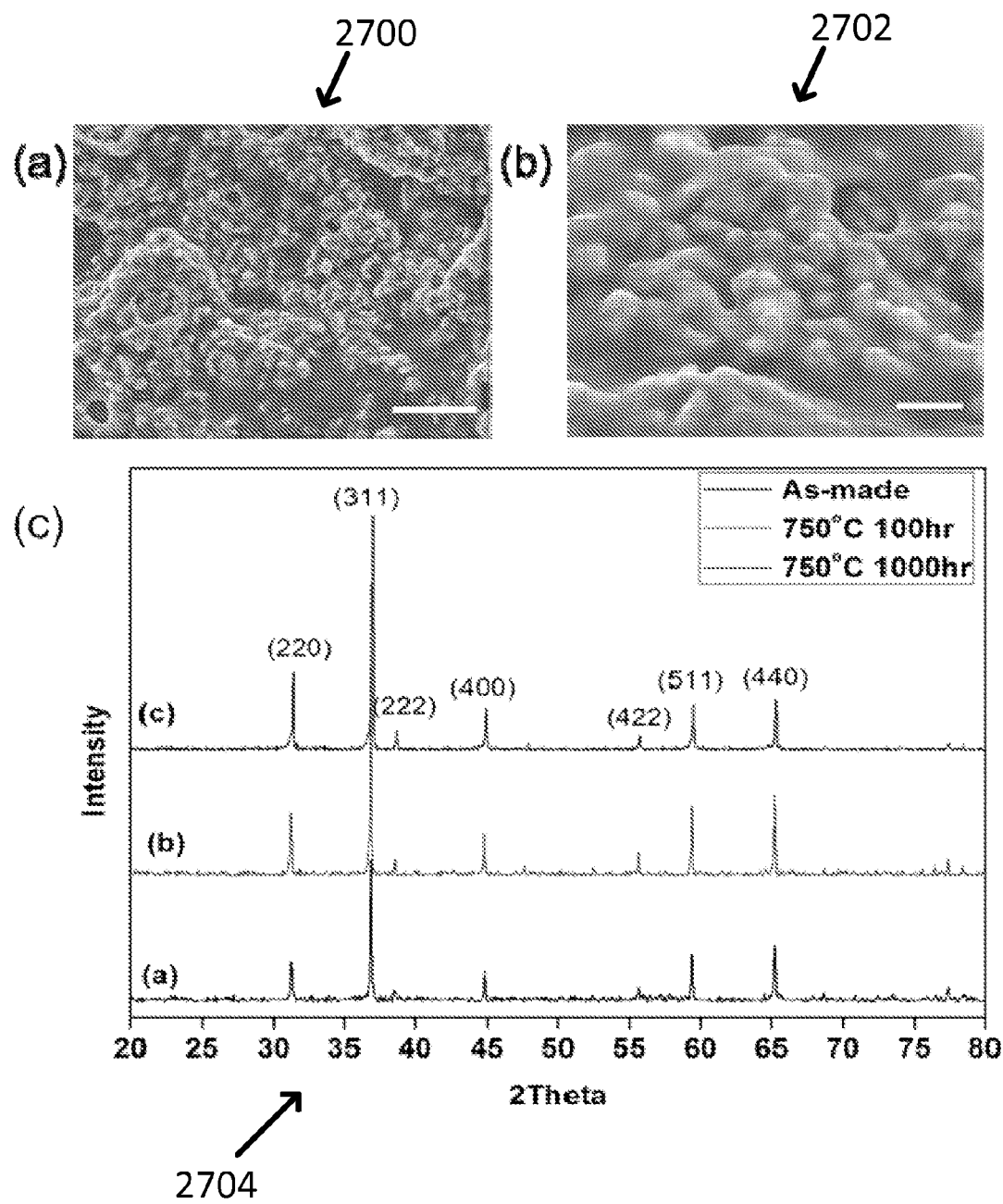
FIG. 27 shows (a, b) exemplary SEM image of $Co_3O_4$ coating after annealing at 750° C. for 1,000 hours (scale bar: (a) 5 μm and (b) 1 μm) and (c) XRD patterns of Co oxides, as-made (black), after 750° C. exposure for 100 hrs (red) and 1000 hrs (blue), showing no phase degradation after the annealing.
Figure 28:
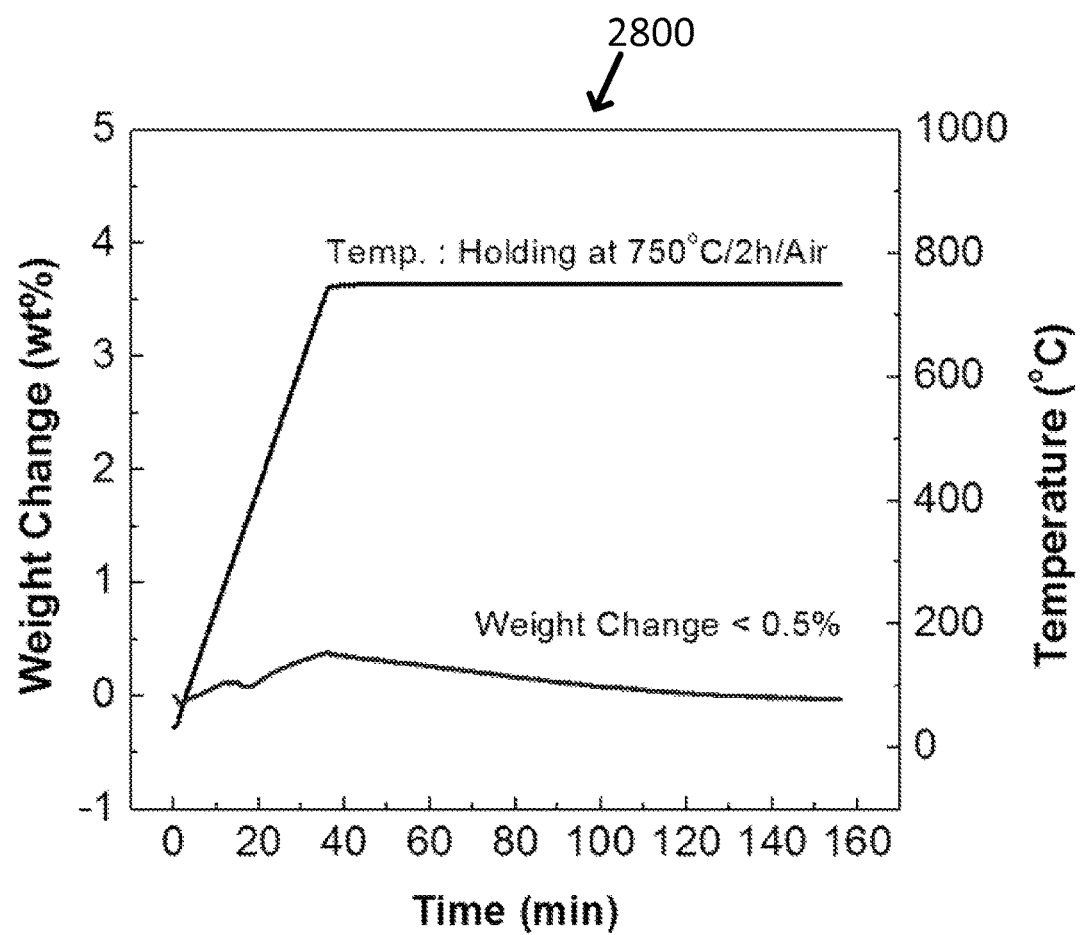
FIG. 28 shows exemplary TGA analysis results on $Co_3O_4$ nanopowders with temperature ramping rate of 20° C./min followed by holding at 750° C. for 2 hours under air-flowing. The initial weight gain is presumably due to the full conversion of residual CoO to $Co_3O_4$, after which the weight gain is essentially zero, showing the stability of the $Co_3O_4$ nanopowders.

The microstructural and XRD analysis results are displayed in FIG. 27. For example, FIG. 27, parts (a) and (b) show the SEM images 2700 and 2702 of the nanoparticles after the 750° C. annealing in air. The images 2700 and 2702 indicate that the surface roughness was not changed and the nanopowders were not agglomerated upon annealing, demonstrating the structural stability of the material. FIG. 27, part (c) shows the XRD results 2704 of the sample before and after the annealing. The XRD diffraction peaks for all the three samples (as-prepared, 100-hr annealing, and 1000-hr annealing) indicate that the samples consist of identical single phase $Co_3O_4$. The evaluation of phase stability of $Co_3O_4$ nanopowders at 750° C. in air was also made using TGA analysis as shown in FIG. 28 (see graph 2800), which shows that $Co_3O_4$ nanopowders gain weight by ~0.5 wt % in the process of temperature ramping up to 750° C. in air and the weight change becomes negligible (0 wt % change) during the annealing at 750° C. for 2 hours. The initial weight gain is presumably due to the full conversion of residual CoO to $Co_3O_4$, after which the weight gain is essentially zero, showing the stability of the $Co_3O_4$ nanopowders. These results clearly show that the cobalt oxide nanopowders synthesized by the hydrothermal process are stable at the set temperature of 750° C. Cobalt usually forms two oxide structures, namely, CoO with NaCl crystal structure and $Co_3O_4$ with spinel structures. According to the thermodynamic diagram of the Co—O system, $Co_3O_4$ was a stable phase at 750° C. in ambient atmosphere (0.21 atm $O_2$ partial pressure). In this environment, $Co_3O_4$ is stable from room temperature up to 840° C. and converts to CoO above 840° C.

Figure 29:
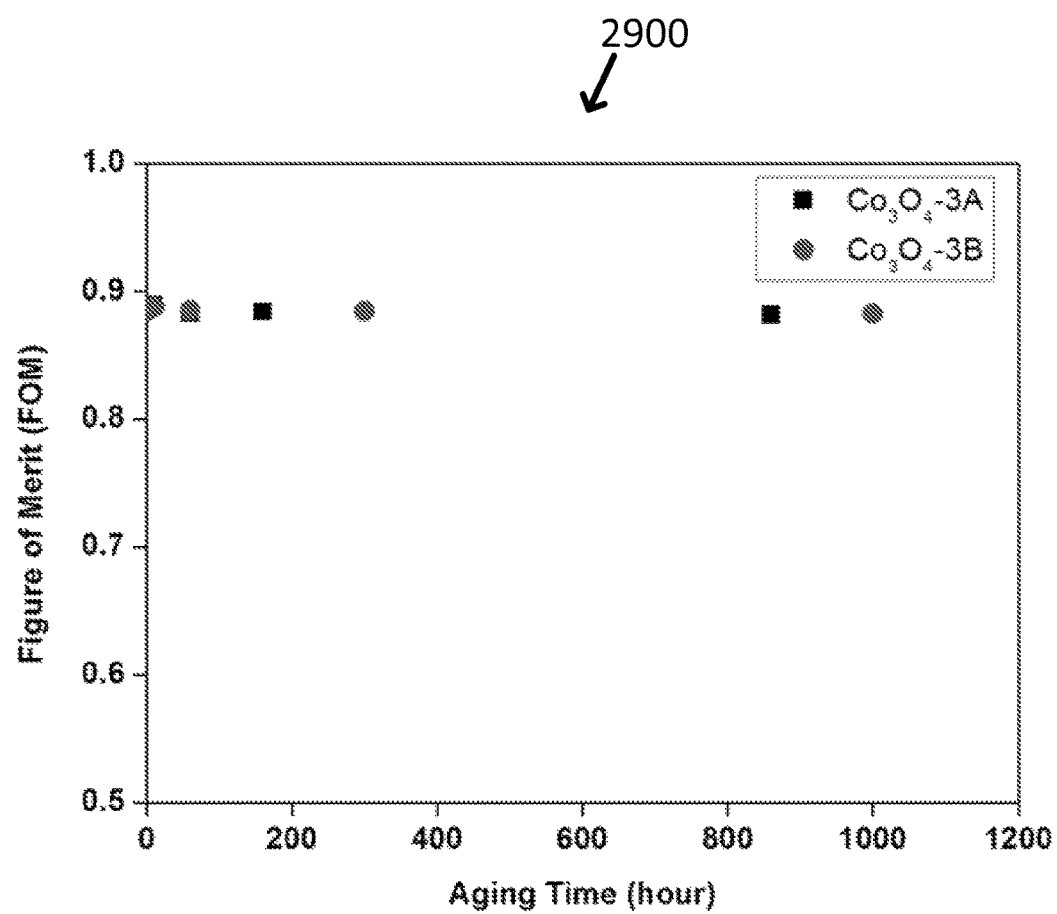
FIG. 29 shows an exemplary figure of merit of two samples of $Co_3O_4$-3 described in Table1 as a function of exposure time (up to 1000 hours) at 750° C. in air.

The FOMs of the best-performing samples with 1:5 volume ratio of black oxide powders to polymer beads (designated as $Co_3O_4$-3A and $Co_3O_4$-3B samples) after various annealing durations ranging from 0 to 1,000 hours are shown in FIG. 29, Graph 2900. The result clearly demonstrates that the FOM remains the same after 1,000 hours of high temperature exposure, indicating that the main features of the high optical performance, including cobalt oxide phase composition, surface roughness and porous structure are still intact after extended annealing. Therefore, $Co_3O_4$ black oxide is a promising solar absorption candidate material for 750° C. CSP operating environment. In contrast, Pyromark coating, which is the state of the art coating for CSP applications, shows ~3% degradation of solar absorptance at 750° C. after 300 hours.

Yttria ($Y_2O_3$)-Coated Core-Shell Nanoparticles:

A thermally stable nanoshell of $Y_2O_3$ can be utilized to make thermally resistant core-shell particles having semiconductor, metal and metal oxide as cores, such as $Fe_3O_4$-Yttria, SiGe-Yttria, and Metal-Yttria core-shell nanoparticles.

Figure 30:
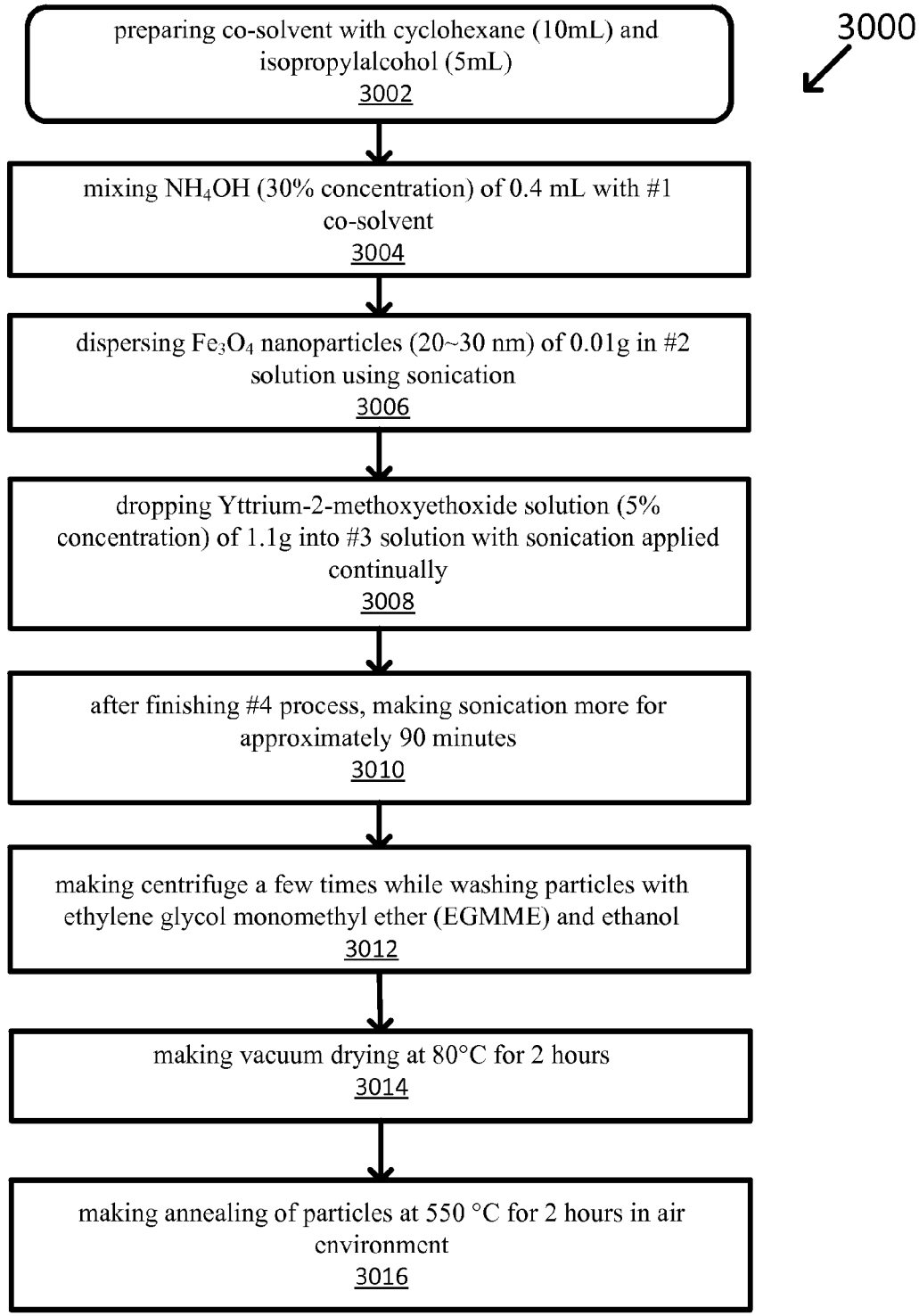
FIG. 30 shows an exemplary process flow diagram of an exemplary Sol-Gel process 3000 for synthesis of Yttria Nanoshell.

FIG. 30 is a process flow diagram of an exemplary Sol-Gel process 3000 for synthesis of Yttria Nanoshell. The process 3000 includes preparing co-solvent with cyclohexane (10 mL) and isopropylalcohol (5 mL) (3002). The process includes mixing $NH_4O_H$ (30% concentration) of 0.4 mL with #1 co-solvent (3004). The process includes dispersing $Fe_3O_4$ nanoparticles (20-30 nm) of 0.01 g in #2 solution using sonication (3006). The process includes dropping Yttrium-2-methoxyethoxide solution (5% concentration) of 1.1 g into #3 solution with sonication applied continually (3008). The process includes after finishing #4 process, making sonication more for approximately 90 minutes (3010). The process includes making centrifuge a few times while washing particles with ethylene glycol monomethyl ether (EGMME) and ethanol (3012). The process includes making vacuum drying at 80° C. for 2 hours (3014). The process includes making annealing of particles at 550° C. for 2 hours in air environment (3016).

Figure 31:
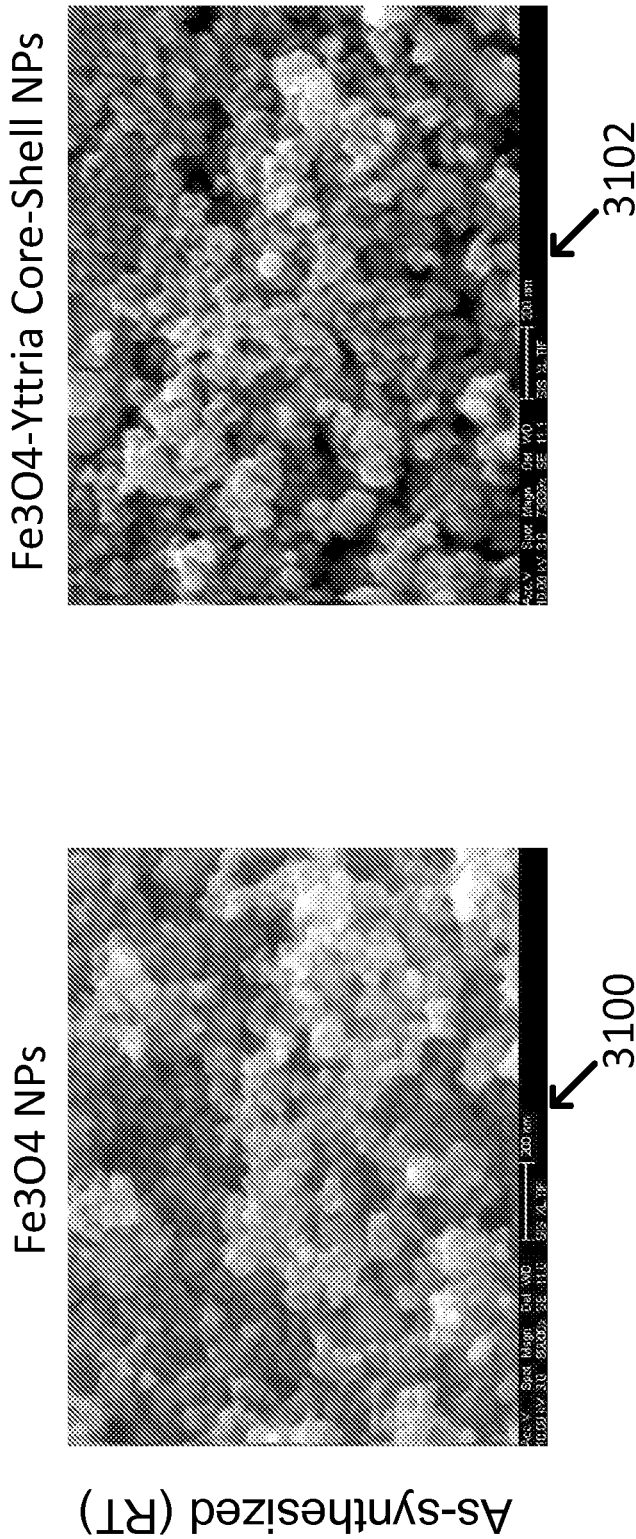
FIG. 31 shows exemplary Size Comparison during Annealing Test for $Fe_3O_4$-Yttria core-shell NPs, for example.

FIG. 31 shows Size Comparison during Annealing Test for $Fe_3O_4$-Yttria core-shell NPs, for example. See images 3100 and 3102 for $Fe_3O_4$ NPs and $Fe_3O_4$-Yttria Core-Shell NPs respectively.

Figure 32:
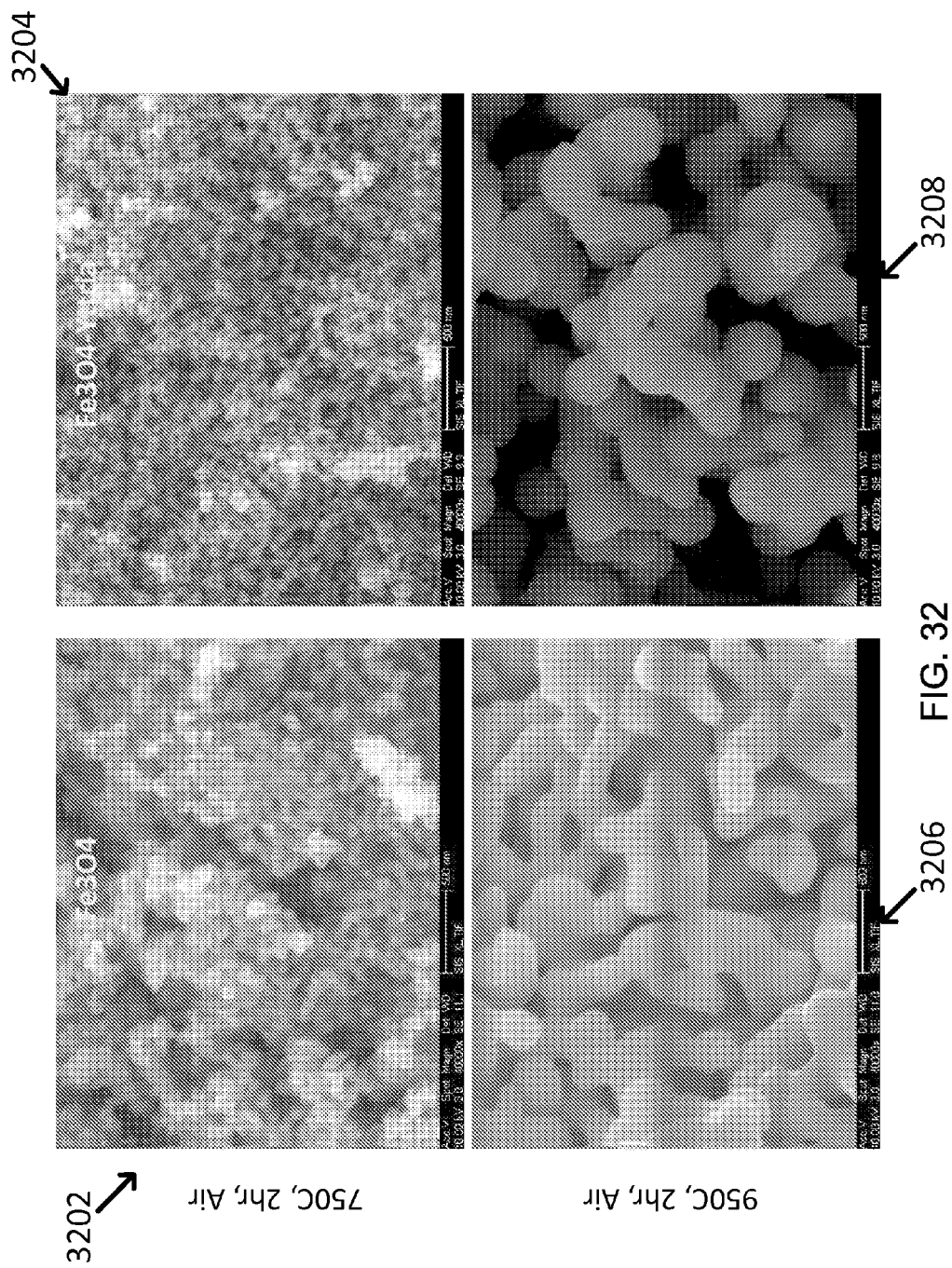
FIG. 32 shows an exemplary effect of $Y_2O_3$ shell on thermal resistance: Size increase by sintering is less in core-shell NPs during annealing at high temperature.

FIG. 32 shows Effect of $Y_2O_3$ shell on thermal resistance. Images 3202, 3204, 3206 and 3206 show that the size increase by sintering is less in core-shell NPs during annealing at high temperature.

Figure 33:
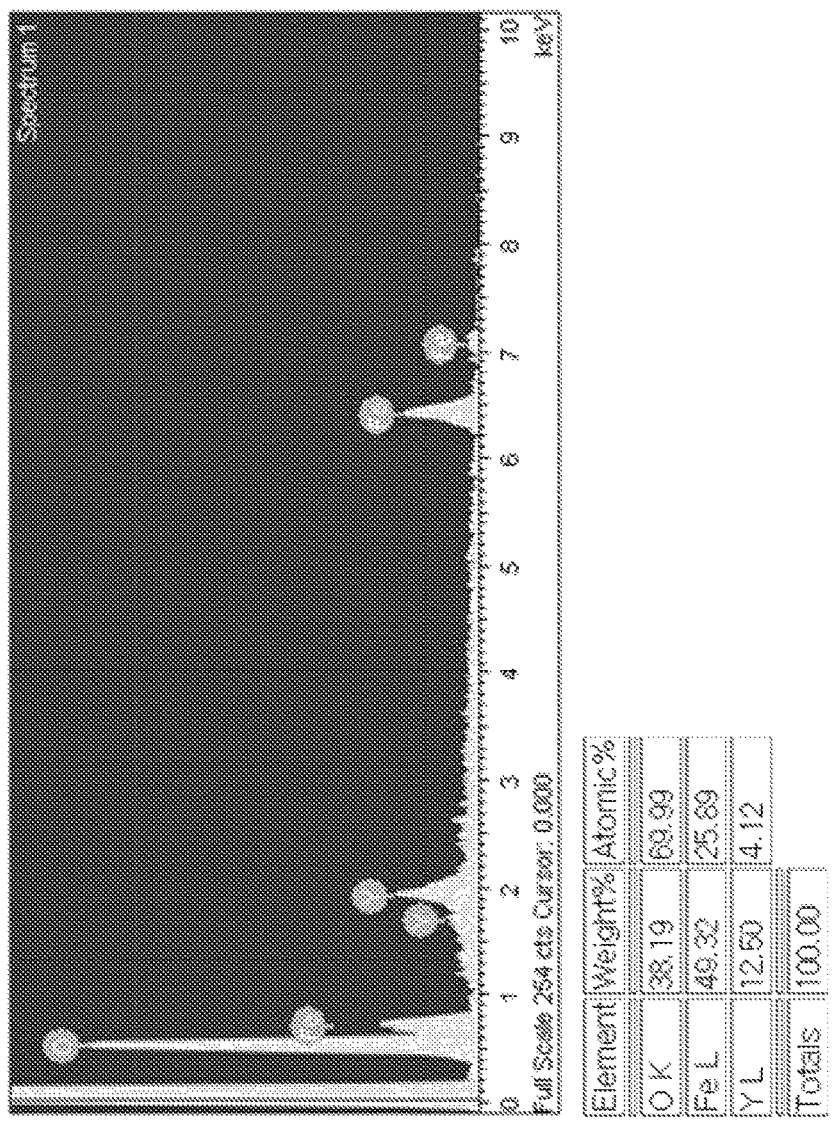
FIG. 33 shows by EDX analysis that Yttria can exist together in amount of ~4 at % (EDX for $Fe_3O_4$-Yttria).

FIG. 33 shows EDX analysis on Yttria. Graph 3300 in FIG. 33 shows that by EDX analysis, it is possible for Yttria to exist together in amount of ~4 at % (EDX for Fe3O4-Yttria).

Figure 34:
FIG. 34 shows an exemplary TEM analysis: $Fe_3O_4/Y_2O_3$ Core-Shell NPs.
Figure 34:
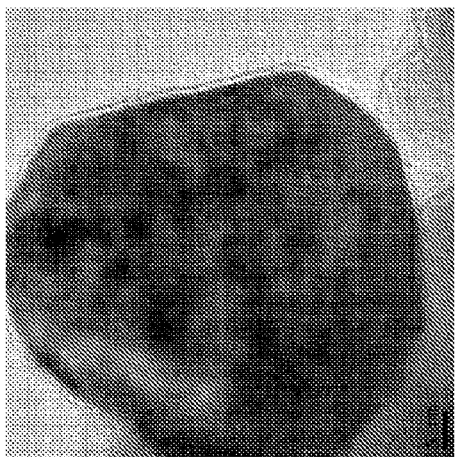
Figure 34:
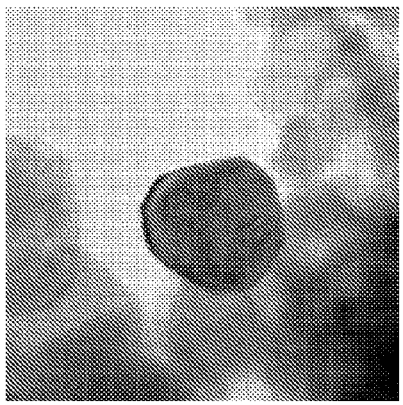

FIG. 34 shows TEM analysis. See images 3400, 3402, and 3404 of Fe3O4/Y2O3 Core-Shell NPs. Images 3400, 3402, and 3404 confirm the $Fe_3O_4/Y_2O_3$ Core-shell structure. For example, $Y_2O_3$ nanoshell thickness can be 1-2 nm.

Figure 35:
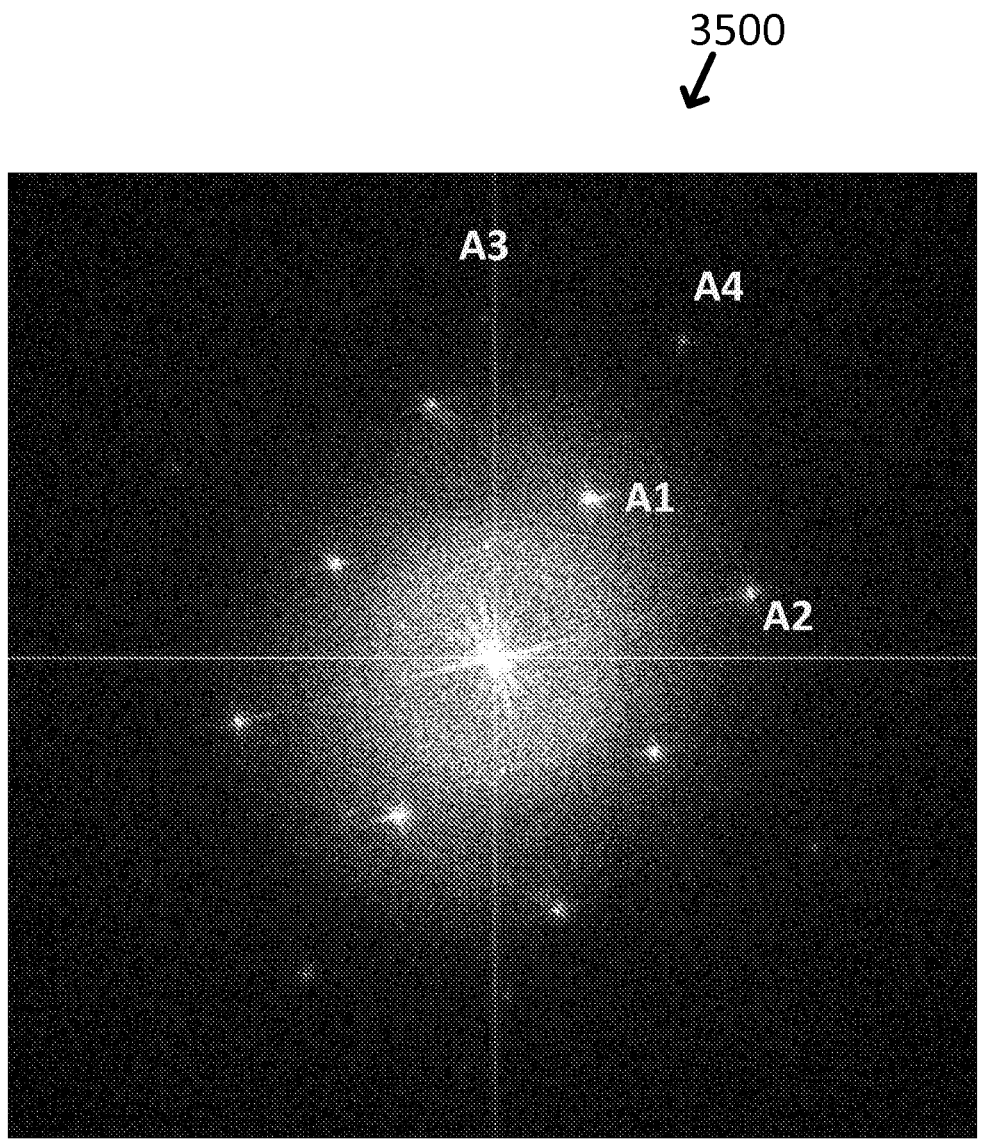
FIG. 35 shows an exemplary Fast Fourier Transform Pattern (FFT) by TEM: $Fe_3O_4/Y_2O_3$.

FIG. 35 shows Fast Fourier Transform Pattern (FFT) by TEM: $Fe_3O_4/Y_2O_3$. By FFT analysis in TEM (see image 3500 in FIG. 35), A3 pattern shows the existence of $Y_2O_3$ in the nanoshell. In FIG. 35, A1, A2, A3, and A4 are represented as follows.

A1: 3.358/nm=0.2978 nm: $Fe_3O_4$ (220)
A2: 4.781/nm=0.2099 nm: $Fe_3O_4$ (400)
A3: 6.186/nm=0.1616 nm: $Y_2O_3$ (026) or $Y_2O_3$ (541)
A4: 6.763/nm=0.1488 nm: $Y_2O_3$ (046) or $Y_2O_3$ (543)

Further advanced series of black-oxide nanoparticle based sunlight-absorbing coating materials can be implemented using the disclosed technology. These advanced nano black-oxide nanoparticle materials include a Cu—Cr—O ceramic system. An example of the Cu—Cr—O ceramic system can include a composition of $CuCr_2O_4$. In another aspect, the advanced nano black-oxide nanoparticle materials include a Cu—Fe—Mn—O ceramic system. An example of the Cu—Fe—Mn—O ceramic system can include a composition of $CuFeMnO_4$. The effects of compositions and synthesis procedures on the properties of these two nano black-oxide materials are described below.

Figure 36:
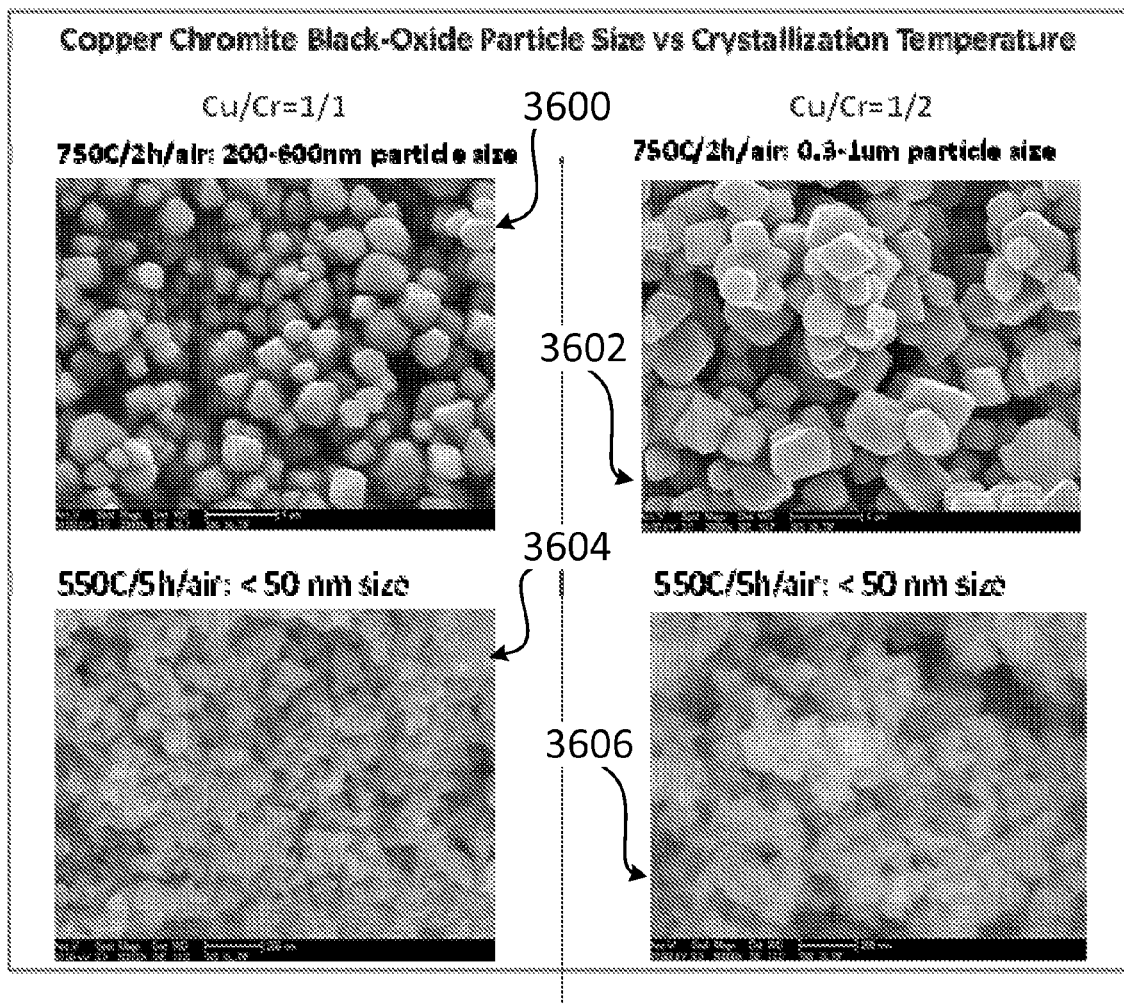
FIG. 36 shows exemplary micrographs illustrating size and shape of copper chromite back-oxide particles having different Cu/Cr ratios and different heat treating temperatures.

For the copper chromite oxide system, the change in chemical composition and stoichiometry significantly affects the sun-light absorbing optical properties. Such variation of Cu/Cr ratio was produced by chemical synthesis using different ratio of precursor chemicals, for example, using a hydrothermal process (essentially chemical reactions in a higher pressure, steam-like autoclave environment), with the particles so prepared subjected to higher temperature crystallization process. FIG. 36 shows the scanning electron microscope micrographs 3600, 3602, 3604, and 3606 of different Cu/Cr ratio particles of Cu/Cr=1/1 and Cu/Cr=½, which were crystallization heat treated at two different temperatures of 750° C. and 550° C. The micrographs show that the black oxide particles are very fine in size and are approximately 50 nm to submicrometer size. The desired average nanoparticle size of $CuCr_2O_4$ type black oxide nanoparticles is at most 900 nm, preferably less than 500 nm, even more preferably less than 300 nm.

These black-oxide nanoparticles are then dispersed in a silica base matrix. Such composite structured coating layer can be prepared, for example, by mixing 20-40% volume % of nano black-oxide particles in a liquid spin-on glass precursor followed by spray coating, brush coating, or doctor blade coating to form a uniform thickness layer, then baking the coating at 200-500° C. to burn away the polymer component and create a dense silica matrix nanocomposite having 30-100 um thick layer well adhered on a metallic substrate that are durable at high temperature such as Inconel alloys. Other alloys such as Haynes alloys or stainless steels can also be used for transporting the heat transfer fluid such as a molten salt, hot oil or steam to the CSP power generator.

Figure 37:
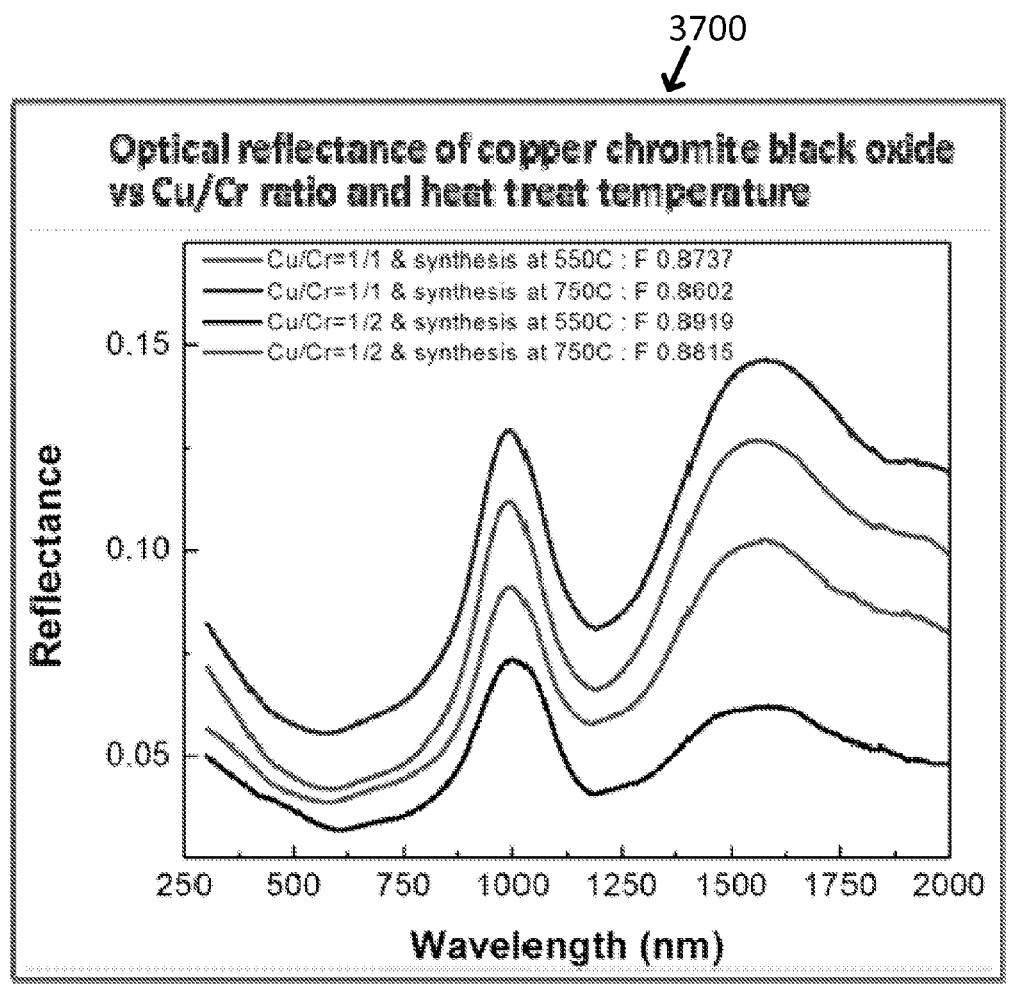
FIG. 37 shows exemplary effect of Cu/Cr ratio and heat treat temperature on optical reflectance of copper chromite black oxide.

FIG. 37 is a graph 3700 showing the effect of Cu/Cr ratio and the heat treating temperature on the optical reflectance properties. The lower the optical reflectance is, the better is the sunlight-absorbing capability. The figure indicates that 550° C. heat treatment produces a lower reflectance than 750° C. as the smaller nanoparticle size is preferred to absorb more light (reflects less light). With respect to the atomic composition, the Cu/Cr ratio of ½ (with a stoichiometry close to $CuCr_2O_4$) is better and gives lower reflectance than the Cu/Cr ratio of 1/1. Therefore, this Cu/Cr ratio=½, with preferably less than 30% deviation in each element composition from this ratio (i.e., 1.0 plus/minus 0.3 and 2.0 plus/minus 0.3), more preferably less than 15% deviation in each element composition is desirable according to the disclosed technology.

Figure 38:
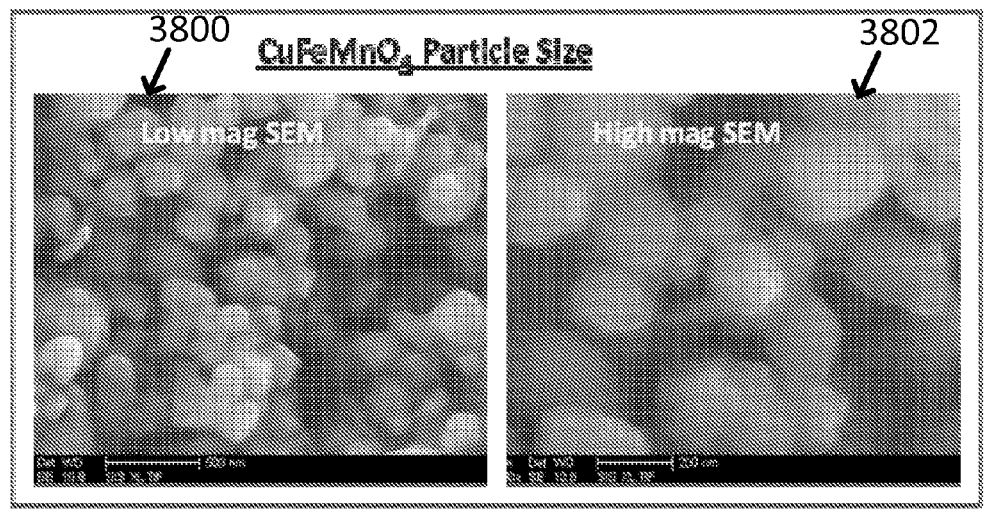
FIG. 38 shows exemplary SEM micrographs of CuFeMnO4 type black oxide nanoparticles after final crystallization at 550° C./5 h/air, with the average particle size of 100-300 nm.

Shown in FIG. 38 are SEM micrographs 3800 and 3802 of hydrothermally synthesized $CuFeMnO_4$ black oxide particles, after final crystallization heat treatment at 550 C/5 h/air, with the average particle size of 100-300 nm. Such nanoparticle size is beneficial for obtaining low reflectance and high sunlight absorptivity. The desired average nanoparticle size of Cu—Fe—Mn—O based oxide nanoparticles is at most 900 nm, preferably less than 500 nm, even more preferably less than 300 nm.

The optical properties of $CuFeMnO_4$ layer was evaluated after the particles were incorporated into the sunlight absorbing coating. The $CuFeMnO_4$ black-oxide nanoparticles were then dispersed in a silica base matrix, for example, by mixing 20-40% volume % of nano black-oxide particles in a liquid spin-on glass precursor followed by spray coating, brush coating, or doctor blade coating to form a uniform thickness layer. The coated layer is then baked/cured at 200-500° C. to burn away the polymer component and create a dense silica matrix nanocomposite having 30-100 um thick layer well-adhered on a metallic substrate that are durable at high temperature such as Inconel alloys, Haynes alloys or stainless steels.

Figure 39:
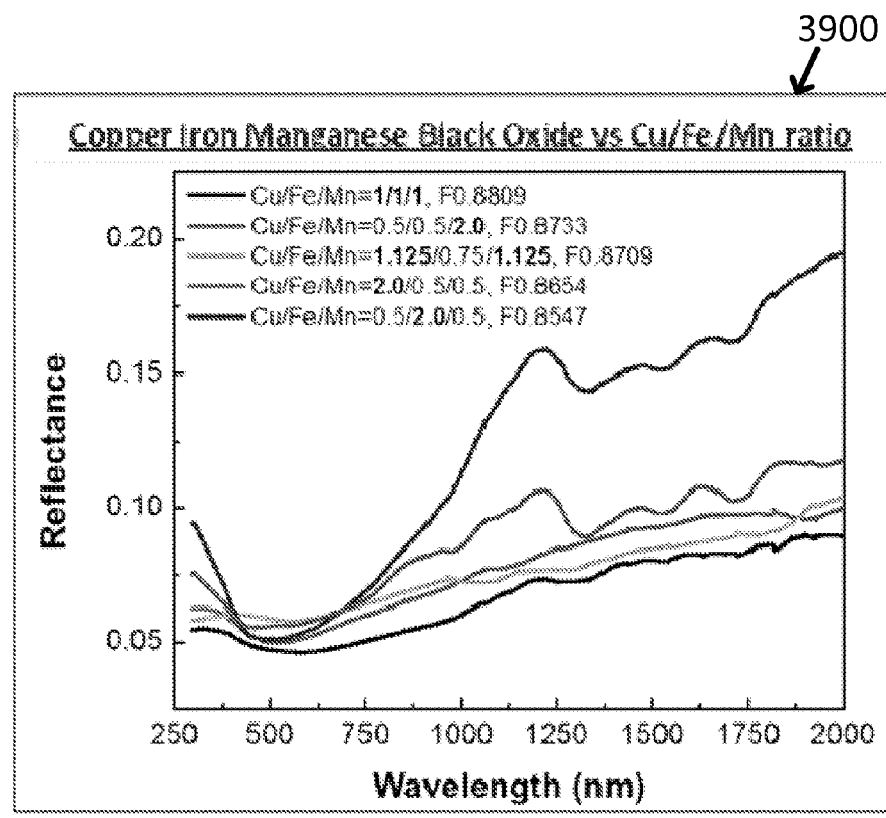
FIG. 39 shows an exemplary optical reflectance of Copper lion Manganese Black Oxide vs Cu/Fe/Mn ratio.

The optical properties of the sunlight absorbing coating containing Cu—Fe—Mn—O based black-oxide nanoparticles are strongly dependent on the composition of the oxide material. FIG. 39 is a graph 3900 that shows the exemplary effect of Cu/Fe/Mn atomic ratio (varied from 1/1/1 vs 0.5/2.0/0.5 vs 0.5/0.5/2.0 vs 1.125/0.75/1.125 vs 2.0/0.5/0.5 vs 0.5/2.0/0.5) on the optical reflectance of the coating layer. It is seen from the figure that the composition of Cu/Fe/Mn=1/1/1 (equivalent to $CuFeMnO_4$ stoichiometry) gives the best sunlight absorbing properties (the lowest optical reflectance). Therefore, this Cu/Fe/Mn=1/1/1 ratio, with preferably less than 30% deviation in each element composition from this ratio, more preferably less than 15% deviation in each element composition is desirable according to the disclosed technology.

Figure 40:
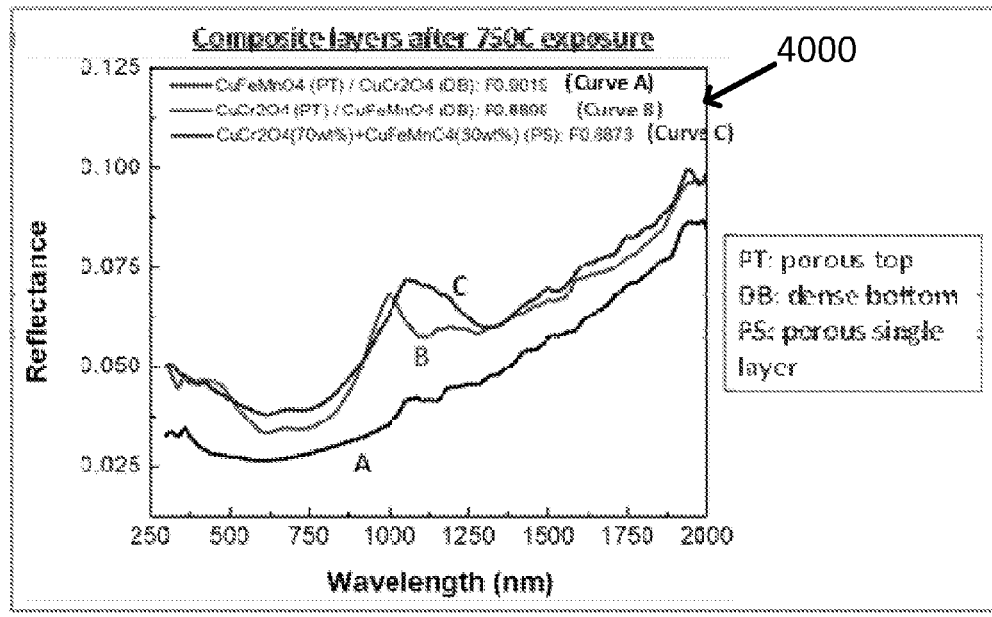
FIG. 40 shows an exemplary optical reflectance of composite layers of nano black oxides. The figure of merit (FOM) values are represented as "F" values in the figure.

Different types of black oxide nanoparticles exhibit quite different sunlight absorbing and reflecting properties. It has been discovered, according to the disclosed technology, that a combination of two or more different oxide layers in the coating material can provide further improved optical properties. Examples of such mixed double layer structures combining $CuFeMnO_4$ and $CuCr_2O_4$ are presented in FIGS. 40 and 41 as graphs 4000 and 4100. In FIG. 40, graph 4000 shows that sequence of which material comes on top and which material is utilized as the bottom layer can make a significant difference. Placing the $CuFeMnO_4$ layer on top (with the $CuCr_2O_4$ as the bottom layer) gives much better (lower) optical reflectance, as low as 2.5% reflectance (as much as 97.5% absorptivity) than the other way around. The top layer was made porous with at least 20% porosity to enhance the light absorption at the surface. A Figure of Merit (FOM) value as high as 0.9019 (or 90.19% conversion of sunlight into heat) was achieved with the double layer structure. Therefore, the preferred double layer configuration is $CuFeMnO_4$ layer on top with the $CuCr_2O_4$ as the bottom, according to the disclosed technology. The figure also shows that having a two separate structured double-layer configuration ($CuFeMnO_4$ top layer and $CuCr_2O_4$ bottom layer) is much better in optical properties with lower reflectance than mixing up of the two types of nanoparticles (e.g., 30 wt % of $CuFeMnO_4$ and 70 wt % of $CuCr_2O_4$) to create a single layer mixed particle coating.

Figure 41:
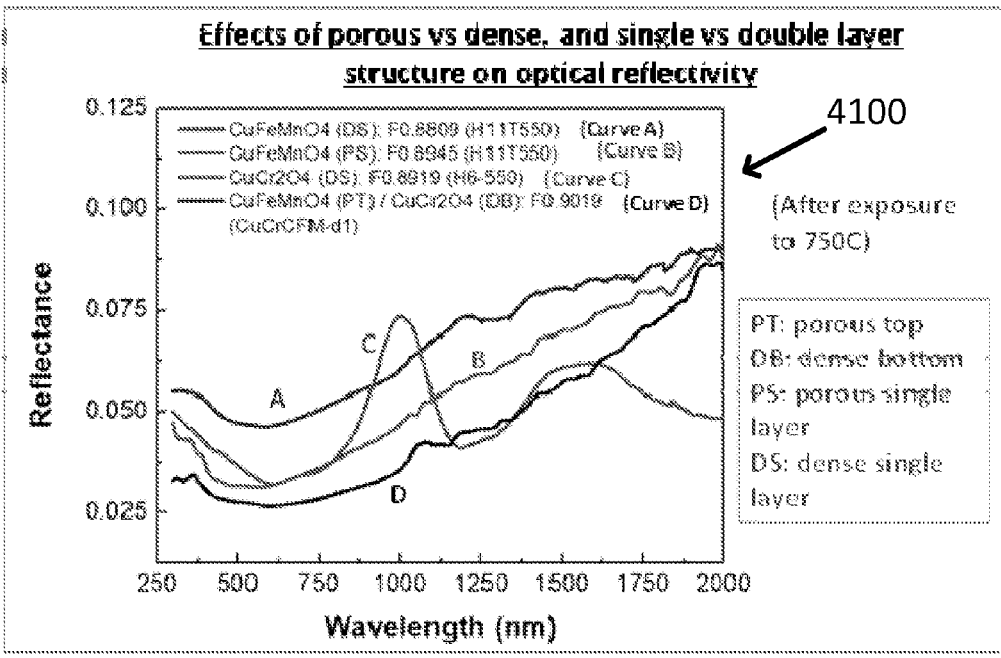
FIG. 41 shows exemplary effects of porous vs dense, and single vs double layer structure on optical reflectivity of CuFeMnO4 and $CuCr_2O_4$ nano black oxides.

Shown in the graph 4100 of FIG. 41 are the effects of porous vs dense, and single vs double layer structure on optical reflectivity of $CuFeMnO_4$ and $CuCr_2O_4$ black oxide materials. It is shown that the porous structure provides better optical properties (lower reflectance) and that a double layer structure is better than the single layer structure. Therefore a double layer structure is preferred for better optical properties of lower reflectance and higher sunlight absorptivity according to the disclosed technology.

Figure 42:
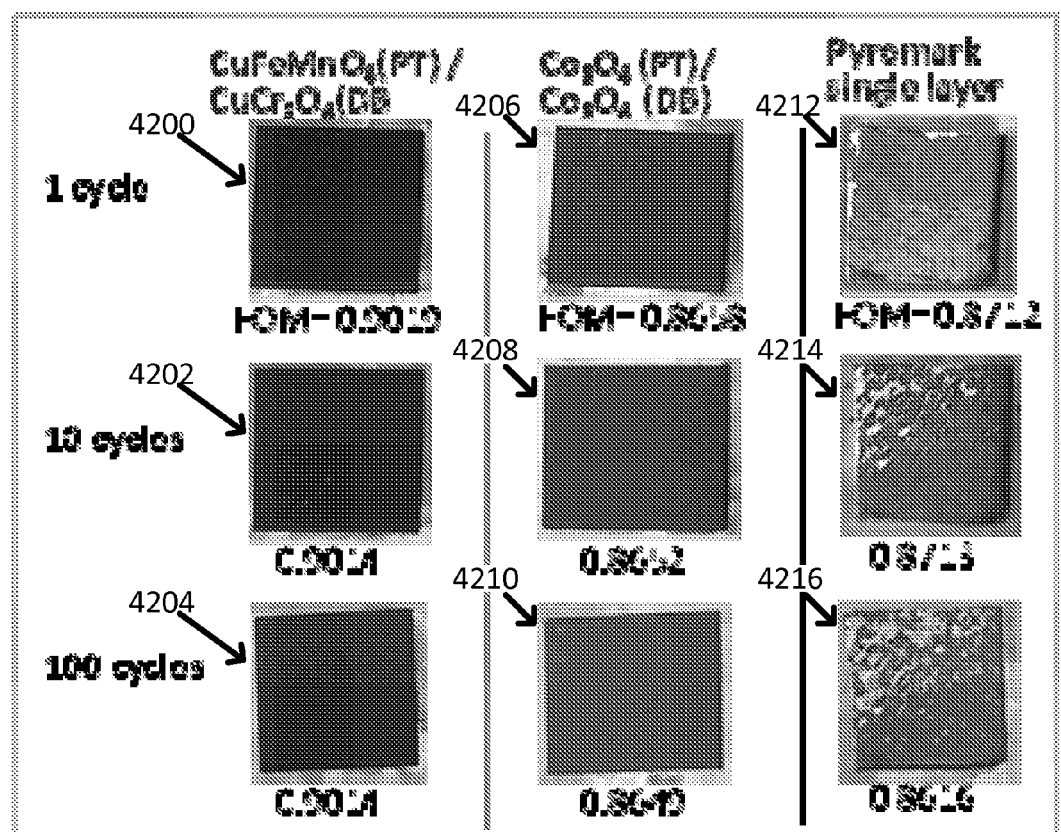
FIG. 42 shows exemplary thermal cycling endurance of three receiver coating materials on Inconel alloy substrate.

The CSP solar receiver structure (e.g., black oxide coated Inconel® alloy tubes) is heated and cooled everyday from the high temperature of e.g., 750° C. during the daytime due to the concentrated sunlight reflected and focused onto the receiver by an array of mirrors. Therefore the receiver sunlight-absorbing coating is thermally cycled every day. The thermal expansion match between the oxide coating layer and the metallic tube substrate material is substantial, and if the adhesion of the coating onto the metal substrate is not strong, the thermal cycling can induce undesirable delamination and flaking-off of the coating material. The nano black oxide coatings, according to the disclosed technology, are desirably highly adherent too the Inconel and stainless steel substrates, as shown in FIG. 42. See images 4200, 4202, 4204, 4206, 4208, 4210, 4212 and 4214. Here, the Thermal Cycling Endurance characteristics between room temperature and 750° C. high temperature cyclic exposure up to 100 cycling have been compared to evaluate the mechanical adhesion of three types of coating materials. It is seen that $CuFeMnO_4$(PT)/$CuCr_2O_4$(DB) coating and $Co_3O_4$ (PT)/$Co_3O_4$ (DB) coating are mechanically stable on thermal cycling up to 100 cycles, while Pyromark coating, a well-known commercial coating used for most of the current CSP applications tends to delaminate on thermal cycling and also showing discoloring to less desirable brownish color.

Figure 43:
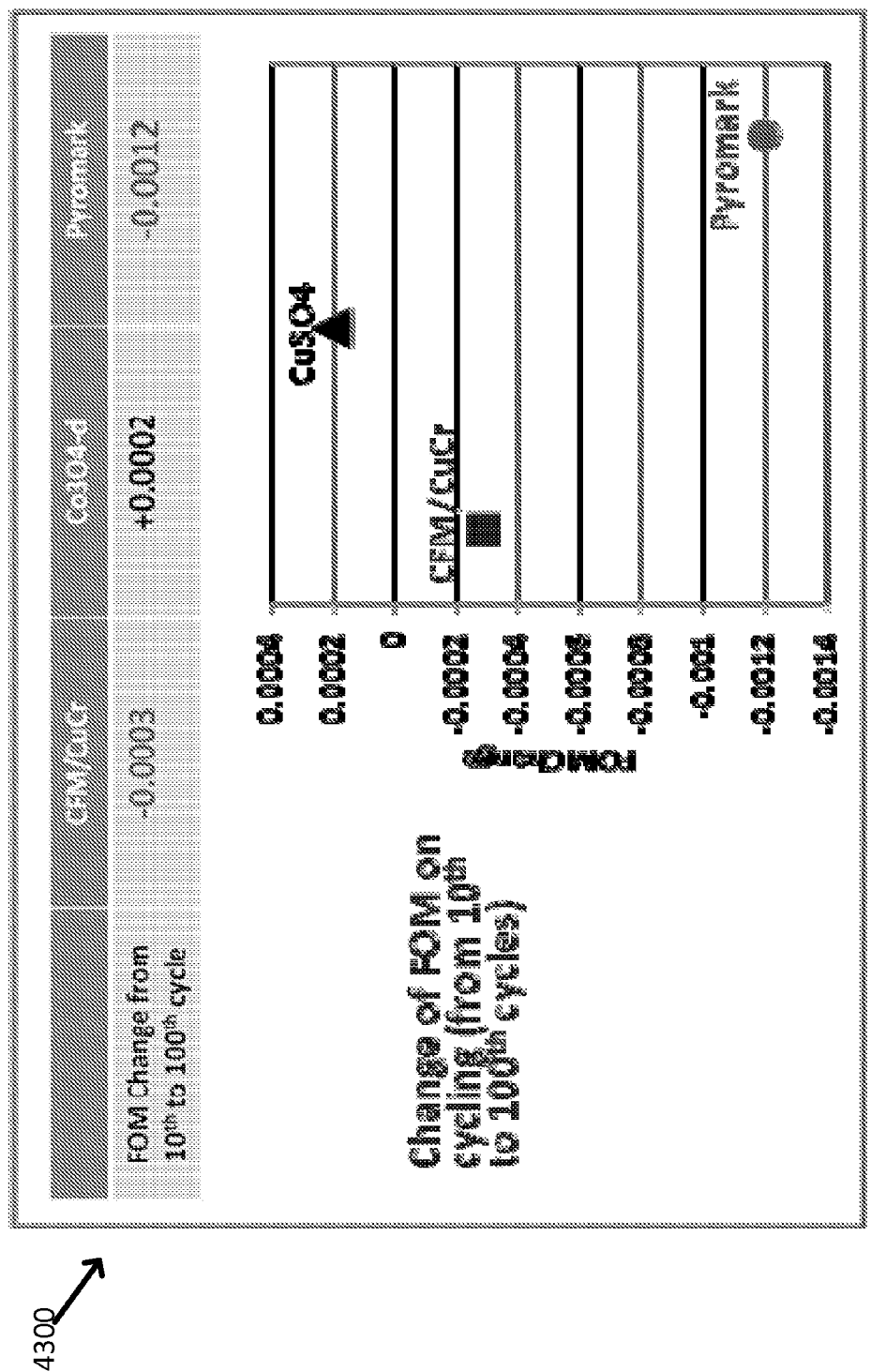
FIG. 43 shows exemplary comparative thermal cycling induced changes in the Figure of Merit (FOM).

The degradation of the sunlight to heat conversion efficiency FOM (Figure-of-Merit) needs to be minimized on thermal cycling. Shown in table and graph 4300 in FIG. 43 is the exemplary comparative thermal cycling induced changes in the Figure of Merit (FOM), which shows that the nano black-oxide based coatings are superior to the commercial Pyromark® coating in terms of minimal loss of FOM on thermal cycling.

Figure 44:
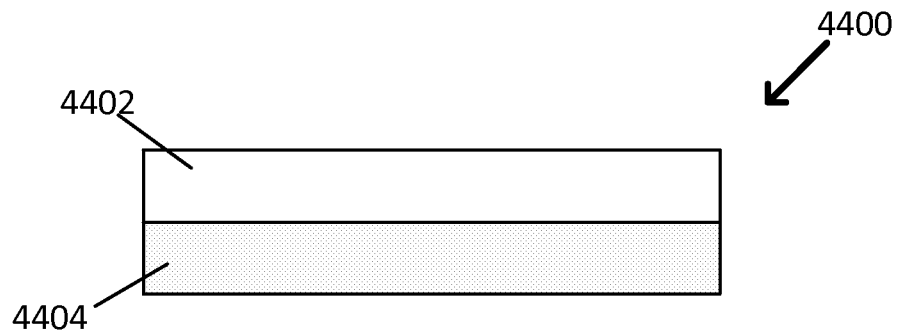
FIG. 44 is a block diagram showing a cross-sectional view of an exemplary optically selective coating.

FIG. 44 is a block diagram showing a cross-sectional view of an optically selective coating 4400. The optically selective coating 4400 includes a nanostructure material layer 4402 disposed over a substrate 4404. The nanostructure material layer 4402 can include any one or combination of the nanostructure materials described with respect to FIGS. 1-43, including the various Cu—Cr—O, Cu—Fe—Mn—O black oxides, or other black oxides. In the example shown in FIG. 44, the nanostructure material layer 4402 is shown as a single layer.

Figure 45:
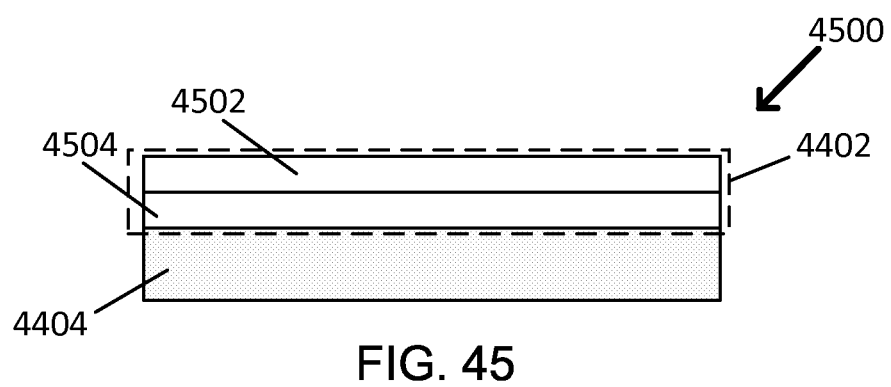
FIG. 45 is a block diagram showing a cross-sectional view of another exemplary optically selective coating.

FIG. 45 is a block diagram showing a cross-sectional view of another exemplary optically selective coating. The optically selective coating 4500 includes a nanostructure material layer 4402 disposed over a substrate 4404. The nanostructure material layer 4402 can include any one or combination of the nanostructure materials described with respect to FIGS. 1-43, including the various Cu—Cr—O, Cu—Fe—Mn—O black oxides, or other black oxides. In the example shown in FIG. 44, the nanostructure material layer 4402 is shown as a double layer structure of a top layer 4502 disposed over a bottom layer 4504.

Figure 46:
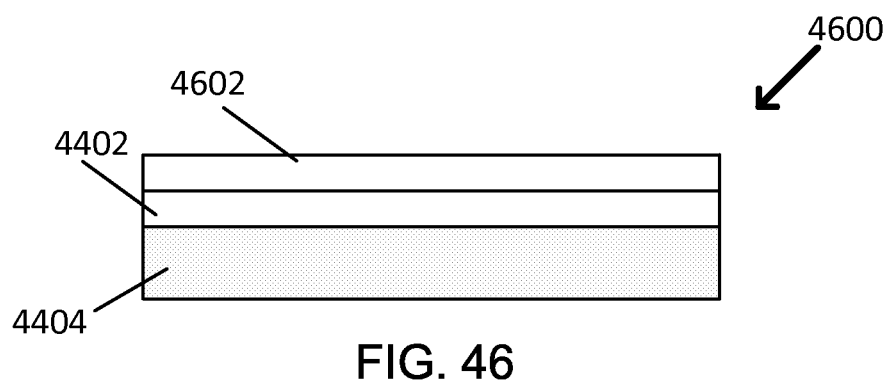
FIG. 46 is a block diagram showing a cross-sectional view of yet another exemplary optically selective coating.

FIG. 46 is a block diagram showing a cross-sectional view of yet another exemplary optically selective coating. The optically selective coating 4600 includes a nanostructure material layer 4402 disposed over a substrate 4404. The nanostructure material layer 4402 can include any one or combination of the nanostructure materials described with respect to FIGS. 1-43, including the various Cu—Cr—O, Cu—Fe—Mn—O black oxides, or other black oxides. In the example shown in FIG. 44, an antireflection layer 4602 is disposed over the nanostructure material layer 4402. The antireflection layer 4602 can include any of the antireflection layer disclosed in this patent document including $MgF_2$. The nanostructure material layer 4402 can be a single layer of a double layer structure similar to those shown and described with respect to FIGS. 44 and 45.

Exemplary Applications of the Disclosed Technology

The disclosed technology has a significant low cost potential for the solar absorbing coating technology. The cost mainly may come from three sources, e.g., the NP fabrication process, raw material costs, and coating process, all of which are low cost. The application of the absorbers can be primarily targeted at and concentrated solar power systems with high temperature operation (e.g., T >600° C.), where solar absorptance and high-T durability are the prime concern.

In concentrated solar power (CSP) with very high concentration ratios (e.g., >100 times), e.g., solar tower, the heat transfer fluids inside the solar absorbers can be heated up to above 600° C., which can be used to drive turbines or other engines to generate electricity, so called the concentrating solar power. The CSP capacity reaches an installed capacity of ~1.17 GW as of 2011. Currently, about 17 GW of CSP projects are under development worldwide (e.g., US: 8 GW; Spain: 4.46 GW; China: 2.5 GW). The IEA publication (ETP 2008) lists CSP as one of the many cost-effective technologies that will lower $CO_2$ emissions. In the ETP BLUE Map scenario, CSP produces 2,200 TWh annually by 2050 from 630 GW capacities. CSP is expected to contribute ~5% of the annual global electricity production in 2050 in this scenario. In the Advanced scenario of CSP Global Outlook 2009, the estimated global CSP capacity by 2050 is 1,500 GW, with an annual output of 7,800 TWh. Assuming, $1/Watt for the electricity cost, the economy scale of CSP power plants is $630 billion (630 GW) to $1.5 trillion (1,500 GW) by 2050. Since 8-10% of the cost goes to solar absorbers, the market size for the solar absorbers for CSP application ranges from $63-150 billion (e.g., note: this is the cumulative market size till 2050, not annual).

In some aspects, the disclosed technology includes a concentrated solar power system incorporating the disclosed solar absorbing coatings and layers, as well as further modified or related design and structures.

In some aspects, the disclosed technology includes a hydrothermal method for fabrication of black oxide nanoparticles (NPs).

In some aspects, the disclosed technology includes methods for using ceramic shell coating to mitigate the coarsening and sintering effect of the NPs at high temperature, and possibly reducing the probability of oxygen stoichiometry change during high temperature operation.

In some aspects, the disclosed technology includes structure and fabrication methods for making the solar absorbing coating on metallic surfaces.

In some aspects, the disclosed technology includes a surface textured layer design for solar absorbing coating so as to improve light absorption, enhance adhesion, and improve temperature-related reliability For example, the use of antireflection coating on the solar absorbing coating can improve the absorptance.

In some aspects, the disclosed technology includes deposition methods and on-site repair methods for the spectrally selective coating using spray coating, brush coating, etc. of nanocomposite precursors and curing.

In some aspects, the disclosed technology includes devices and applications for concentrated solar power type solar energy conversion to steam or electricity, or water heating, home/building heating, or other energy conversion approaches.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed are techniques and structures as described and shown, including:

1. An optically selective coating, comprising:
a substrate including a solar energy absorbing material; and
a nanostructure material formed over the substrate to absorb solar energy in a selected spectrum and reflect the solar energy in another selected spectrum, wherein the nanostructure material includes a double layer structure, wherein a top layer of the double layer structure includes metal oxide nanoparticles of a first type, and wherein a bottom layer of the double layer structure includes metal oxide nanoparticles of a second type different from the first type, wherein a metal oxide nanoparticle of the first type is $CuFeMnO_4$, and wherein a metal oxide nanoparticle of the second type is $CuCr_2O_4$.

2. The coating of claim 1, wherein the top layer includes metal oxide nanoparticles of the first type embedded in a dielectric matrix material.

3. The coating of claim 2, wherein the dielectric matrix material includes ceramic, glass, or silica.

4. The coating of claim 1, wherein the nanostructure material includes nanorods or a core-shell structure coated with nanoparticles.

5. The coating of claim 4, wherein the core-shell structure includes yttrium oxide ($Y_2O_3$).

6. The coating of claim 1, wherein the nanostructure material includes thermally resistant core-shell particles having semiconductor, metal and metal oxide as cores, wherein thermally resistant comprises remaining stable at high temperature operation which is from 400° C. to 750° C.

7. The coating of claim 1, further comprising:
an antireflection layer disposed over the nanostructure material.

8. The coating of claim 1, wherein the nanostructure material includes embedded hole patterns or polymer beads.

9. The coating of claim 1, wherein at least one of the top layer or the bottom layer is a nonporous layer.

10. An optically selective coating, comprising:
a substrate including a solar energy absorbing material; and
a nanostructure material formed over the substrate, wherein the nanostructure material includes a double layer structure, wherein a top layer of the double layer structure includes $CuFeMnO_4$ nanoparticles embedded in a dielectric matrix material, wherein a bottom layer of the double layer structure includes $CuCr_2O_4$ nanoparticles embedded in the dielectric matrix material, and wherein the top layer has a porosity of at least 20%.

11. The coating of claim 10, further comprising:
an antireflection layer disposed over the nanostructure material.

12. The coating of claim 11, wherein the antireflection layer includes $MgF_2$.

13. The coating of claim 10, the dielectric matrix material includes ceramic, glass, or silica.

14. The coating of claim 10, wherein a size of the $CuFeMnO_4$ nanoparticles and a size of the $CuCr_2O_4$ nanoparticles is less than 500 nm (nanometers).

* * * * *